(12) United States Patent
Nakajima et al.

(10) Patent No.: US 6,346,935 B1
(45) Date of Patent: Feb. 12, 2002

(54) TOUCH-SENSITIVE TABLET

(75) Inventors: Naoki Nakajima, Amagasaki; Noriyuki Hidaka, Sakai; Tadashi Ano, Takarazuka; Hiroyuki Asahi, Kobe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/368,432

(22) Filed: Aug. 5, 1999

(30) Foreign Application Priority Data

| Sep. 14, 1998 | (JP) | 10-259884 |
| Sep. 21, 1998 | (JP) | 10-266220 |
| May 21, 1999 | (JP) | 11-141841 |

(51) Int. Cl.⁷ ............................................. G09G 5/00
(52) U.S. Cl. ...................... 345/173; 345/810; 708/146
(58) Field of Search ............................... 345/173–178, 345/340, 348, 810, 817, 823–825, 835; 178/18.01–18.06, 18.09, 18.11; 340/990, 995; 708/146, 143, 145

(56) References Cited

U.S. PATENT DOCUMENTS

| 5,250,929 A | * 10/1993 | Hoffman et al. ............ 345/146 |
| 5,568,604 A | 10/1996 | Hansen |
| 5,579,036 A | * 11/1996 | Yates , IV .................. 345/173 |
| 5,612,719 A | 3/1997 | Beernick |
| 5,661,476 A | * 8/1997 | Wang et al. .................. 341/22 |
| 5,748,185 A | * 5/1998 | Stephan et al. ............. 345/173 |
| 5,767,457 A | * 6/1998 | Gerpheide et al. ....... 178/18.03 |
| 5,883,617 A | * 3/1999 | Yoshikawa .................. 345/157 |
| 5,928,304 A | * 7/1999 | Priess .......................... 701/200 |
| 5,943,043 A | * 8/1999 | Furuhata et al. ............ 345/173 |
| 5,943,044 A | * 8/1999 | Martinelli et al. .......... 345/174 |
| 5,995,083 A | * 11/1999 | Sato et al. .................. 345/173 |
| 6,049,328 A | * 4/2000 | Vanderheiden .............. 345/173 |

FOREIGN PATENT DOCUMENTS

| DE | 196 13 947 | 10/1997 |
| EP | 0 324 306 | 7/1989 |
| EP | 0 326 751 | 8/1989 |
| EP | 0 773 496 | 5/1997 |
| EP | 0 817 000 | 1/1998 |
| FR | 2 662 009 | 11/1991 |
| JP | 9-311746 | 12/1997 |
| JP | 10-149254 | 6/1998 |
| JP | 10-244880 | 10/1998 |
| WO | 96/11435 | 4/1996 |
| WO | 97/30386 | 8/1997 |

OTHER PUBLICATIONS

Japanese Translation of PCT International Publication for Patent Application No. 10–505182.

Robert C. Miller et al., SPINX: a framework for creating personal, site–specific Web crawlers, Computer Networks and ISDN Systems 30 (1998) pp.199–130.

Peter Dömel, Web Map: a graphical hypertext navigation tool, Computer Networks and ISDN Systems 28 (1995) pp. 85–97.

* cited by examiner

*Primary Examiner*—Richard Hjerpe
*Assistant Examiner*—Alexander Eisen
(74) *Attorney, Agent, or Firm*—Wenderoth, Lind & Ponack, L.L.P.

(57) ABSTRACT

When an instructor such as a finger moves along a flat surface of a touch-sensitive tablet, a touch-sensitive tablet generates an input signal indicative of information of points touched with the instructor on the flat surface. A frame is provided around the touch tablet with a predetermined gap measured from the edge thereof. A maximum moveable range of the instructor of the flat surface is defined by the frame. The predetermined gap is determined such that the instructor can touch the periphery of the flat surface even when the movement of the instructor is restricted by the frame.

30 Claims, 49 Drawing Sheets

Fig. 20

| Position | Region | Operation |
|---|---|---|
| Upper Left | (0, 0)-(100, 100) | Display MENU |
| Upper Center | (462, 0)-(562, 100) | Launch Mailing Software |
| Upper Right | (924, 0)-(1024, 100) | Set Access Point |
| Lower Left | (0, 668)-(0, 768) | Maximize/Restor Active Window |
| Lower Center | (462, 668)-(562, 768) | Display Menu for Active Window |
| Lower Right | (924, 668)-(1024, 768) | Close Active Window |

TOUCH-SENSITIVE TABLET

BACKGROUND OF THE INVENTION

1. Field of the Invention

The present invention relates to pointing devices and, more specifically, to a touch-sensitive tablet used as a pointing device of a computer and other information processors.

2. Description of the Background Art

In recent years, a touch-sensitive tablet comes into wide use as a pointing device in a personal computer, especially in a notebook-type portable personal computer (hereinafter referred to as "notebook personal computer"). The touch-sensitive tablet is operated such that a user touches the surface thereof.

Referring to FIGS. 11 and 12, the configuration of a conventional touch-sensitive tablet is described. First, as shown in FIG. 11, a conventional touch-sensitive tablet TSPc mainly includes a circuit board 101 having a coordinate sensor (not shown in the drawing) on one surface thereof, and a front sheet 102. The touch-sensitive tablet TSPc is formed such that the front sheet 102 is overlaid on the one surface of the circuit board 101 having the coordinate sensor.

As shown in FIG. 12, the touch-sensitive tablet TSPc further includes a frame 105 provided around the perimeter of the front sheet 102. The inside of the front sheet 102 surrounded by the frame 105 is defined as a touch surface which a user touches to enter his/her instruction thereto. The touch-sensitive tablet TSPc in the above-described configuration is generally mounted on the front side of a notebook personal computer (not shown).

With a touch of a user's finger on the surface of the front sheet 102, i.e., the touch tablet 104, the coordinate sensor incorporated therein is pressed. Then, the circuit board 101 detects coordinates indicative of the pressed position. To move a cursor on a display screen of the notebook personal computer by utilizing the touch-sensitive tablet, the user touches on the touch surface 104 and move the finger along it in a desired direction. At that time, the circuit board 101 outputs coordinates of the first touched position on the coordinate sensor. The circuit board 101 then sequentially detects coordinates of positions in response to the finger movement, and sends a signal to a CPU of the notebook personal computer. Based on the signal, the CPU moves the cursor on the display of the notebook personal computer according to the finger movement.

The touch-sensitive tablet TSPc further has the function of designating absolute coordinates on the touch surface 104 in addition to the function of moving the cursor on the display screen. Recently developed is a touch-sensitive tablet utilizing the feature of designating absolute coordinates and capable of assigning various functions to absolute coordinate designating regions on the touch surface 104 (hereinafter referred to as "function assignable touch-sensitive tablet"). In the function assignable touch-sensitive tablet, a user can select or freely set specific functions from among a plurality of functions, and can assign the specific functions to arbitrary positions on the touch surface 104. The positions assigned the specific functions on the touch surface 104 are referred to below as "function regions".

In FIG. 12, a first function region 106 and a second function region 107 are shown by dotted lines. With a touch of a finger on the first function region 106 in the upper left corner, the circuit board 101 detects absolute coordinates of the touched point, and sends a coordinate signal to the CPU of the notebook personal computer. The CPU judges whether the received coordinate signal is an instruction for moving the cursor or an instruction for executing the assigned function. When judging as an instruction for executing the assigned function, the CPU executes the function previously assigned to the absolute coordinates, and displays the result on the display of the notebook personal computer. If the function assigned to the first function region 106 is a function for ENTER key entry, for example, the touch of the finger on the first function region 106 enables execution of the same instruction as a press of an ENTER key on a keyboard. More specifically, when required to press the ENTER key while manipulating the touch-sensitive tablet, the user has only to move the finger along the touch surface 104 of the touch-sensitive tablet to conveniently cause the same operation result as in the case of pressing the ENTER key. Similarly, for example, with an up/down scroll function being assigned to one of the second function regions 107 in advance, the user can easily realize up/down scrolling by touching the second function region 107 with the finger and gliding the finger in the upward/downward directions.

Although the function regions are shown by dotted lines in FIG. 12 for better recognition, the function regions are not explicitly indicated on the touch surface 104 of the actual touch-sensitive tablet TSPc. This causes the following inconveniences when the user utilizes the provided functions:

(1) Not knowing the accurate positions of the function regions, the user has difficulty in correctly touching the function region for a desired function. In some cases, the user touches the periphery of the desired function region by mistake. Resultantly, the touch-sensitive tablet TSPc judges that the user instructs on cursor movement, for example, thereby not allowing execution of the desired function.

(2) As the function regions increase in number, the user further tends to touch undesired function regions. To avoid such misoperation, the positions of the function regions are limited to the four corners of the touch surface 104 at most.

(3) It is not clear for the user which function is assigned to each function region.

(4) The whole surface of the front sheet 102 should be primarily used as the touch surface 104. However, the outer area of the front sheet 102 is hidden by the frame 105, reducing the area of the touch surface 104. Since a notebook personal computer must be compact and lightweight, a component attached thereto is also required to slim down its volume and effective area. To the contrary, the touch-sensitive tablet TSPc thus has waste of unusable volume and area.

(5) In the case where the user touches the touch surface 104 with a finger F as shown in FIG. 13, the frame 105 prevents the finger F from touching the edge of the touch surface 104. That is, the user can not touch the whole surface of the touch surface 104. Specifically, as shown in FIG. 14, the user can touch only a touchable area AOe of the touch surface 104 separated from the inner periphery of the frame 105 by a distance G. An area between the touchable area AOe and the inner periphery of the frame 105 is an untouchable area AOn even though provided with sensors. The untouchable area AOn results in waste of the area and volume of the notebook personal computer and reduction of an effective operational area of the touch-sensitive tablet TSPc as well.

(6) The touch-sensitive tablet TSPc is made compact to be incorporated in the notebook personal computer. The touch surface 104 of the touch-sensitive tablet TSPc is made much smaller in area. On the other hand, the touch surface 104 must be able to distinguish coordinates at high resolution conforming to the high resolution of the display of the notebook personal computer. In spite of the above, the touch surface 104 basically has a small area as described above, and moreover, the effective operational area thereof is further reduced for the above-described reasons in (4) and (5). As a result, it is more difficult for the user to correctly touch the touch surface 104 to make an entry. The problem herein is more serious than the above-mentioned problems in (2) and (3).

The present invention solves the above-described problems, and has a first object to provide a touch-sensitive tablet capable of starting a function by designating absolute coordinates and facilitating more correct, intuitive understanding of the operation thereof and more accurate input operation thereof.

As described in the above, the touch-sensitive tablet is a flat-type device of approximately 3×4-cm connected to a personal computer. Movement of a finger and the like along the touch surface of the touch-sensitive tablet causes a cursor to move on the display screen of the personal computer. Besides, a light touch of a finger on the touch surface (hereinafter referred to as "tapping") can substitute a click of a mouse. Japanese Patent Laying Open No. 9-311746 discloses a device capable of preventing misoperation relating to tapping. Moreover, some touch-sensitive tablets can launch an application program or a menu in response to a tap on specific regions in the four corners of the touch-sensitive tablets since the four corners are not used for normal click operations. Tapping again on the touch-sensitive tablet after displaying a menu can effect an operation such as maximizing and minimizing display, and closing an active application program (such operation is hereinafter referred to as "window operation"). Further, it is impossible to execute a function corresponding to each entry of the menu by moving the finger and the like along the touch surface, selecting an entry, and designating the entry with tapping and other actions.

The touch-sensitive tablet is generally placed adjacently to an input device such as a keyboard. Therefore, the user tends to unintentionally touch the touch surface of the touch-sensitive tablet (particularly, the four corners of the touch surface) while making key entry with the key board. In such a case, the personal computer regards the user's involuntary touch as intentional tapping. This causes misoperation, for example, an application program is launched. Moreover, in order to display a menu and perform a window operation, the user must accurately manipulate the touch-sensitive tablet to move a cursor. It is, however, difficult to accurately move the cursor with the touch-sensitive tablet, which leads to a problem that the user can not quickly realize menu display and a window operation. Accordingly, a second object of the present invention is to provide a touch-sensitive tablet capable of preventing the above-described misoperation and having enhanced usability.

Furthermore, Published Japanese Translation of PCT International Publication for Patent Application No. 10-505182 discloses a method of continuously performing operations with a touch-sensitive tablet. That is, by touching the upper and lower right and left edges of a touch sensor of the touch-sensitive tablet, a user can continuously perform operations, such as moving a mouse cursor and scrolling a window, appropriate to the preceding operation result. This method is effective in continuous operation of moving a mouse cursor and scrolling a window, however, not suitable for assigning functions, such as launching an application program and performing a window operation, to regions on a touch surface of the touch-sensitive tablet.

The present invention also has an object to provide a touch-sensitive tablet capable of executing functions, such as launch of an application program and a window operation. Such functions are executed in response to an input operation made in specific regions on a touch surface of the touch-sensitive tablet. That input operation is unsusceptible to or independent from user's skill and the properties, e.g., the sensitivity of the touch-sensitive tablet as compared with conventional methods. Further, another object of the present invention is to provide an input device capable of assigning a plurality of functions to one specific region and executing the plurality of functions individually.

SUMMARY OF THE INVENTION

A first aspect of the present invention is directed to a touch-sensitive tablet comprising:
 a touch tablet having a flat surface for being touched with an instructing part to generate an input signal in response to a position of the instructing part; and
 a frame provided around the touch tablet with a predetermined gap measured from the edge thereof for defining a maximum movable range of the instructing part on the flat surface,
 the predetermined gap being determined such that the instructing part can touch the periphery of the flat surface even when the movement of the instructing part is restricted by the frame.

As described above, in the first aspect, it is possible to make an entry by moving a finger and the like along the frame on the touch tablet.

According to a second aspect of the present invention, in the first invention, the predetermined gap is determined based on the curvature of the instructing part with respect to the flat surface and the height of the frame above the flat surface.

As stated above, in the second aspect, the predetermined gap can be appropriately determined according to the size of the finger and the like and the frame.

According to a third aspect of the present invention, in the second aspect, the instructing part is a finger.

According to a fourth aspect of the present invention, in the second aspect, the flat surface is formed in a polygonal configuration defined by a plurality of sides, the predetermined gap taking a minimum value in the middle of each of the plurality of sides to become larger toward corners defined by the adjacent two sides among the sides and taking a maximum value at the corners.

According to a fifth aspect of the present invention, in the first aspect, the touch-sensitive tablet further comprising a function region assigned a specific function and provided on the flat surface for generating a function execution signal for instructing about execution of the specific function when the instructing part touches the function region.

According to a sixth aspect of the present invention, in the fifth aspect, a sign is provided on the function region to indicate the contents of the specific function assigned thereto.

As described above, in the sixth aspect, with the aid of the sign, the user can understand the position of the function region on the touch tablet or the contents of the function assigned to the function region.

According to a seventh aspect of the present invention, in the sixth aspect, a sign is printed on the function region to indicate the contents of the specific function assigned thereto.

As stated above, in the seventh aspect, the same effects as the sixth aspect can be obtained.

According to an eighth aspect of the present invention, in the fifth aspect, a sign is provided in the frame to indicate the contents of the specific function assigned to the function region.

As mentioned above, in the eighth aspect, the same effects as the sixth aspect can be obtained.

According to a ninth aspect of the present invention, in the eighth aspect, the sign takes any one form of being printed, engraved and embossed on the frame.

As mentioned above, in the ninth aspect, the same effects as the sixth aspect can be obtained.

According to a tenth aspect of the present invention, in the ninth aspect, the sign takes the form of projections and depressions on the inner periphery of the frame to indicate the specific function assigned to the function region.

As mentioned above, in the tenth aspect, the same effects as the sixth aspect can be obtained.

An eleventh aspect of the present invention is directed to a touch-sensitive tablet comprising:

a touch tablet having a flat surface for being touched with an instructing part to detect information about a position touched with the instructing part on the flat surface;

a function region provided on the flat surface assigned a specific function;

a storage for storing an operation corresponding to the specific function and assigned to the function region; and a controller for retrieving the operation from the storage when the instructing part touches the function region successively twice within a predetermined time.

As described above, according to the eleventh aspect, it is possible to prevent an application program and a menu from being displayed by mistake with a touch of a finger on the flat surface.

According to a twelfth aspect of the present invention, in the eleventh aspect, the touch tablet generates an input signal indicative of the position touched with the instructing part, and the controller detects, based on the input signal, that the instructing part touches the function region successively twice within the predetermined time.

As stated above, in the twelfth aspect, a time interval between two tappings is defined to preclude an erroneous input.

According to a thirteenth aspect of the present invention, in the eleventh aspect, on receipt of information about the touched position existing outside the function region but within a predetermined range measured from the function region, the controller assume that the function region is touched.

As mentioned above, according to the thirteenth aspect, even when a user fails to touch the function region, if the touched position is within the predetermined range, it is recognized that the function region is touched. Thus, the user does not have to pay attention to his/her input operations more than necessary.

According to a fourteenth aspect of the present invention, in the eleventh aspect, the touch-sensitive tablet further comprising a display for displaying a plurality of windows, wherein the storage further stores an operation for an active window as the specific function assigned to the function region, and the controller retrieves the operation from the storage when the instructing part touches successively twice within the predetermined time.

As described above, in the fourteenth aspect, the window operation is directly assigned to the function region in place of an application program, thereby making it possible to perform the window operation without a cursor moving operation by using touch-sensitive tablet. As a result, the window operation can be quickly performed.

A fifteenth aspect of the present invention is directed to a method of touching a flat surface of a touch-sensitive tablet and thereby executing a specific function assigned to a function region provided on the surface, comprising the steps of:

storing an operation corresponding to the specific function assigned to the function region on the flat surface;

detecting information about a touched position in response to a touch of an instructing part on the flat surface; and retrieving the stored operation when the instructing part touches the function region successively twice within a predetermined time, the operation being assigned to the function region.

As described above, according to the fifteenth aspect, it is possible to prevent an application program and a menu from being displayed by mistake with a touch of a finger on the surface.

A sixteenth aspect of the present invention is directed to a computer program capable of running on a computer so that the system comprising the computer program plus the computer carries out the method according to the fifteenth aspect.

A seventeenth aspect of the present invention is directed to a computer program loadable into a computer so that the computer programmed in this way is capable of carrying out the method according to the fifteenth aspect.

An eighteenth aspect of the present invention is directed to a computer program product comprising a computer readable medium, having thereon: computer program code means, when said program is loaded, to make the computer execute the method according to the fifteenth aspect.

A nineteenth aspect of the present invention is directed to a touch-sensitive tablet comprising:

a touch sensor having a plurality of specific regions provided contiguously to each other to acquire touch information indicative of whether an instructing part touches the plurality of specific regions or not;

a storage for storing a correspondence table to assign operations to combinations of contiguous specific regions among the plurality of specific regions; and a controller for starting the operations in response to the combinations of contiguous specific regions successively touched by the instructing part, based on the touch information and the correspondence table, wherein the operations can be individually and selectively started in response to the combinations of the successively touched contiguous specific regions.

As described above, according to the nineteenth aspect, it is possible to prevent misoperation from being caused by a touch of a user's finger, and to execute functions assigned to the specific regions independently of the skill of a user and the sensitivity of the touch-sensitive tablet. Moreover, a plurality of functions can be assigned to one of the specific regions.

According to a twentieth aspect of the present invention, in the nineteenth aspect, the plurality of specific regions includes, a first specific region provided in one of the corners of the touch sensor, and second specific regions each provided contiguously to the first specific region, and wherein the controller starts the operations only when the touch information indicates that the first specific function region is touched first.

As mentioned above, according to the twentieth aspect, the touch-sensitive tablet has excellent usability. For example, the touch-sensitive tablet can start a plurality of functions by the input operations starting from the single first specific region provided in the corner.

According to a twenty-first aspect of the present invention, in the twentieth aspect, the plurality of specific regions further includes third specific regions provided between the first specific region and the second specific regions, and wherein the controller suspends start up of the operations when the touch information indicates that the third specific regions are touched.

As stated above, according to the twenty-first aspect, a touch made in the third specific regions is ignored, thereby further reducing misoperation in regard to the first specific region.

According to a twenty-second aspect of the present invention, in the twentieth aspect, the first specific region is assigned a plurality of functions.

According to a twenty-third aspect of the present invention, in the twenty-first aspect, the first specific region is assigned a plurality of functions.

According to a twenty-fourth aspect of the present invention, in the twenty-second aspect, the controller starts the functions assigned to the first specific region when the touch information indicates that the second specific regions are touched.

According to a twenty-fifth aspect of the present invention, in the twenty-third aspect, the controller starts the functions assigned to the first specific region when the touch information indicates that the second specific regions are touched.

As described above, according to the twenty-fifth aspect, movement of a finger and the like on the touch sensor can execute the functions, which improves the usability of the touch-sensitive tablet.

According to a twenty-sixth aspect of the present invention, in the nineteenth aspect, the touch information is comprised of information about points where the instructing part touches with the touch sensor, the information being detected at a predetermined time interval.

According to a twenty-seventh aspect of the present invention, in the nineteenth aspect, the touch information varies according to the moving speed of the instructing part.

According to a twenty-eighth aspect of the present invention, in the nineteenth aspect, the touch-sensitive tablet further comprises a display for showing a plurality of windows thereon, wherein the storage further stores operations for active one of the plurality of windows as functions assigned to the function region, and the controller switches an input operation mode to a normal cursor moving operation mode based on the touch information and the operations stored in the storage while at least one of the plurality of windows is shown on a screen of the display, and moves a cursor onto a menu entry for one of the plurality of windows shown on the screen.

As mentioned above, according to the twenty-eighth aspect, the input operation for moving a cursor onto a menu is unnecessary. Besides, the operations for the active window can be performed with the touch-sensitive tablet by moving the finger and the like along the touch sensor.

According to a twenty-ninth aspect of the present invention, in the twenty-eighth aspect, the controller executes the operations for the active window focused by the cursor.

According to a thirtieth aspect of the present invention, in the twentieth aspect, the controller starts the operations when the touch information indicates that the first specific region and one of the second specific regions are successively touched by the instructing part.

According to a thirty-first aspect of the present invention, in the twentieth aspect, the controller starts the operations when the touch information indicates that the first specific region and one of the second specific regions are successively touched by the instructing part.

A thirty-second aspect of the present invention is directed to a touch-sensitive tablet comprising:

a touch sensor having a specific regions assigned a specific function to acquire touch information indicative of whether an instructing part touches the specific region, or not;

a storage for storing a correspondence table to assign an operation to a combination of the touch information and the specific region, the touch information being acquired when the instructing part first touches the specific region and then moves in a predetermined direction along the touch sensor; and a controller for starting the operation corresponding to the touch information based on the correspondence table.

According to a thirty-third aspect of the present invention, in the thirty-second aspect, the predetermined direction includes four directions defined by two axes perpendicular to each other, and the touch information is acquired when a distance of movement of the instructing part in parallel to the predetermined direction is not less than a predetermined length.

A thirty-fourth aspect of the present invention is directed to a method of successively touching a plurality of specific regions provided contiguously to each other on a touch surface of a touch-sensitive tablet and executing a function assigned to one of the plurality of specific regions, comprising the steps of:

a step of acquiring touch information indicative of whether an instructing part touches the plurality of function regions or not;

a step of storing a correspondence table to assign operations to combinations of contiguous specific regions among the plurality of specific regions; and a step of controlling start up of the operations in response to the combinations of contiguous specific regions successively touched by the instructing part, based on the touch information and the correspondence table, wherein the operation can be individually and selectively started in response to the combinations of the successively touched contiguous specific regions.

According to a thirty-fifth aspect of the present invention, in the thirty-fourth aspect, the plurality of specific regions includes a first specific region provided in one of the corners of the touch sensor, and second specific regions each provided contiguously to the first specific region, the touch information acquiring step acquires touch information about the first specific region and the second specific regions, and the controlling step starts the operations only when the acquired touch information indicates that first touching the first specific region is touched first and the second specific regions are touched thereafter.

According to a thirty-sixth aspect of the present invention, in the thirty-fifth aspect, the plurality of specific regions further includes third specific regions between the first specific region and the second specific regions, and wherein the controlling step suspends start up of the operations when the touch information indicates that the third specific regions are touched.

According to a thirty-seventh aspect of the present invention, in the thirty-sixth aspect, the controlling step starts the operations when the touch information indicates that the second specific regions are touched.

According to a thirty-eighth aspect of the present invention, in the thirty-fifth aspect, the controlling step starts the operations when the touch information indicates that the second specific regions are touched.

A thirty-ninth aspect of the present invention is directed to a method of touching with an instructing part a specific region provided on a touch surface of a touch-sensitive tablet and moving the instructing part in a predetermined direction along the touch surface to start one of a plurality of specific functions assigned to the specific region, comprising the steps of:

a step of acquiring touch information indicative of whether the instructing part touches the specific region or not;

a step of storing a correspondence table to assign operations assigned to combinations of the touch information and the specific region, the touch information being acquired when the instructing part first touches the specific region and then moves in the predetermined direction along the touch sensor; and a step of controlling start up of the operations corresponding to the touch information, based on the correspondence table.

A fortieth aspect of the present invention is directed to a computer program capable of running on a computer so that the system comprising the computer program plus the computer carries out a method according to any one of the thirty-fourth to thirty-ninth aspects.

A forty-first aspect of the present invention is directed to a computer program loadable into a computer so that the computer programmed in this way is capable of carrying out a method according to any one of the thirty-fourth to thirty-ninth aspects.

A forty-second aspect of the present invention is directed to a computer program product comprising a computer readable medium, having thereon: computer program code means, when the program is loaded, to make the computer execute a method according to any one of the thirty-fourth to thirty-ninth aspects.

A forty-third aspect of the present invention is directed to an icon display device for displaying an icon corresponding to a specific section in distinction from another icon, comprising:

a touch-sensitive tablet for inputting plane coordinates;

a section specifier for managing one or more sections defined by coordinates inputted from the touch-sensitive tablet, and specifying the section including the inputted coordinates;

a display for displaying icons; and an icon image generator for having the display display the icons corresponding to the sections managed by the section specifier, wherein the display displays the icon corresponding to the section specified by the section specifier in distinction from the other icon.

As described above, in the forty-third aspect, the icon display device displays the icon corresponding to the section specified by the section specifier in distinction from the other icon, thereby allowing quick icon identification and selection without depending on the display size of the icons.

According to a forty-fourth aspect, in the forty-third aspect, one of the sections managed by the section specifier is identified as corresponding to the inputted coordinates, and the icon image generator provides the icon with a label corresponding to the identified section of the touch-sensitive tablet.

As described above, in the forty-fourth aspect, even when the icon corresponding to the section on the touch sensitive tablet is arranged at an arbitrary position on the display, it is possible to easily recognize the corresponding relation between the section on the touch sensitive tablet and the icon.

According to a forty-fifth aspect, in the forty-third aspect, the icon display device further comprises a cursor image generator for having the display display a cursor at a position corresponding to the coordinates inputted from the touch-sensitive-tablet, the position located on the icon corresponding to the section specified by the section specifier.

As described above, in the forty-fifth aspect, the cursor can be quickly moved onto the selected icon.

According to a forty-sixth aspect, in the forty-fourth aspect, the icon display device further comprises a cursor image generator for having the display display a cursor on the icon which corresponds to the section specified by the section specifier and to the coordinates inputted from the touch-sensitive tablet.

As described above, in the forty-sixth aspect, the cursor can be quickly moved onto a desired icon.

A forty-seventh aspect of the present invention is directed to an icon display method for displaying an icon corresponding to a specific section in distinction from another icon, comprising the steps of:

inputting plane coordinates;

managing one or more sections defined by coordinates inputted in the coordinate input step, and specifying the section including the inputted coordinates; and displaying icons so as to display the icon corresponding to the specified section in distinction from the other icon.

As described above, in the forty-seventh aspect, the icon corresponding to the section specified in the section specifying step is displayed in distinction from the other icon in the icon display step, thereby allowing quick icon identification and selection without depending on the display size of the icons.

According to a forty-eighth aspect, in the forty-seventh aspect, one of the managed sections is identified as corresponding to the coordinates inputted in the coordinate input step, and in the icon display step, the icon is provided with a label corresponding to the identified section.

As described above, in the forty-eighth aspect, even when the icon corresponding to the section in the coordinate input step is arranged at an arbitrary position, it is possible to easily recognize the relation between the section in the coordinate input step and the icon.

According to a forty-ninth aspect, in the forty-seventh aspect, the icon display method further comprises the step of displaying a cursor at a position corresponding to the coordinates inputted in the coordinate input step, the position located on the icon corresponding to the section specified in the section specifying step.

As described above, in the forty-ninth aspect, the cursor can be quickly moved onto the selected icon.

According to a fiftieth aspect, in the forty-eighth aspect, the icon display method further comprises the step of displaying a cursor at a position corresponding to the coordinates inputted in the coordinate input step, the position located on the icon corresponding to the section specified in the section specifying step.

As described above, in the fiftieth aspect, the cursor can be quickly moved onto the selected icon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 is an illustration of exemplary operations each corresponding to the function region provided on the touch tablet of the touch-sensitive tablet shown in FIG. 15;

FIGS. 45, 46, 476 48 and 49 constitute a flow chart delineating the operation of the touch-sensitive tablet according to the second alternative of the third embodiment of the present invention;

DESCRIPTION OF THE PREFERRED EMBODIMENTS

First Embodiment

Referring to FIGS. 1 to 10, description is made of exemplary touch-sensitive tablets according to a first embodiment of the present invention each applied to a notebook personal computer.

It should be noted that the touch-sensitive tablets according to the present embodiment are devised in order to attain the first object of the present invention described in the above-stated Description of the Background Art.

Figure 1:
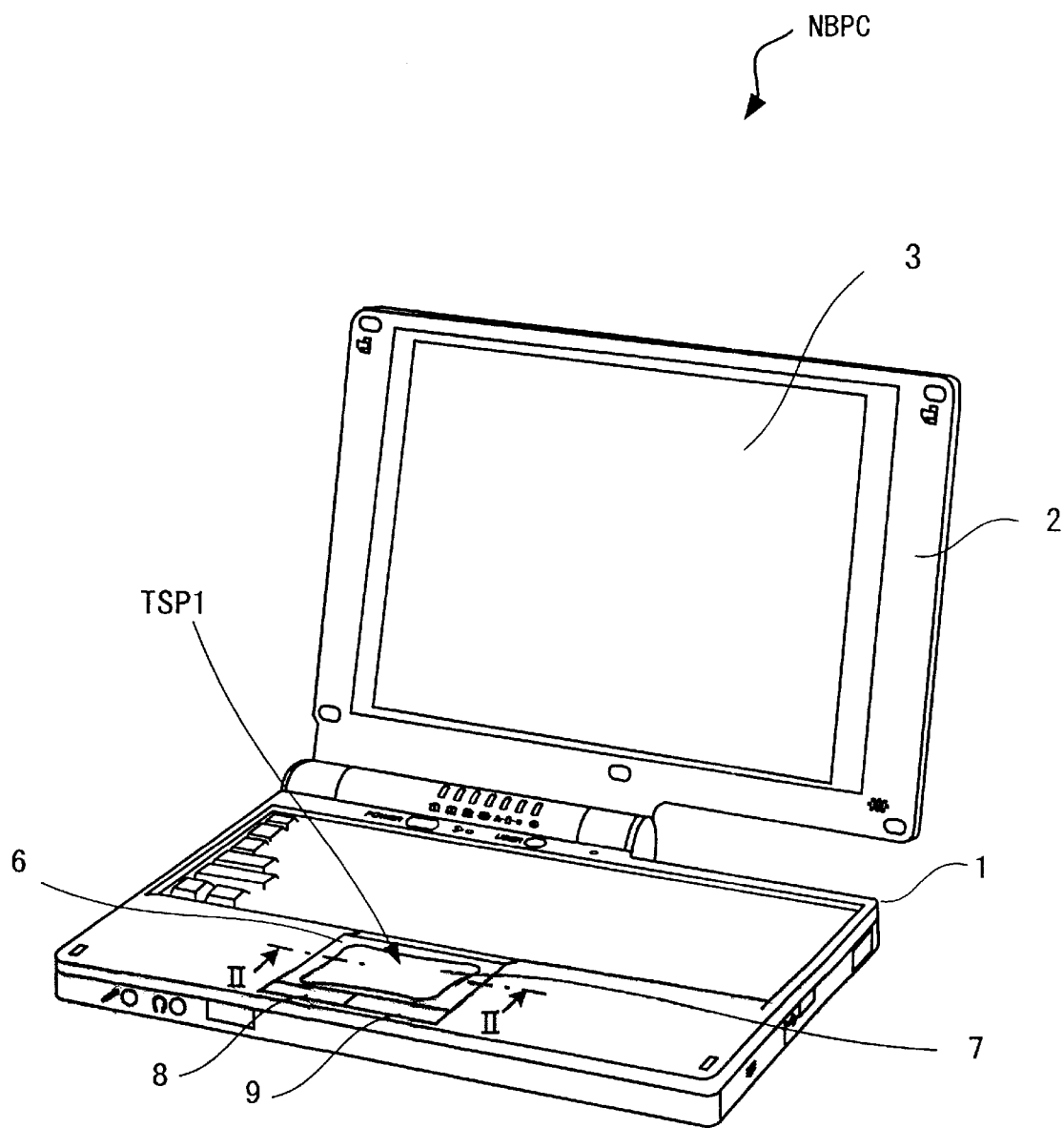
FIG. 1 is a perspective view showing a notebook-type personal computer equipped with a touch-sensitive tablet according to a first embodiment of the present invention.

In FIG. 1, shown is a notebook personal computer equipped with the touch-sensitive tablet according to the first embodiment. A notebook personal computer NBPC includes a personal computer body 1, a display 2, a display screen 3, a keyboard 4, a touch-sensitive tablet TSP1 according to the present embodiment, and left and right click buttons 8 and 9. The touch-sensitive tablet TSP1 is provided in front of the keyboard 4. In the touch-sensitive tablet TSP1, a frame 6 surrounds a touch surface 7.

Figure 2:
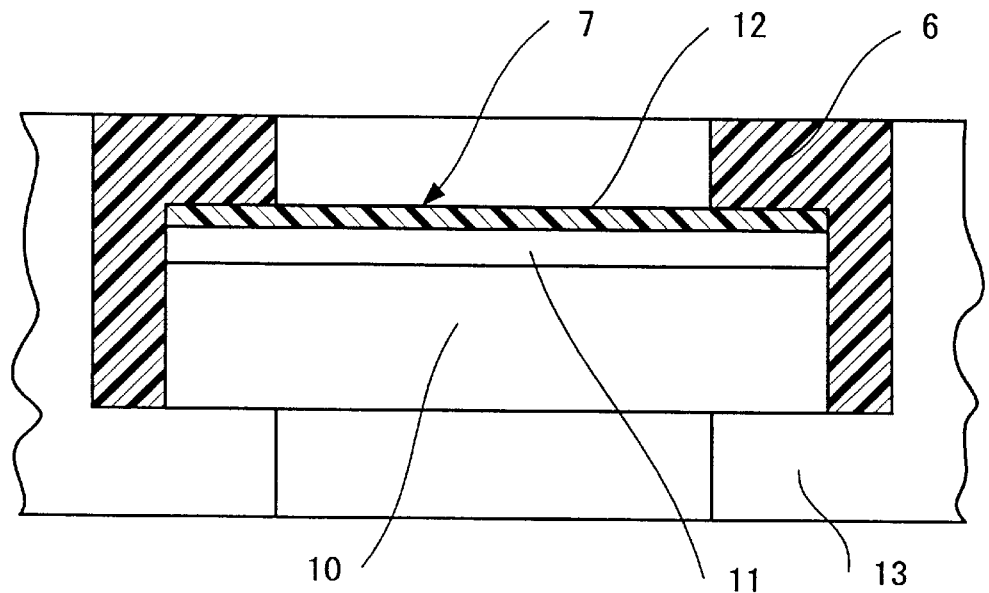
FIG. 2 is a section view taken along a line II—II.

In FIG. 2, shown is a section view taken along a line II—II in FIG. 1 of the touch sensitive tablet TSP1. In the touch-sensitive tablet TSP1, a circuit board 10, a coordinate sensor 11 and a front sheet 12 are held by a cabinet 13 of the personal computer body 1 in the way as shown in FIG. 2. The touch-sensitive tablet TSP1 is formed by laying the front sheet 12 and the coordinate sensor 11 on the circuit board 10. The touch-sensitive tablet TSP1 has the flat touch surface 7 of several centimeters square, and is embedded in a notch provided in the cabinet 13 of the personal computer body 1. The touch surface 7 is surrounded by the frame 6 higher than the touch surface 7, and the surface thereof is covered by the front sheet 12. The front sheet 12 is made of a smooth and opaque film to protect the coordinate sensor 11and makeit invisible. Thecoordinatesensor 11 used in the present embodiment is an electrostatic-capacitive tablet, but may be a tablet of another type such as pressure-sensitive type.

Figure 3:
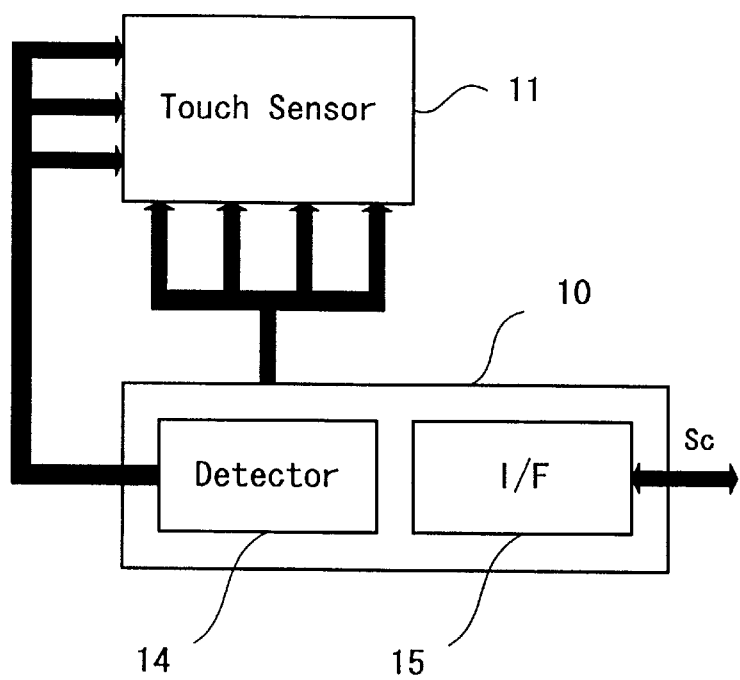
FIG. 3 is a block diagram showing the structure of an electronic circuit in the touch-sensitive tablet in FIG. 1.

In FIG. 3, shown is the structure of an electronic circuit of the touch-sensitive tablet TSP1. In the coordinate sensor 11, sensors are placed in each section of 1024 columns×768 rows. With a finger and the like being placed on the coordinate sensor 11 through the front sheet 12, the capacitance of the touched position on the coordinate sensor 11 decreases. The change in capacitance is converted to a change in current value, thereby sensing the touched position. That is, a detector 14 detects coordinates of the position, on which the coordinate sensor 11 is touched through the front sheet 12, based on an intersection of a horizontal scan line and a vertical scan line of the coordinate sensor 11. The detector 14 then generates a coordinate signal Sc. The coordinate signal Sc is sent to a CPU (not shown) of the personal computer body 1 through an interface 15 and an I/O section (not shown). The coordinate signal Sc supplied from the circuit board 10 indicates absolute coordinates designated by the finger. The CPU judges whether the coordinate signal Sc instructs to move the cursor on the display screen or to execute a function assigned to a specific function region. The CPU then executes an instruction based on the judgement, and causes the display screen 3 to display the execution result.

Referring to front elevational views of the touch-sensitive tablet TSP1 shown in FIGS. 4, 5, 6, 7 and 8, described are various exemplary signs indicating the positions of specific function regions on the coordinate sensor 11 or signs indicating the contents of the functions assigned to the function regions.

Figure 4:
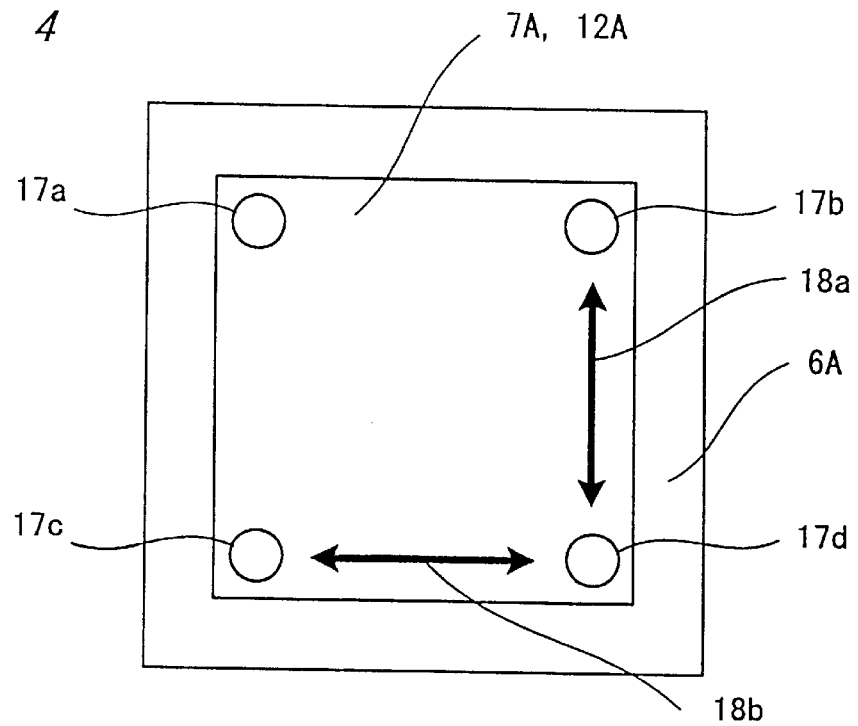
FIG. 4 is a diagram used to describe a first example of signs provided in the touch-sensitive tablet according to the first embodiment of the present invention.

First, in FIG. 4, circles 17a, 17b, 17c and 17d and double-headed arrows 18a and 18b are signs on a touch surface 7A of the touch-sensitive tablet TSP1. Note that the signs 17a to 17d and 18a and 18b are preferably printed on a front sheet 12A, but may be engraved or embossed if the signs are readily recognized by the user and do not interfere with user's input operations. That is, with projections and depressions being provided on the surface of the front sheet 12A, the user can recognize the positions of the signs with the finger and make a blind touch entry.

In FIG. 4, for example, a touch of a finger on the circle 17a in the upper left corner enables execution of the same instruction as a press of an ENTER key. The function of the ENTER key is also assigned to the circle 17b in the upper right corner, the circle 17c in the lower left corner, and the circle 17d in the lower right corner as in the case with the circle 17a. Such function is referred to as "launcher function".

Figure 12:
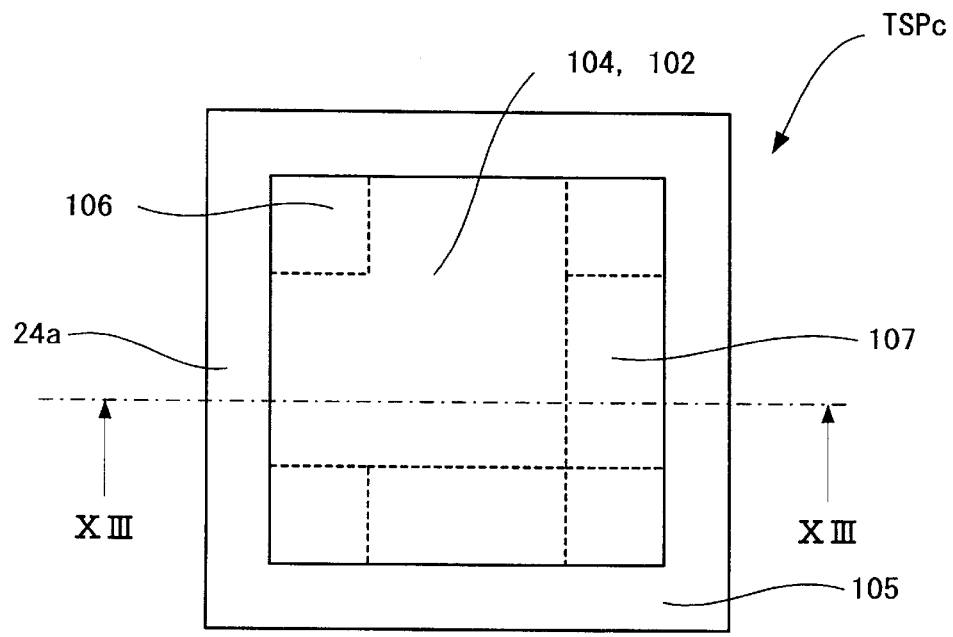
FIG. 12 is a front elevational view showing a touch tablet of the conventional touch-sensitive tablet.
Figure 13:
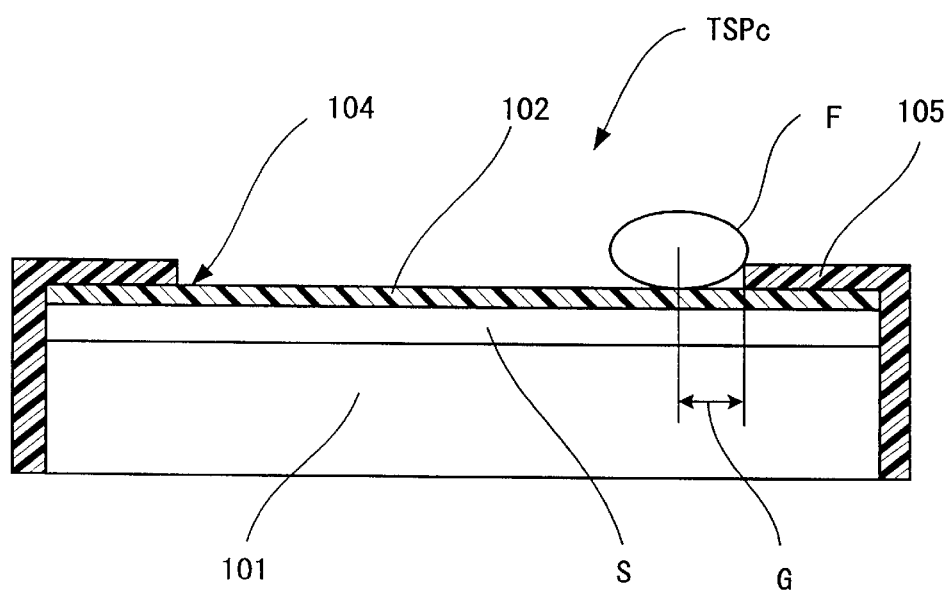
FIG. 13 is a diagram used to describe a state in which a finger manipulates the touch tablet of the conventional touch-sensitive tablet.
Figure 14:
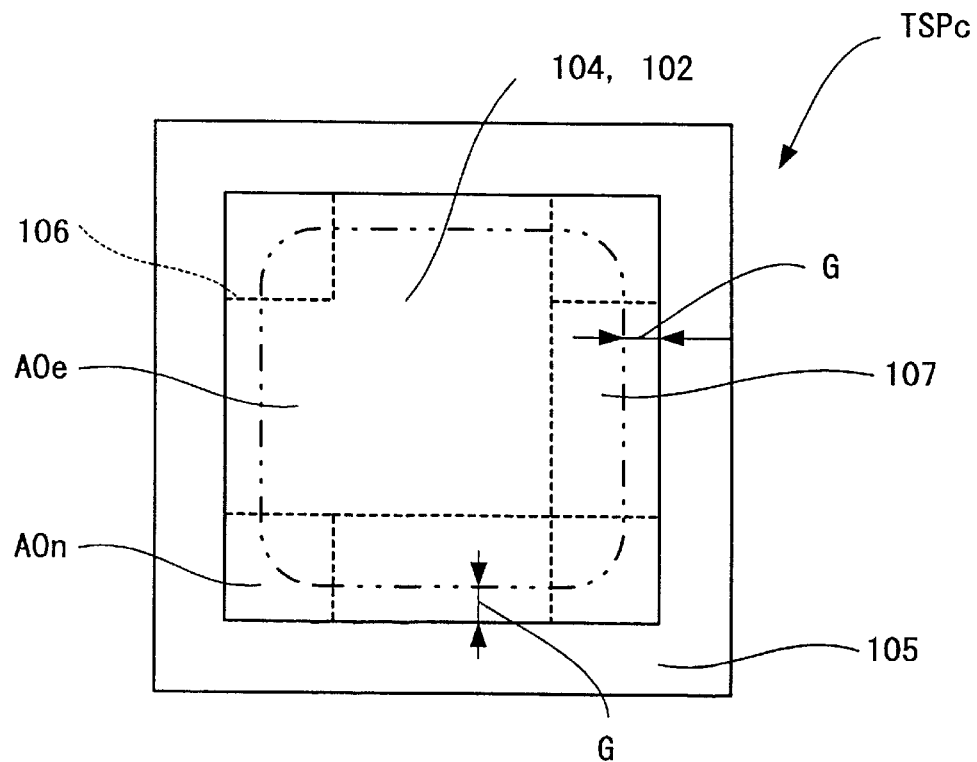
FIG. 14 is a front elevational view showing an effective operational area, i.e., a touchable area in the touch tablet of the conventional touch-sensitive tablet shown in FIG. 12.

The double-headed arrow 18a along the right side of the touch surface 7A is a sign of an up/down scroll function to display the position of the up/down scroll function. From the arrow, the user can understand both of the contents of the function and the region assigned the function. After understanding the meaning of the arrow 18a along the right side, the user can readily recognize without any explanation that the double-headed arrow 18b along the bottom side indicates a sign of a left/right scroll function. As is clear from the comparison with the conventional touch-sensitive tablet TSPc in FIG. 12, the touch-sensitive tablet TSP1 of the present embodiment allows the user to correctly and swiftly make an entry with the aid of the signs on the front sheet 12A.

Figure 5:
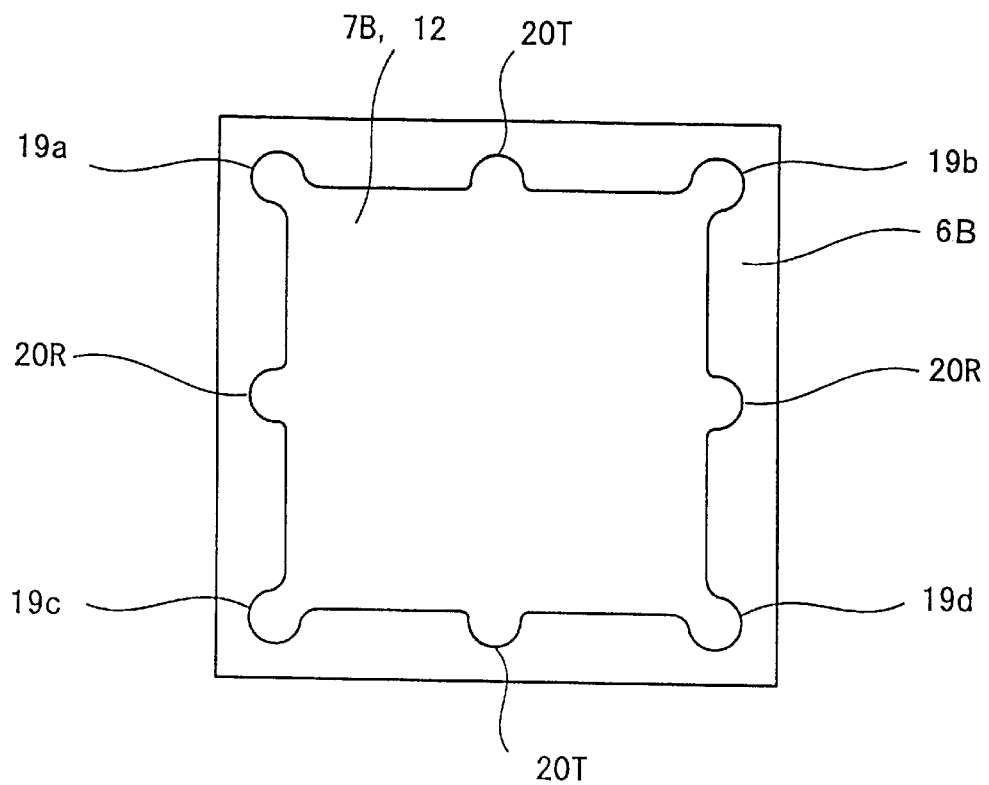
FIG. 5 is a diagram used to describe a second example of signs provided in the touch-sensitive tablet according to the first embodiment of the present invention.

Next, in FIG. 5, shown is an example of providing eight concave-shaped signs provided on the inner periphery of a frame 6B for indicating function regions. Four of the eight signs are provided in the four corners of the frame 6B, as ¾-round notches 19a, 19b, 19c and 19d. The remaining four concave signs are provided on the four sides on the inner periphery of the frame 6B, as half-round notches 20T and 20R. The user can grasp the positions of the function regions by means of these concave signs by moving the finger along the inner periphery of the frame 6B. The user then stops moving the finger on the sign indicative of a desired function among the signs 19a, 19b, 19c, 19d, 20T and 20R, and glides the finger to lightly press the touch surface 7B. Thus, the user can correctly and swiftly enter an instruction for executing the desired function. It is obvious that as described with reference to FIG. 4, the printed signs may be also provided on the front sheet 12 herein to further improve the usability.

Figure 6:
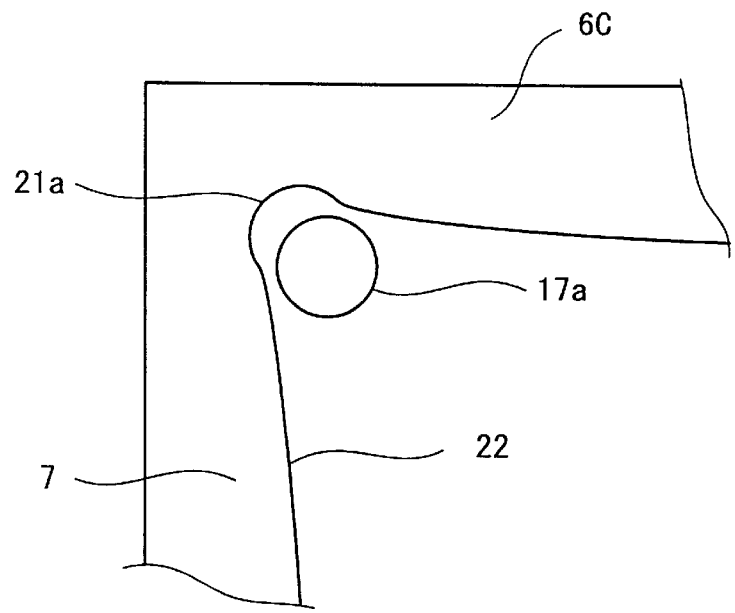
FIG. 6 is a diagram used to describe a third example of signs provided in the touch-sensitive tablet according to the first embodiment of the present invention.

In FIG. 6, shown is an another example of the signs 19a, 19b, 19c and 19d in FIG. 5. In this example, the shape of the ¾-round notches 19a, 19b, 19c and 19d shown in FIG. 5 is changed a little to further facilitate the user's input operation. In the present example, the inner periphery of a frame 6C is formed in a gentle curve, and the four sides thereof jut into the touch surface 7 in the middle. Among the four corners defined by the four curved sides, in the upper left corner, for example, a half-round notch 21a is provided. Unlike the example shown in FIG. 5, the sign 21a is not in about a ¾-round shape but in about a half-round shape. Further, the ends of each half-round notch smoothly join with the sides of the frame 6C. As a result, the inner periphery of the frame 6C (especially at the corners thereof) has no sharp edges and draws a smooth continuous line, in contrast to the example shown in FIG. 4. Accordingly, the user can easily move the finger along the inner periphery of the frame 6C in the above-described configuration. Besides, in normal input operations for moving a cursor, the user can glide the finger along the edge of the frame 6C quite naturally because the frame 6C has no sharp edges.

Figure 7:
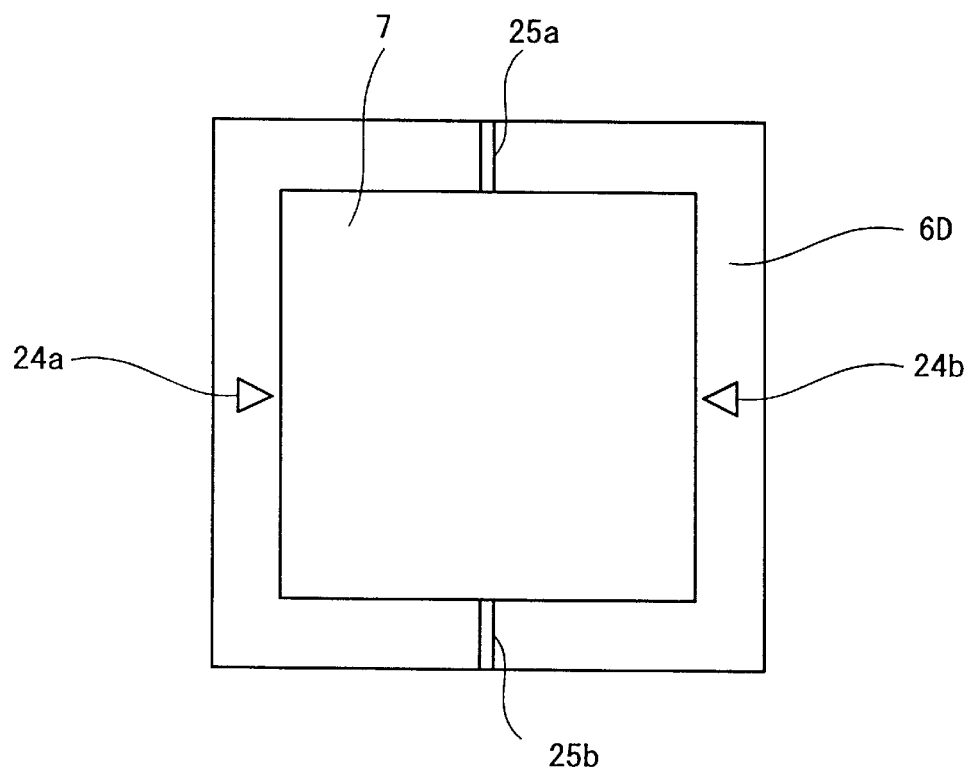
FIG. 7 is a diagram used to describe a fourth example of signs provided in the touch-sensitive tablet according to the first embodiment of the present invention.

In FIG. 7, shown is an example of providing projecting or depressed signs 24a, 24b, 25a and 25b on a frame 6D. Each sign indicates a function region on the touch surface 7 in a corresponding position. Note that the signs 24a, 24b, 25a and 25b may be printed on a sheet and then laminated on the upper surface of the frame 6D.

Figure 8:
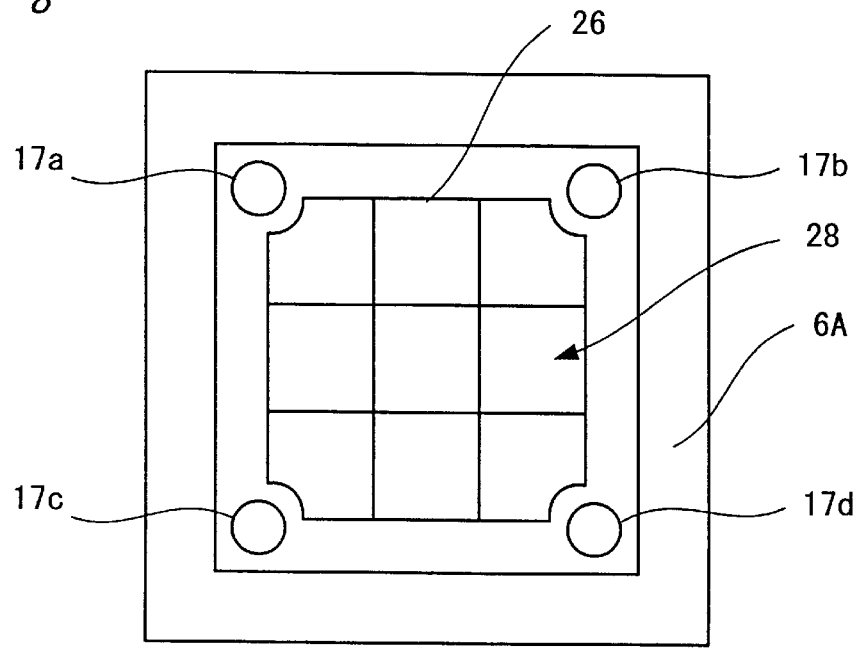
FIG. 8 is a diagram used to describe a fifth example of signs provided in the touch-sensitive tablet according to the first embodiment of the present invention.

In FIG. 8, shown is an example of providing the signs 17a, 17b, 17c and 17d in the four corners of the inner periphery of the frame 6A as shown in FIG. 4 and a grid 26 on the whole surface of the front sheet 12. In the present example, the grid 26 takes the place of the signs of the scroll functions provided along the two sides of the example shown in FIG. 4.

To utilize the feature of the grid 26, it is required to first touch any one of the signs 17a to 17d, for example, to designate the corresponding launcher function region. Then, icons are displayed on the display screen 3 of the notebook personal computer. The displayed icons symbolize functions of application programs by graphics and the like, and are previously set so as to correspond to the pattern of the grid 26. In this example, the icons are arranged in 3 columns×3 rows. The correspondence between regions on the touch-sensitive tablet TSP1 and the icons on the display screen 3 is stored in advance. Now, it is presumed that the icon indicative of a desired application program is in the second column and the third row. When the user touches a region 28 in the touch-sensitive tablet TSP1 corresponding to the icon with the finger while viewing the display screen 3, the desired application program can be launched. Note that in the present embodiment, the method of assigning application programs in relation to icons and launching assigned application programs by manipulating the icons is described in Japanese Patent Application No. 10-244880 assigned to the same assignee of the present application. Everything disclosed in Japanese Patent Application No. 10-244880 is herein incorporated in the present application by reference. According to the present example, it is possible to swiftly select the icon with the aid of the grid 26 on the touch-sensitive tablet TSP1 regardless of the size of the icons on the display screen 3.

Figure 9:
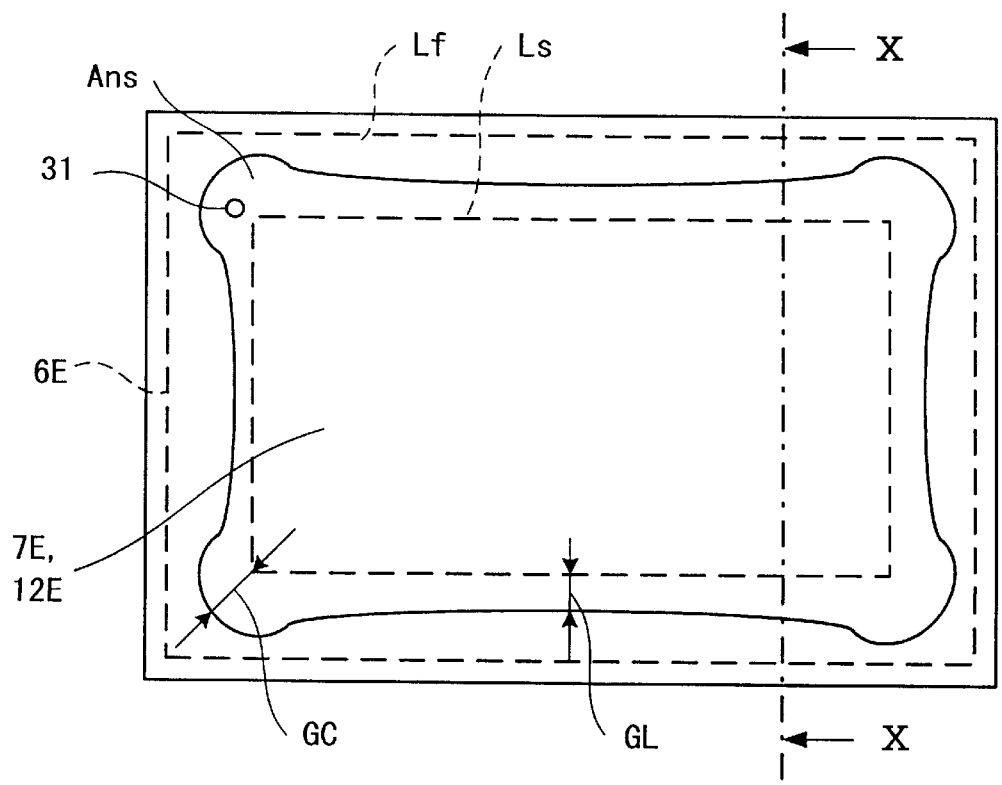
FIG. 9 is a diagram used to describe another example of a frame provided in the touch-sensitive tablet according to the first embodiment of the present invention.
Figure 10:
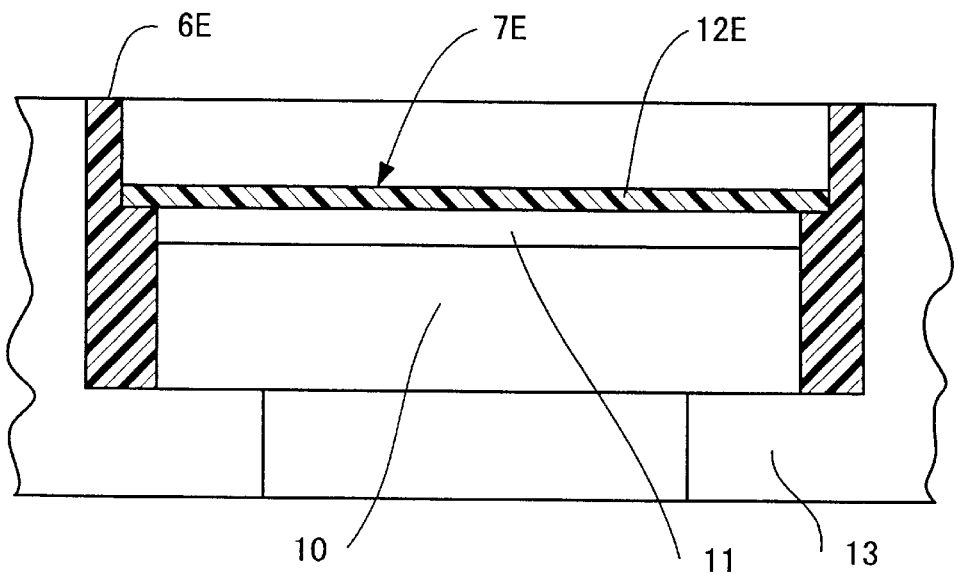
FIG. 10 is a section view taken along a line X—X.
Figure 11:
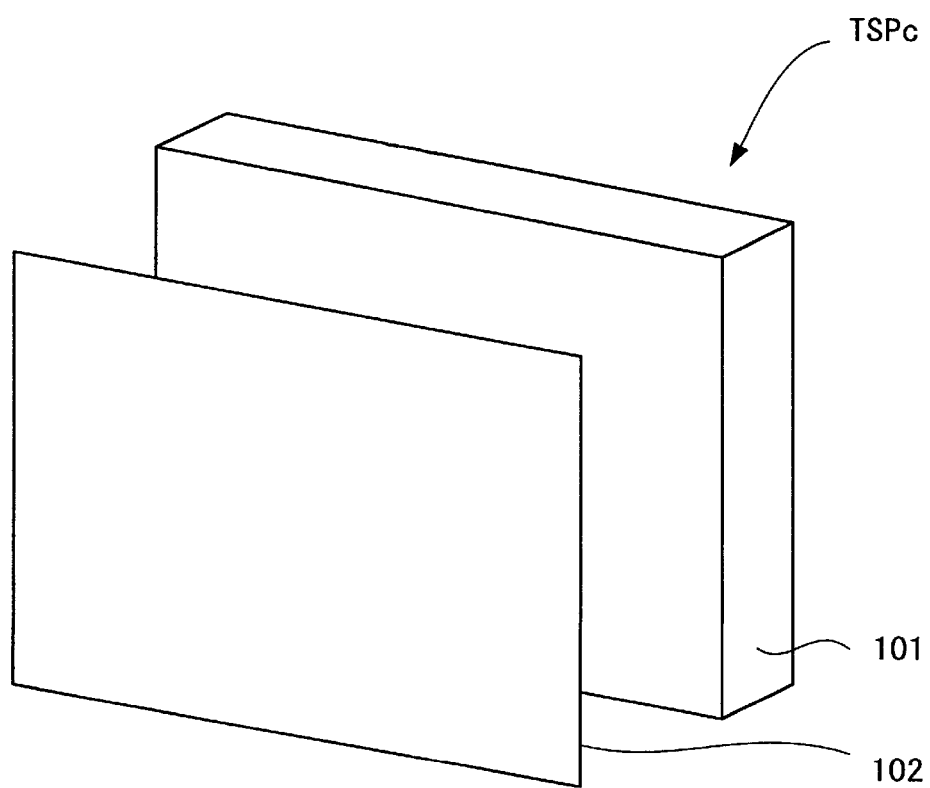
FIG. 11 is a perspective exploded view showing the configuration of a conventional touch-sensitive tablet.

In FIG. 9, shown is an exemplary a frame 6E formed in a curve. In FIG. 9, a dashed line Ls represents an effective sensor area indicating an area where the coordinate sensor 11 of the circuit board 10 can output the coordinate signal according to a user's input operation. A dashed line Lf represents the shape of the front sheet 12 covering the surface of the coordinate sensor 11 of the circuit board 10. According to the present example, as shown in FIG. 9, the inner periphery of the frame 6E makes a curve to jut in a centripetal direction approaching the touch surface 7E in the middle of its four sides and jut in a centrifugal direction leaving from the touch surface 7E at the four corners. In this way, the inner periphery of the frame 6E is placed outside of the effective sensor area Ls. Between the effective sensor area Ls and the frame 6E, provided is a no-sensor area Ans where no coordinate sensors are placed. This solves the problem described above with reference to FIG. 12 that the frame interferes with the movement of the user's finger, in other words, the effective operational area (the touchable area) of the touch tablet is limited and produces waste of the operational area.

Specifically, the no-sensor area Ans is defined such that even when the user's finger gliding on the touch surface 7E is prevented by the frame 6E, the sensors provided at the edge of the touch surface 7E can detect the existence of the user's finger to produce a coordinate signal. That is, the inner periphery of the frame 6E is defined so as to be separated from the edge of the effective sensor area Ls by a predetermined distance G. The distance is referred to as "gap G".

On the inner periphery of the frame 6E (simply referred to below as "frame 6E"), it is essential only that the four sides are substantially separated from the effective sensor area Ls by a predetermined distance GL. The distance on the four sides is referred to as "side gap GL". At the four corners of the frame 6E, however, toward the vertices (corners) defined by two sides, the gap G must be made larger than the side gap GL. Accordingly, the gap G takes a maximum value Gc so that the sensors in the corners of the effective sensor area Ls can detect the user's finger. The gap in the corners of the effective sensor area Ls is referred to as "corner gap Gc". More specifically, when moving the finger to a function region 31 in the corner, it is difficult to push the finger into the corner since the finger is prevented by the two walls of the frame 6E higher than the touch surface 7E. Hence, the frame 6E inwardly juts at the corners of its inner periphery to ensure designation of the function region 31 in the corner.

Thus, the inner periphery of the frame 6E is formed in a gentle continuous line and separated from the effective sensor area Ls by the side gap GL at the minimum, and separated therefrom by the corner gap Gc at the maximum. Between the inner periphery of the frame 6E and the effective sensor area Ls, there is an area including no sensors, that is, the no-sensor area Ans. Accordingly, the shapes of the no-sensor area Ans and the inner periphery of the frame 6E are appropriately determined by the shape of the effective sensor area Ls, the shape of the user's finger, the height of the frame 6E from the touch surface 7E, and the shape of the inner periphery of the frame 6E. Further, unlike at the four corners, in the middle of the individual four sides of the frame 6E, only one side wall stands in the way of the finger, thereby allowing the finger to easily approach to the edge of the touch surface 7E. Accordingly, the no-sensor area Ans can be basically small along the sides of the frame 6E. Moreover, as described with reference to FIG. 6, the four sides of the frame 6E inwardly jut so as to let the finger move smoothly.

It is obvious that the permissible size of the no-sensor area Ans varies depending on the height of the frame 6E, the thickness of the finger, the sensitivity of the coordinate sensor and other conditions. Therefore, the size of the no-sensor area Ans must be obtained by experiment so as to avoid misoperation. In the touch-sensitive tablet TSP1 in FIG. 9, in the four corners, the effective operational area is as large as that of a coordinate sensor substantially a size larger than the coordinate sensor 11. Therefore, the finger can reliably designate the function region 31 in the corner. Further, the touch surface 7E is surrounded by the round frame 6E, which prevents the finger from being snagged on the corners even in normal input operations for moving a cursor.

The present invention is not limited to the signs described in the above embodiment. For example, in place of the signs, audio can be used for giving information. Specifically, with sensitive sensors being placed in a predetermined position on the frame, a touch of a finger and the like on the predetermined position provides information by audio. Further, in place of the front sheet, a liquid crystal panel can be placed on the front surface of the touch-sensitive tablet. In this case, the signs can be displayed on a liquid crystal display screen and changed to others according to the setting of the touch-sensitive tablet, thereby further improving the usability.

Moreover, in the case where the sensor area on the circuit board 10 is sufficiently wide and at high resolution, the no-sensor area Ans may be made small or omitted so that the frame 6E covers part of the effective sensor area Ls.

Second Embodiment

With reference to FIGS. 15, 16, 17, 18, 19, 20, 21 and 22, described is a touch-sensitive tablet according to a second embodiment of the present invention. The touch-sensitive tablet according to the present embodiment is devised in order to attain the second object of the present invention in the above-stated Description of the background art.

Figure 15:
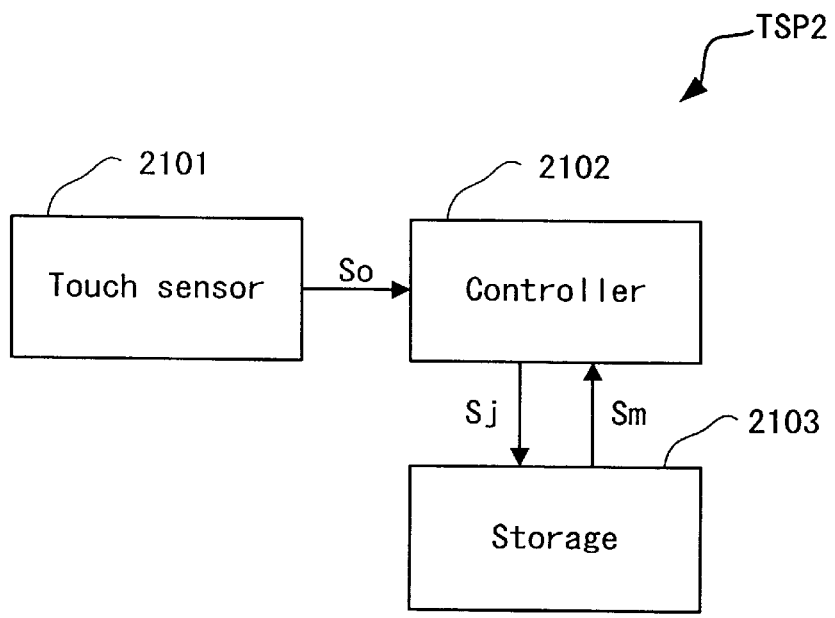
FIG. 15 is a block diagram showing the configuration of a touch-sensitive tablet according to a second embodiment of the present invention.

Referring to a block diagram in FIG. 15, first described is the configuration of a touch-sensitive tablet TSP2 according to the present embodiment. The touch-sensitive tablet TSP2 includes a touch-sensor 2101, a controller 2102, and a storage 2103.

The touch sensor 2101 detects a tap and movement of a finger an d the like thereon. Note that the above-described touch-sensitive tablet TSP1 according to the first embodiment is preferably employed as the touch sensor 2101. Besides, any touch-sensitive tablet having a launcher function can be used as the touch sensor 2101. The touch sensor 2101 is provided with function regions each assigned a function.

The storage 2103 contains specific operations to be executed for realizing the functions assigned to the function regions.

Referring to FIG. 20, description is made below of the relation between the function regions in the touch sensor 2101 and the operations stored in the storage 2103.

In FIG. 20, the first row at the left end provides "position" of each function region on the touch surface of the touch sensor 2101. The second row in the middle provides coordinates of "region", i.e., each function region on the touch surface of the touch sensor 2101. The third row at the right end provides "operation" assigned to each function region. Note that the touch sensor 2101 in FIG. 20 has an effective area expressed by a resolution of 1024 wide by 768 long and function regions each expressed by a resolution of 100 wide by 100 long by way of example.

Specifically, the region, specified by coordinates (0, 0)–(100, 100), in the upper left corner on the touch tablet of the touch sensor 2101 is assigned a function of displaying a menu.

Similarly, the region, specified by coordinates (462, 0)–(562, 100), at the upper center of the touch surface of the touch sensor 2101 is assigned a function of launching a mailing software;

the region, specified by coordinates (924, 0)–(1024, 100), in the upper right corner of the touch surface of the touch sensor 2101 is assigned a function of setting an access point;

the region, specified by coordinates (0, 668)–(0, 768), in the lower left corner of the touch surface of the touch sensor 2101 is assigned a function of maximizing/restoring display of an active window;

the region, specified by coordinates (462, 668)–(562, 768), at the lower center of the touch surface of the touch sensor 2101 is assigned a function of displaying a menu for an active window; and the region, specified by coordinates (924, 668)–(1024, 768), in the lower right corner of the touch surface of the touch sensor 2101 is assigned a function of closing an active window.

Referring back to FIG. 15, the controller 2102 detects tapping quickly performed twice (hereinafter referred to as "double tap" or "double tapping") within or in the periphery of one of the function regions on the touch surface of the touch sensor 2101. The controller 2102 then retrieves a function assigned to the double-tapped function region, such as application program and a window operation, from the storage 2103. Then the controller 2102 executes the retrieved function.

Figure 16:
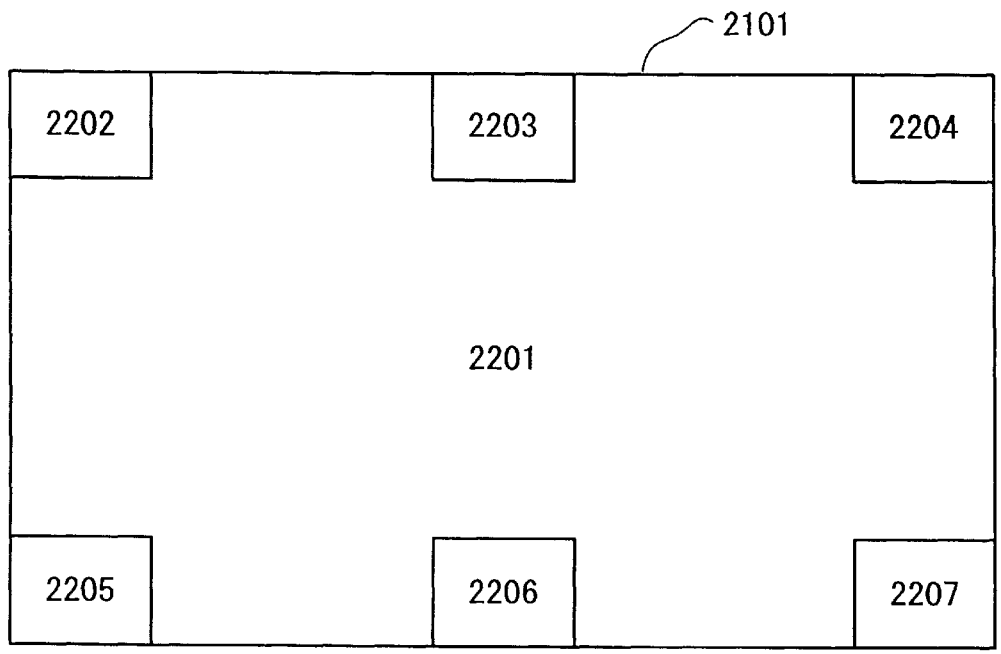
FIG. 16 is a top plan view showing exemplary double tap function regions provided on a touch tablet shown in FIG. 15.

Next, referring to FIG. 16, described are individual function regions on the touch surface of the touch sensor 2101. To a function region 2201, assigned are functions corresponding to a normal cursor moving operation and normal tap processing. To function regions 2202, 2203, 2204, 2205, 2206 and 2207, assigned are functions corresponding to double tap processing which is different from the above-described normal operations. In other words, when user's double tapping is recognized in each of these function regions 2202 to 2207, the operation (function) assigned to the function region, such as launch of an application program and a window operation, is executed. Note that when single tapping is recognized in the function regions 2202 to 2207, or when double tapping is recognized in the region other than the function regions 2202 to 2207, the normal cursor moving operation or the single tap processing may be executed.

Figure 17:
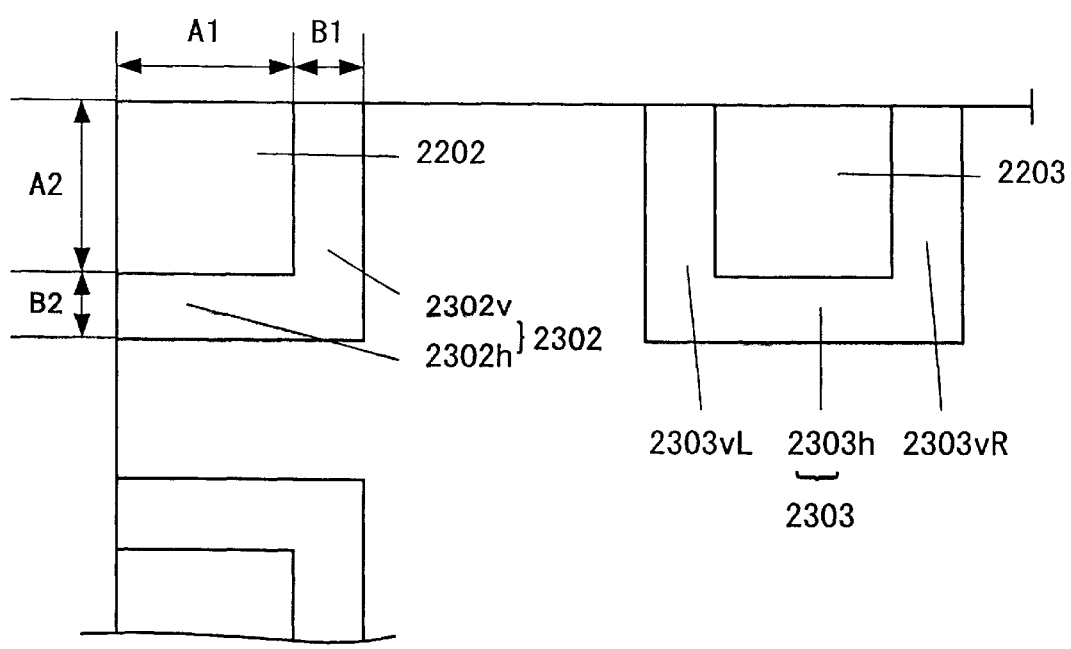
FIG. 17 is an illustration of the double tap function regions shown in FIG. 16 and surrounding regions thereof.

Referring to an enlarged view of the function region 2202 and the proximity thereof in FIG. 17, description is made of the function regions 2202 to 2207, each assigned specific function in connection with double tapping. These function regions 2202 to 2207 are referred to below as "double tap function regions" to distinguish from the function region 2201.

In this example, the double tap function region 2202 is formed in a rectangle defined by an altitude A2 and a width A1. Around the double tap function region 2202, a surrounding region 2302 is provided in contact with the double tap function region 2202. The surrounding region 2302 is shaped like a belt having a predetermined width. Specifically, the surrounding region 2302 is constituted by a horizontal belt region 2302*h* and a vertical belt region 2302*v*. The horizontal belt region 2302*h* having an altitude B2 (A2>B2) elongates laterally in parallel to the double tap function region 2202. The vertical belt region 2302*v* having a width B1 (A1>B1) elongates longitudinally in parallel to the double tap function region 2202.

It is to be noted that the horizontal belt region 2302*h* laterally elongates by a total length of the width A1 of the double tap function region 2202 and the width B1 of the vertical belt region 2302*v*. Similarly, the vertical belt region 2302*v* longitudinally elongates by a total length of the altitude A2 of the double tap function region 2202 and the altitude B2 of the horizontal belt region 2302*h*.

As described above, the surrounding region 2302 is defined as the periphery of the double tap function region 2202 to be provided around the double function region 2202. The width A1 and altitude A2 of the double tap function region 2202 and the width B1 and altitude B2 of the surrounding region 2302 are respectively set at appropriate values according to the properties of the touch-sensitive tablet.

Note that the above description is made of the surrounding region provided around the double tap function region, taking the example of the double tap function region 2202 in the upper left corner of the touch surface of the touch sensor 2101. Likewise, around the double tap function regions 2204, 2205 and 2207 in the upper right corner, the lower left corner, and the lower right corner of the touch surface of the touch sensor 2101, surrounding regions 2304, 2305 and 2307 are respectively provided although not shown in the drawing. Specifically, the surrounding region 2304 is constituted by a vertical belt region 2304*v* longitudinally elongated in parallel to the double tap function region 2204 and a horizontal belt region 2304*h* laterally elongated in parallel to the double tap function region 2204; the surrounding region 2305 is constituted by a vertical belt region 2305*v* longitudinally elongated in parallel to the double tap function region 2205 and a horizontal belt region 2305*h* laterally elongated in parallel to the double tap function region 2205; and the surrounding region 2307 is constituted by a vertical belt region 2307*v* longitudinally elongated in parallel to the double tap function region 2207 and a horizontal belt region 2307*h* laterally elongated in parallel to the double tap function region 2207.

Besides, around the double tap function regions 2203 and 2206 in the middle of the sides of the touch surface of the touch sensor 2101, surrounding regions 2303 and 2206 are similarly provided although not shown in the drawing. Unlike the surrounding regions 2302, 2304, 2305 and 2307, the surrounding region 2303 is constituted by vertical belt regions 2303*v*L and 2303*v*R respectively longitudinally elongated in parallel to the both sides of the double tap function region 2203 and a horizontal belt region 2303*h* laterally elongated in parallel to the double tap function region 2203; and the surrounding region 2306 is constituted by vertical belt regions 2306*v*L and 2306*v*R respectively longitudinally elongated in parallel to the both sides of the double tap function region 2206 and a horizontal belt region 2306*h* laterally elongated in parallel to the double tap function region 2206.

It should be noted that the double tap function regions can be placed in arbitrary positions of the touch surface of the touch sensor 2101 although not shown in FIG. 16.

Accordingly, depending on the positions of the double tap function regions, the surrounding regions thereof are each constituted by horizontal belt regions and vertical belt regions necessary to surround the entire double tap function region. Note that the function regions 2202 to 2207 are expressed in rectangles by way of example in the above description, but may take another shape such as an oval.

Figure 18:
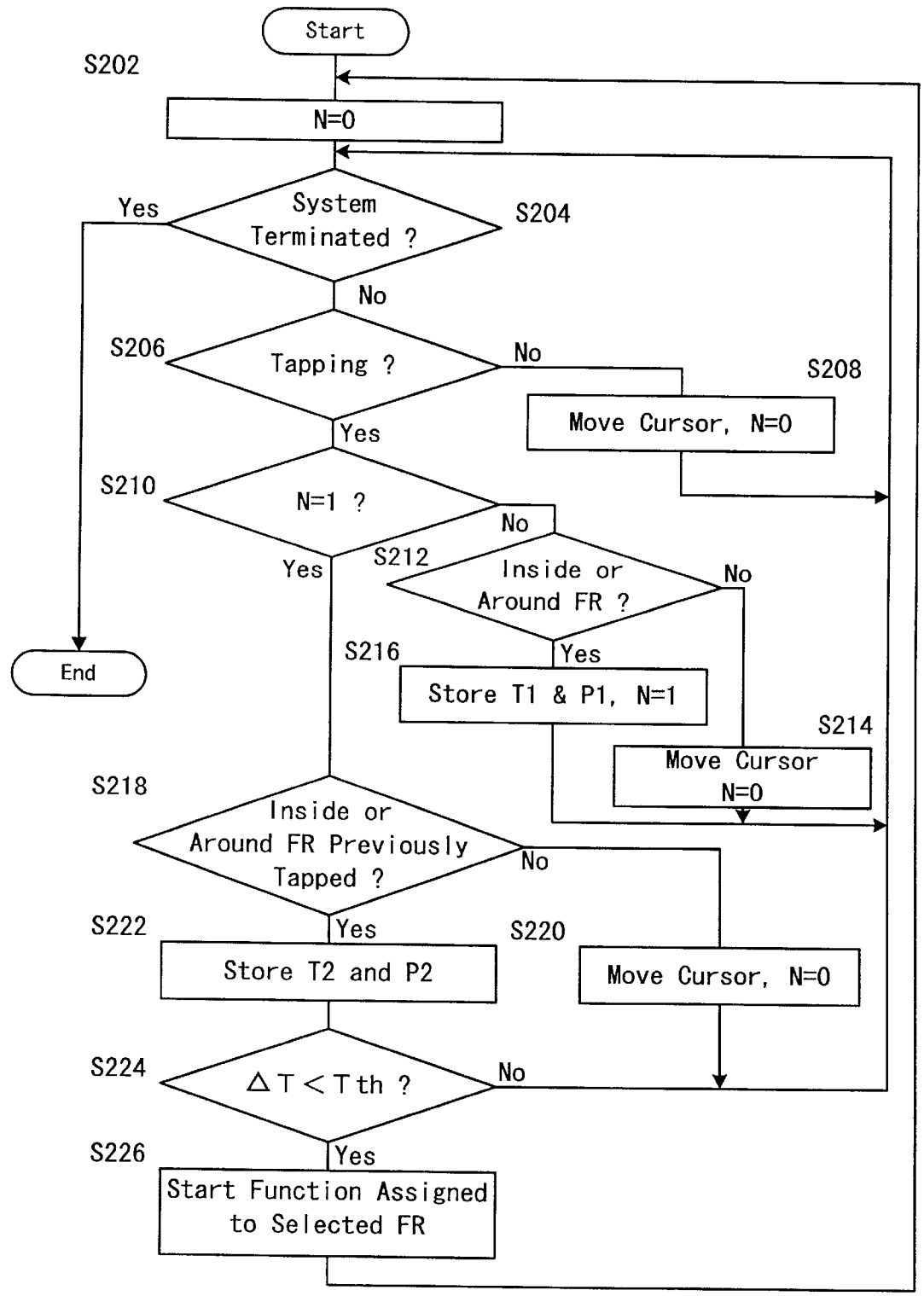
FIG. 18 is a flow chart delineating the operation of the touch-sensitive tablet shown in FIG. 15.

Referring to a flowchart shown in FIG. 18, described is processing in the touch-sensitive tablet TSP2 in response to user's double tapping. After the touch-sensitive tablet TSP2 is powered up, the operation thereof is started.

In step S202, a tap detection flag N indicating whether tapping is detected or not is initialized to 0. Note that the tap detection flag N indicates 0 when no tapping is detected, and 1 when tapping is detected. Then the procedure advances to next step S204.

In step S204, it is determined whether the system is terminated or not, i.e., whether control for double tapping is terminated or not. If step S204 returns Yes, the procedure ends. To the contrary, if step S204 returns No, the procedure advances to next step S206.

In step S206, it is determined whether a user's input operation on the touch surface of the touch sensor 2101 is tapping or not. If it is determined that the input operation is not tapping, the procedure advances to step S208.

In step S208, the processing is performed based on the determination that the user gives an instruction for a normal cursor moving operation. Specifically, the touch-sensitive tablet TSP2 causes a cursor on a display screen (not shown) to move according to the user's input operation. The procedure then loops back to step S204.

On the other hand, if the user's input operation is tapping as a result of the determination in step S206, the procedure advances to step S210.

In step S210, whether the tap detection flag N is 1 or not is determined. If the tap detection flag N is not 1, meaning that no control has been performed yet for the detected tapping, the result of step S210 is No. Then, the procedure advances to step S212.

In step S212, it is determined whether a tapped position (X, Y), where the tapping is detected, is within or in the periphery of any one of the double tap function regions (FR) on the touch surface of the touch sensor 2101 or not. Note that the periphery of the double tap function region here means a region within the surrounding region provided around the double tap function region described with reference to FIG. 17. If the first tapping is not performed within one of the double tap function regions or the surrounding region thereof, the result of step S212 is No. Then, the procedure advances to step S214.

Instep S214, the processing on normal tapping is performed. At the same time, the tap detection flag N is set at 0. The procedure then loops back to step S204.

On the other hand, if the first detected tapping is performed within one of the double tap function regions or the surrounding region thereof, the result of step S212 is Yes. The procedure then advances to step S216. In this case, the tapping is presumed to designate a specific double tap function region.

In step S216, a first tapping time T1 and coordinates (X1, Y1) of a first tapped position P1 are stored. The first tapping time T1 represents the time when the tapping is first detected. The first tapped position P1 represents the position where the tapping is first detected. Besides, the tap detection flag N is set at 1. Then the procedure loops back to step S204.

On the other hand, if step S210 returns Yes, i.e., the tap detection flag N is set at 1 in step S216, the procedure advances to step S218.

In step S218, it is determined whether a position (X, Y) tapped this time is within the double tap function region or the surrounding region thereof presumed to include the first tapped position (X1, Y1) stored in step S216. If the result of step S218 is No, it is possible to regard that the second tapping does not designate the specific double tap function region presumed in step S216 to be designated by the first tapping. Although the user's first tapping is presumed in step S216 to designate the specific double tap function region, the user's input operation is eventually judged here as unintentional and erroneous input operation. The procedure then advances to step S220.

In step S220, as in step S214, the processing on normal tapping is performed, and the tap detection flag N is set at 0. That is, the first tapping is ignored, and the normal processing on the present tapping is performed. The procedure then loops back to step S204.

On the other hand, if the result of step S218 is Yes, it is possible to regard that the second tapping designates the specific double tap function region presumed in step S216 to be designated by the first tapping. In other words, it is determined that the user presumably tries to designate the double tap function region with two continuous tappings. Then, the procedure advances to next step S222.

In step S222, as in step S216, a second tapping time T2 and coordinates (X2, Y2) of a second tapped position P2 are stored. The second tapping time T2 represents the time when the present tapping is detected this time. The second tapped position P2 represents the position where the tapping is detected this time. Note that the tap detection flag N is still set at 1. The procedure then advances to step S224.

In step S224, a time difference ΔT between the first tapping time T1 and the second tapping time T2 is calculated. Then, it is determined whether the obtained time difference ΔT is smaller than a predetermined time, i.e., a threshold Tth, or not. The threshold Tth is a time value appropriately set based on a time interval between two tappings performed to designate a specific region with double tapping. If the time difference ΔT is not less than the threshold Tth, the result of step S224 is No. Then, the procedure loops back to step S204.

To the contrary, if the result of step S224 is Yes, it is judged that the user performs double tapping to designate the double tap function region presumed in step S216 to be designated by the user's tapping. The procedure then advances to step S226.

In step S226, the operation corresponding to the function assigned to the function region designated by the user's double tapping is retrieved from the storage 2103. Then, the function is executed. For example, when the function region 2202 shown in FIG. 16, i.e., the upper left corner is designated, a menu as is apparent from the example in FIG. 20 is displayed.

Moreover, invalidation of the processing in steps S214, S220 and S226 prevents an accidental input to the specific regions on the touch-sensitive tablet easily touchable with a finger and the like during a keyboard entry or other occasions.

Figure 19:
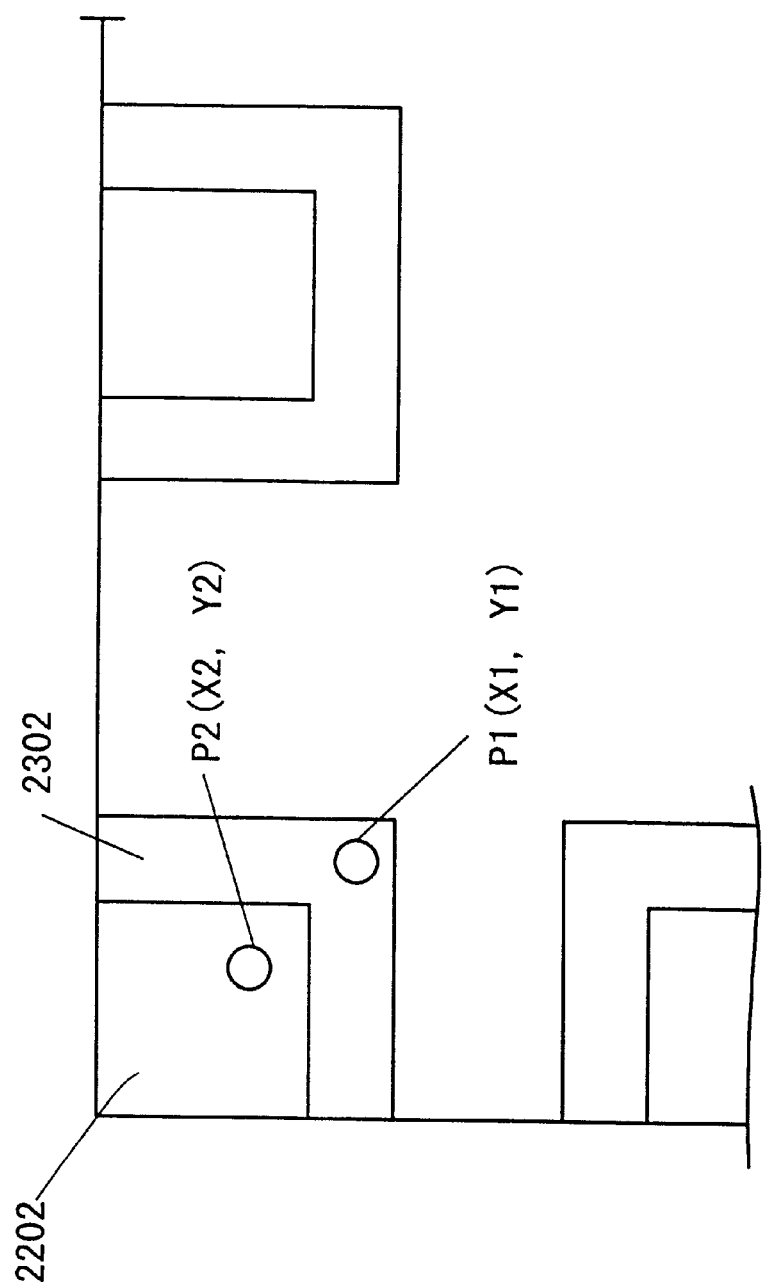
FIG. 19 is an illustration of exemplary positions tapped by a user for selecting a double tap function region.

In FIG. 19, shown is exemplary two positions tapped to select the double tap function region 2202 in the upper left corner in FIG. 16. P1 represents a position (X1, Y2) where tapping is first performed and exists within the surrounding region 2302. P2 represents a position (X2, Y2) where tapping is performed in the second time and exists within the double tap function region 2202. In this case, at least one of the tapped positions, i.e. P2 exists within the double tap function region 2202, and the both of the tapped positions P1 and P2 exist within the double tap function regions 2202 or the surrounding region 2302. Accordingly, the upper left corner is selected.

(Alternative of Second Embodiment)

Figure 21:
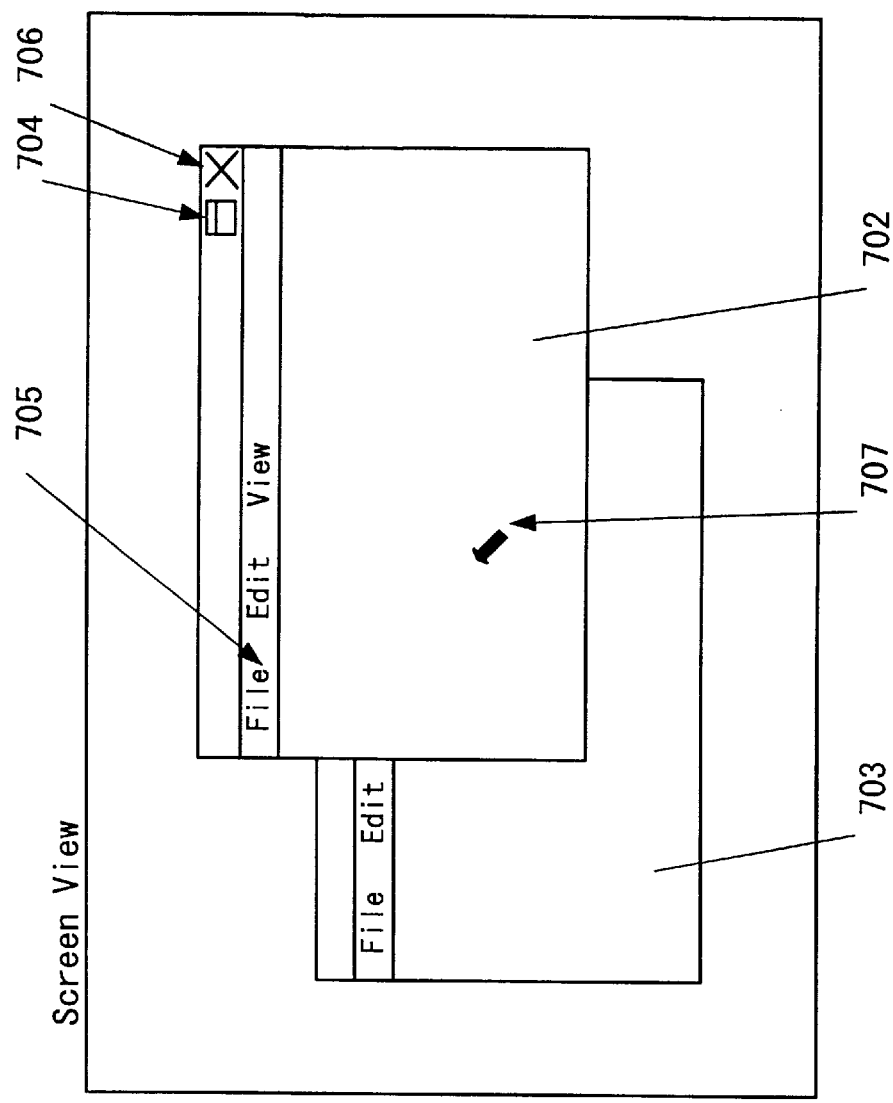
FIG. 21 is an illustration of a window operation performed in an alternative of the touch-sensitive tablet shown in FIG. 15.
Figure 22:
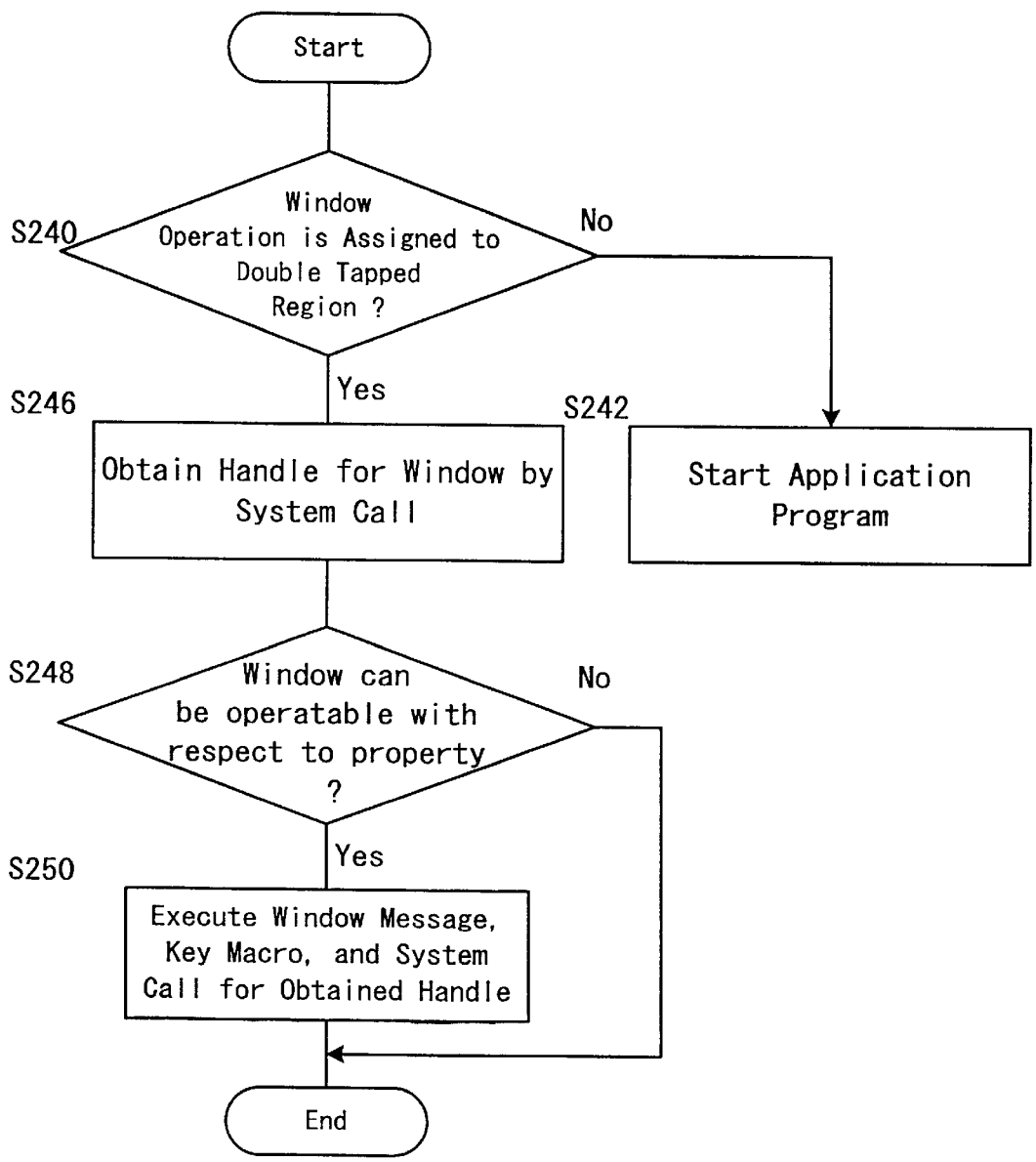
FIG. 22 is a flow chart delineating the operation of touch-sensitive tablet shown in FIG. 21.

Referring to FIGS. 21 and 22, description is made below of an alternative of the above-described touch-sensitive tablet TSP2 according to second embodiment of the present invention. Note that in the present alternative, two tappings enable execution of a window operation, not launch of an application program. The configuration and operation of the alternative are identical to those described with reference to the FIGS. 15, 16, 17, 18 and 19. Therefore, description below is made about only the difference therebetween.

In FIG. 20, shown are exemplary window operations assigned to the function regions in the touch sensor 2101. Specifically, the lower left corner, the lower center portion, and the lower right corner are assigned functions of "maximizing/restoring an active window", "displaying a menu for an active window", and "closing an active window".

In FIG. 21, shown is an exemplary display screen of a display (not shown) of a personal computer incorporating the touch-sensitive tablet TSP2. On the display screen, a first window 703 and a second window 702 are displayed. The second window 702 has a focus, and is displayed over the first window 703. With respect to the active second window, it is possible to execute operations, such as maximizing 704, displaying a menu 705 and closing 706, without moving a cursor 707.

Referring to a flow chart shown in FIG. 22, described is the procedure for performing a window operation.

In step S240, it is determined whether a double tapped region is assigned an operation for an active window, or not (such operation is equivalent to one of the operations stored in the storage 2103 for the regions in the lower left corner, the lower center portion, and lower right corner in FIG. 20). If a window operation is not assigned, that is, an operation of launching an application program is assigned, the result of step S240 is No. Then, the procedure advances to step S242.

In step S242, the application program is launched.

To the contrary, if the result of step S240 is Yes, that is, a window operation is assigned, the procedure advances to next step S246.

In step S246, an identification handle of the window is obtained by means of system call and the like. The procedure then advances to next step S248.

In step S248, it is determined whether the window specified by the identification handle obtained in step S246 is operable with respect to the property. If step S248 returns No, the procedure ends. Otherwise, the procedure advances to next step S250.

In step S250, a window message for executing the window operation is provided to the identification handle. Further, a key macro and a system call are executed for the identification handle. Thus, the same processing as the window operation selected by the user is performed.

Although in the above description, the operations for an active window is explained by way of example, operations for the entire system can be also performed irrespective of the focus window.

Third Embodiment

Referring to FIGS. 23 to 55, description is made below of a touch-sensitive tablet according to a third embodiment of the present invention. Note that a touch-sensitive tablet TSP3 according to the present embodiment is devised so as to further improve the following points specific to the above-described touch-sensitive tablet TSP2 according to the second embodiment.

In the touch-sensitive tablet TSP2, it is required to tap the specific function region (the double tap function region) successively twice within the predetermined time (the threshold value Tth). It is difficult for a user to perfectly operates the touch-sensitive tablet TSP2 as intended, due to the user's skill and the sensitivity of the sensor used therein.

Further, in the touch-sensitive tablet TSP2, only a single function is assigned to each specific function region. Moreover, the specific function regions are substantially limited to the four corners of the touch surface since the specific function regions must be set in the regions unlikely to be used in normal cursor moving operations.

Hence, the present embodiment provides the touch-sensitive tablet TSP3 capable of assigning a plurality of functions to one function region. To this end, the touch-sensitive tablet TSP3 has first specific regions provided in the four corners of a touch sensor thereof and second specific regions provided around the first specific regions. Each function is assigned to a combination of one of the first specific regions and one of the second specific regions.

Figure 23:
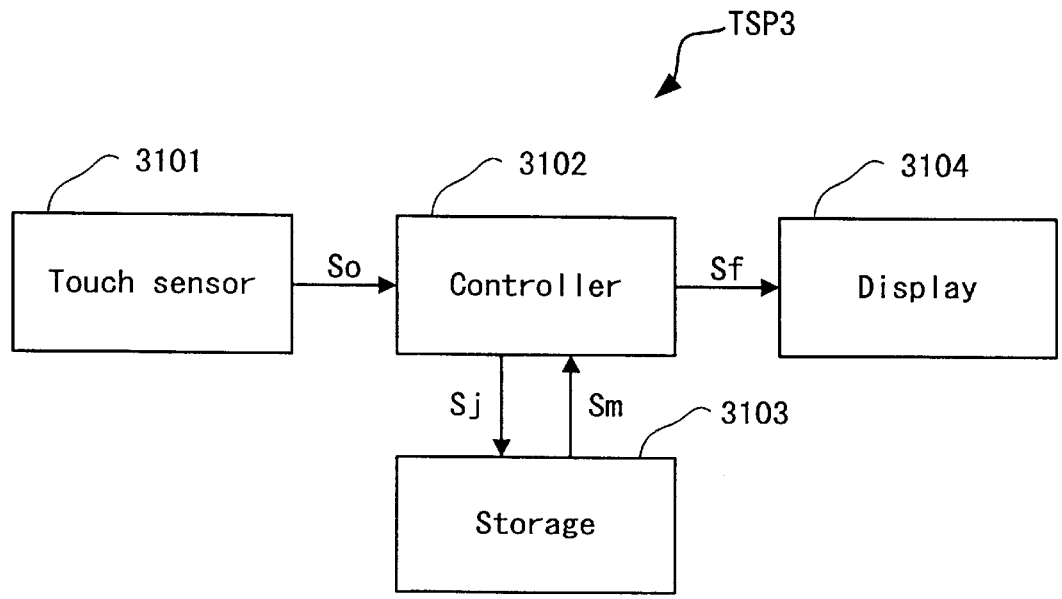
FIG. 23 is a block diagram showing the configuration of a touch-sensitive tablet according to a third embodiment of the present invention.

Referring to a block diagram in FIG. 23, described is the configuration of the touch-sensitive tablet TSP3. The touch-sensitive tablet TSP3 includes a touch sensor 3101, a controller 3102, a storage 3103, and a display 3104. The touch sensor 3101 detects, based on a user's input operation with the finger and the like, a tap (lightly tapping a touch tablet of the touch sensor 3101), a touch (touching the touch tablet of the touch sensor 3101), an untouch (moving a finger and the like off the touch tablet of the touch sensor 3101), or other various actions as shown in Table 1 described later. The touch sensor 3101 then generates an input operation signal So, and sends the signal So to the controller 3102. It is obvious that the input operation signal So includes information about finger movement on the touch sensor 3101.

Based on the input operation signal So, the controller 3102 detects information about change of coordinates of a position where a touch is made by a finger and the like on the touch sensor 2101. The controller 3102 judges the contents of the user's input operation based on the detected information about change of coordinates. The controller 3102 generates a judgement signal Sj indicative of the judged user's input operation, and sends the signal Sj to the storage 3103. The user's input operation indicated by the judgement signal Sj is presented in Table 2 shown later.

The storage 3103 previously contains therein a list of functions to be executed (Table 3 shown later), and a table showing correspondence between the judgement signal Sj and the operations thereof (Table 4 shown later). The storage 3103 checks Table 3 and Table 4 on receipt of the judgement signal Sj from the controller 3102, and sends an operation execution signal Sm indicative of an operation number to the controller 3102.

Based on the operation execution signal Sm, the controller 3102 performs processing on the corresponding function. The controller 3102 then generates a function execution signal Sf indicative of the processing result, and sends the signal Sf to the display 3104.

Based on the function execution signal Sf, the display 3104 displays the result of the processing of the controller 3102, i. e., the result of the user's input operation as images.

Figure 24:
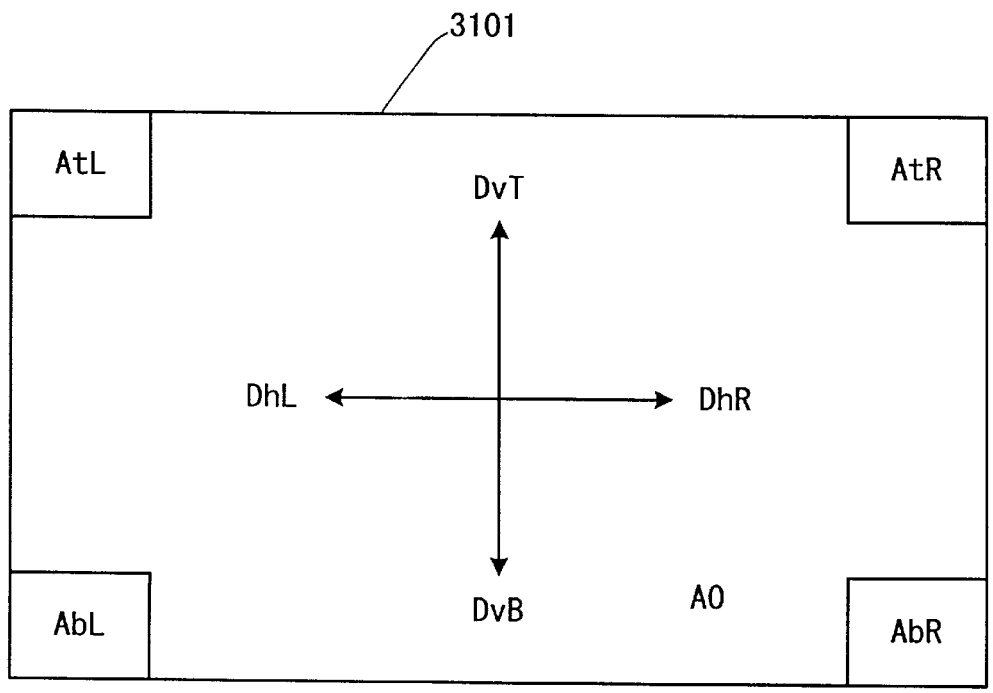
FIG. 24 is a top plan view of a touch sensor shown in FIG. 23.

Referring to a top plan view of the touch sensor 3101 shown in FIG. 24, described are exemplary function regions provided on the touch sensor 3101. In the four corners of an action detectable region AO of the touch sensor 3101, provided are function regions AtL, AtR, AbL and AbR, respectively. The function regions AtL, AtR, AbL and AbR are inside the action detectable region AO to be starting points of user's input operations.

A finger and the like is moved from one of the function regions to another region along the surface of the action detectable region A0. That input operation enables execution of a particular operation different from a normal cursor moving operation (for example, an operation such as launching an application, and maximizing, minimizing and closing a window). Note that the size (the width and altitude) of the function regions AtL, AtR, AbL and AbR is appropriately decided according to the sensitivity of the touch-sensitive tablet TSP3 (the touch sensor 3101) and the s kill and habits of the user.

While in FIG. 24, the function regions AtL, AtR, AbL and AbR are each represented in a rectangle shape for convenience in recognition, such representation is not necessarily required. Besides, for better recognition, it is assumed that the direction longitudinally parallel to the touch sensor 3101 is a horizontal direction Dh, and the direction perpendicular to the horizontal direction Dh is a vertical direction Dv as shown in FIG. 24.

Further, to indicate the direction of movement of a finger and the like in more detail, suffixes T, B, L and R are respectively added to the directions Dh and Dv. Specifically, it is assumed that the suffix T stands for movement from bottom to top, the suffix B for movement from top to bottom, the suffix L for movement from right to left and the suffix R for movement from left to right. That is, directions are expressed as the upward direction DvT, the downward direction DvB, the left direction DhL, and the right direction DhR, respectively.

Next, referring to the above-mentioned Table 1, Table 2, Table 3 and Table 4, briefly described is the operation of the above-described touch-sensitive tablet TSP3. Firstly, Table 1 is shown below.

TABLE 1

| So | Operation | Position/coordinates |
| --- | --- | --- |
| So1 | Tap | Tapped position/coordinates |
| So2 | Touch | Touched position/coordinates |
| So3 | Untouch | Untouched position/coordinates |

As illustrated in Table 1 the input operation signal So is constituted by input operation subsignals So1 to So3. While the input operation subsignals So1 to So3 are illustrated in Table 1 by way of example, it is obvious that the arbitrary number No (No is a positive integer) of operation subsignals, i.e., operation subsignals So1 to SoNo can be defined according to the type of user's input operations to be identified.

The input operation subsignal So1 is generated upon detection of an action lightly tapping the touch sensor 3101 with a finger and the like once (hereinafter referred to as "tap" or "tapping"). The input operation subsignal So1 includes information indicating that the touch sensor 3101 is tapped and coordinate information of the tapped position in the touch sensor 3101.

The input operation subsignal So2 is generated when a user touches the touch sensor 3101 (hereinafter referred to as "touch" or "touching"). The input operation subsignal So2 includes information indicating that the touch sensor 3101 is touched and coordinate information of the touched position in the touch sensor 3101.

The input operation subsignal So3 is generated when the finger in touch with the touch sensor 3101 is moved off the touch surface thereof (hereinafter referred to as "untouch" or "untouching"). The input operation subsignal So3 includes information indicating that the touch sensor 3101 is untouched and coordinate information of the position in the touch sensor 3101 where the finger is moved off.

The above-mentioned Table 2 is shown below, and then the contents thereof is briefly described.

TABLE 2

| Sj | Input operation |
| --- | --- |
| Sj1 | Move right from function region AtL |
| Sj2 | Move down from function region AtL |
| Sj3 | Move left from function region AtR |
| Sj4 | Move down from function region AtR |
| Sj5 | Move right from function region AbL |
| Sj6 | Move up from function region AbL |
| Sj7 | Move left from function region AbR |
| Sj8 | Move up from function region AbR |
| Sj9 | Double-tap function region AtL |
| Sj10 | Double-tap function region AtR |
| Sj11 | Double-tap region AbL |
| Sj12 | Double-tap region AbR |

*double tap: to quickly tap the same region twice in a row

As illustrated in Table 2, the judgement signal Sj is constituted by judgement subsignals Sj1 to Sj12. The judgement signal Sj indicates the contents of a user's input operation identified by the controller 3102. Specifically, the judgement signal Sj identifies the contents of a user's operation, based on the input operation signal So (input operation subsignals), according to the information about the type of the user's operation such as tap, touch, or untouch, and the coordinate information in the touch sensor 3101 shown in Table 1. Although the judgement subsignals Sj1 to Sj12 are illustrated in Table 2 by way of example, it is obvious that the arbitrary number Nj (Nj is a positive integer) of judgement subsignals, i.e., judgement subsignals Sj1 to SjNj can be defined according to user's operations to be identified.

The judgement subsignal Sj1 indicates that the user first touches the function region AtL and moves the finger and the like in the right direction (DhR).

The judgement subsignal Sj2 indicates that the user first touches the function region AtL and moves the finger in the downward direction (DvB).

Likewise, the judgement subsignal Sj3 indicates a user's input operation starting from the function region AtR in the left direction (DhL); and the judgement subsignal Sj4 indicates a user's input operation staring from the function region AtR in the downward direction (DvB).

The judgment subsignal Sj5 indicates a user's input operation starting from the function region AbL in the right direction (DhR); and the judgement subsignal Sj6 indicates a user's input operation starting from the function region AbL in the upward direction (DvT).

The judgement subsignal Sj7 indicates a user's input operation starting from the function region AbR in the left direction (DhL); and the judgement subsignal Sj8 indicates a user's input operation starting from the function region AbR in the upward direction (DvT).

It should be noted that the judgement subsignals Sj9 to Sj12 indicates that the function regions AtL, AtR, AbL and AbR are quickly tapped twice in a row (i.e., double-tapped), respectively.

The above-mentioned Table 3 is shown below, and then the contents thereof is briefly described.

TABLE 3

| R | Operation | Description |
| --- | --- | --- |
| R1 | Menu display | Display menu for active application program and move mouse cursor to top entry of menu |
| R2 | Context menu display | Display menu according to state of application program currently pointed by mouse cursor |
| R3 | Start menu | Display menu for entire system |
| R4 | Close | Terminate active application program |
| R5 | Maximization/ Restore | When active application program is maximized, re-size to normal size, and otherwise, maximize active application program |
| R6 | Minimization | Minimize active application (reduce to icon) |
| R7 | Minimize all windows | Minimize all currently-displayed windows (reduce to icons) |
| R8 | System end | Display end images of system |
| R9 | Launch application program | Launch registered application program |
| R10 | Operation selecting menu | Display images for selecting above-described operations |

As illustrated in Table 3, the storage 3103 previously contains therein operations in connection with operation numbers R. Such operations can be realized by user's input operations in the function regions AtL, AtR, AbL and AbR of the touch sensor 3101 of the touch-sensitive tablet TSP3.

For example, the operation corresponding to an operation number R1 is menu display to display a menu for an active application program and to move a mouse cursor onto an entry at the top of the menu.

Subsequent operation numbers R2 to R10 are defined in the same way. It is needless to say that a new function can be added by increasing the definitions of operations in Table 3.

The above-mentioned Table 4 is shown below, and then the contents thereof is briefly described.

TABLE 4

| Sj | R |
| --- | --- |
| Sj1 | R1 |
| Sj2 | R2 |
| Sj3 | R7 |
| Sj4 | None |
| Sj5 | None |
| Sj6 | R3 |
| Sj7 | None |
| Sj8 | None |
| Sj9 | R10 |
| Sj10 | R9 |
| Sj11 | R5 |
| Sj12 | R4 |

As illustrated in Table 4, the storage 3103 previously contains therein a table showing correspondence between the above-mentioned judgement subsignal Sj1 to SjNj and the operations represented by the above-mentioned operation numbers R. That is, Table 4 is a list of functions corresponding to the respective judgement subsignals Sj1 to Sj12 indicative of the user's input operations in the function regions AtL, AtR, AbL and AbR.

By checking Table 4 against Table 3, it is possible to identify the functions corresponding to the judgement subsignals Sj1 to Sj12 indicative of the user's input operations in the touch sensor 3101. For example, from Table 4, it is possible to find that the judgement subsignal Sj3 corresponds to the operation represented by the operation number R7. It is apparent from Table 3 that the operation number R7 represents the function of minimizing all windows.

In the same manner, it is possible to identify the functions corresponding to the judgement subsignal Sj1 to Sj12. Note that the function assigned to each input operation in each region can be changed to another by changing the correspondence table of Table 4. Further, in Table 4, no operation is assigned to the judgement subsignals Sj4, Sj5, Sj7 and Sj8.

Figure 25:
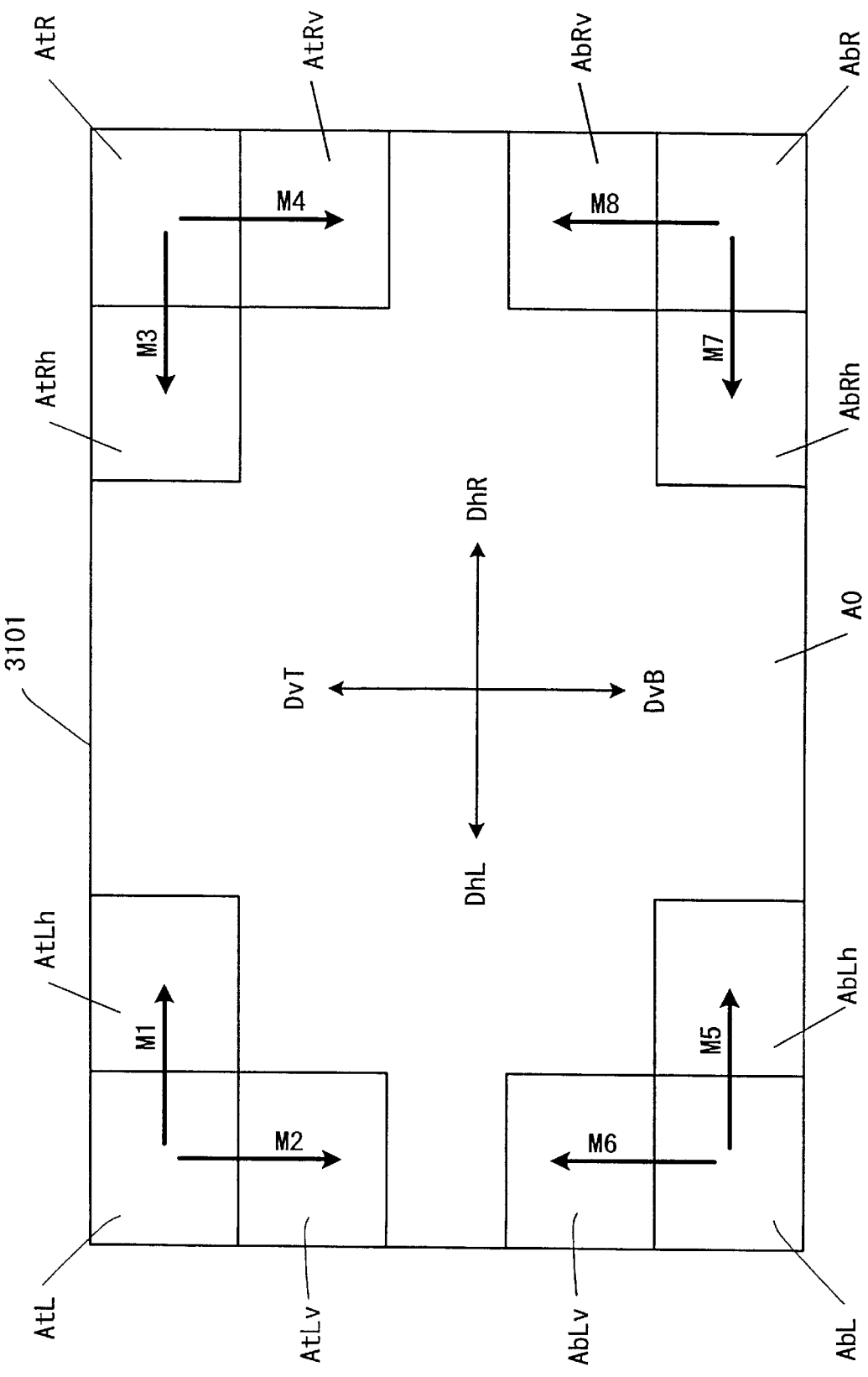
FIG. 25 is an enlarged view of the touch sensor shown in FIG. 24 depicting input operations therein.

Referring to an enlarged top plan view of the touch sensor 3101 in FIG. 25, described are user's input operations starting from the function regions AtL, AtR, AbL and AbR, respectively. As shown in FIG. 25, with regard to input operations starting from the function region AtL, two regions are provided contiguously to the function region AtL to detect the direction of each input operation. One of the two regions is a horizontal movement detecting region AtLh provided contiguously to the function region AtL in the horizontal direction in FIG. 25. The other region is a vertical movement detecting region AtLv provided contiguously to the function region AtL in the vertical direction.

Similarly, around the function region AtR, contiguously provided are a horizontal movement detecting region AtRh and a vertical movement detecting region AtRv;

around the function region AbL, contiguously provided are a horizontal movement detecting region AbLh and a vertical movement detecting region AbLv; and around the function region AbR, contiguously provided are a horizontal movement detecting region AbRh and a vertical movement detecting region AbRv.

In FIG. 25, arrows M1 to M8 schematically show the direction of user's input operation along the surface of the touch sensor 3101. It is assumed that the finger movement shown by the arrows M1 to M8 is referred to as "user's operation" for the sake of convenience. Besides, the arrows M1 to M8 are referred below to as "input operations M1 to M8". Although the input operations M1 to M8 are illustrated linearly in FIG. 25, the input operations M1 to M8 trace the movement of the actual user's operations in reality.

Now, description is made of a user's operation of gliding the finger from the function region AtL. The input operation M1 represents a user's operation of touching the function region AtL. The input operation M1 further represents a user's operation of moving the finger and the like in the right direction DhR to the function region AtLh along the touch surface of the touch sensor 3101. In the input operation M1, the first touched position on the touch surface (the action detectable region AO) of the touch sensor 3101 is defined as a starting point of touch. Information about the finger movement, detected by the controller 3102, successively made from the starting point along the touch surface is defined as continuous touch information ITc.

Likewise, the input operation M2 represents that the user's finger first touches the function region AtL and then moves in the downward direction DvB to the function region AtLv along the touch sensor 3101. In the input operation M2, the first touched position on the touch surface (the action detectable region AO) of the touch sensor 3101 is defined as a starting point of touch. Information about the finger movement, detected by the controller 3102, from the starting point along the touch surface is defined as continuous touch information ITc.

Figure 26:
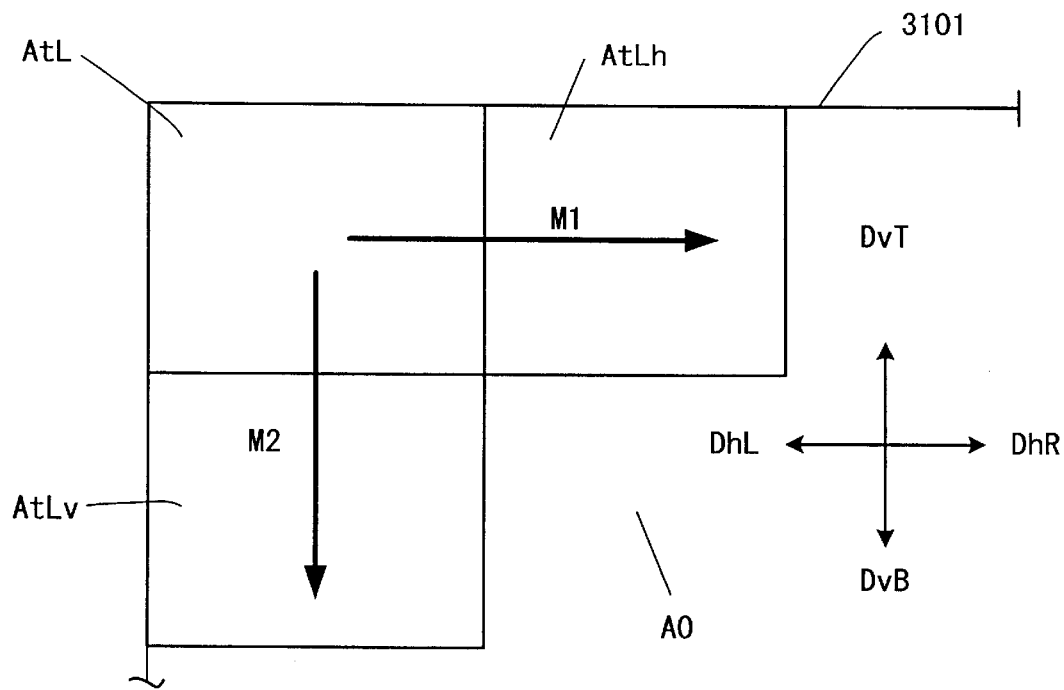
FIG. 26 is a diagram used to describe the input operations performed in a function region in the touch sensor shown in FIG. 25.

Referring to an enlarged view of the vicinity of the function region AtL in FIG. 26, described are the above-mentioned input operations M1 and M2 more specifically.

The input operation M1 is not recognized until the user's finger and the like, touching the function region AtL, is moved in the right direction DhR to reach the horizontal movement detecting region AtLh.

The input operation M2 is not recognized until the user's finger and the like, touching the function region AtL, is moved in the downward direction DvB to reach the vertical movement detecting region AtLv. The input operations M3 to M8 shown in FIG. 25 are similarly defined. Then, as illustrated in Table 5 shown below, the judgement subsignals Sj1 to Sj8 corresponding to the input operations M1 to M8, respectively, are sent from the controller 3102 to the storage 3103. The shape and size of the horizontal movement detecting regions AtLh, AtRh, AbLh and AbRh and the vertical movement detecting regions AtLv, AtRv, AbLv and AbRv are appropriately decided according the sensitivity of the touch sensor 3101 of the touch-sensitive tablet TSP3 and the skill and habits of the user.

The above-mentioned Table 5 is shown below, and the contents thereof is briefly described.

TABLE 5

| Operation | Signal |
|---|---|
| M1 | Sj1 |
| M2 | Sj2 |
| M3 | Sj3 |
| M4 | Sj4 |
| M5 | Sj5 |
| M6 | Sj6 |
| M7 | Sj7 |
| M8 | Sj8 |

As shown in Table 5, in response to the input operations M1 to M8 detected in the touch sensor 3101, the controller 3102 provides the storage 3103 with the judgement subsignals Sj1 to Sj8. Upon detection of the input operation M1 in the touch sensor 3101, the judgement subsignal Sj1 is sent to the storage 3103 to indicate the user's operation of touching the function region AtL and moving the finger in the right direction DhR. Similarly, Table 5 shows that the input operations M2 to M8 correspond to the judgement subsignals Sj2 to Sj8, respectively.

Figure 27:
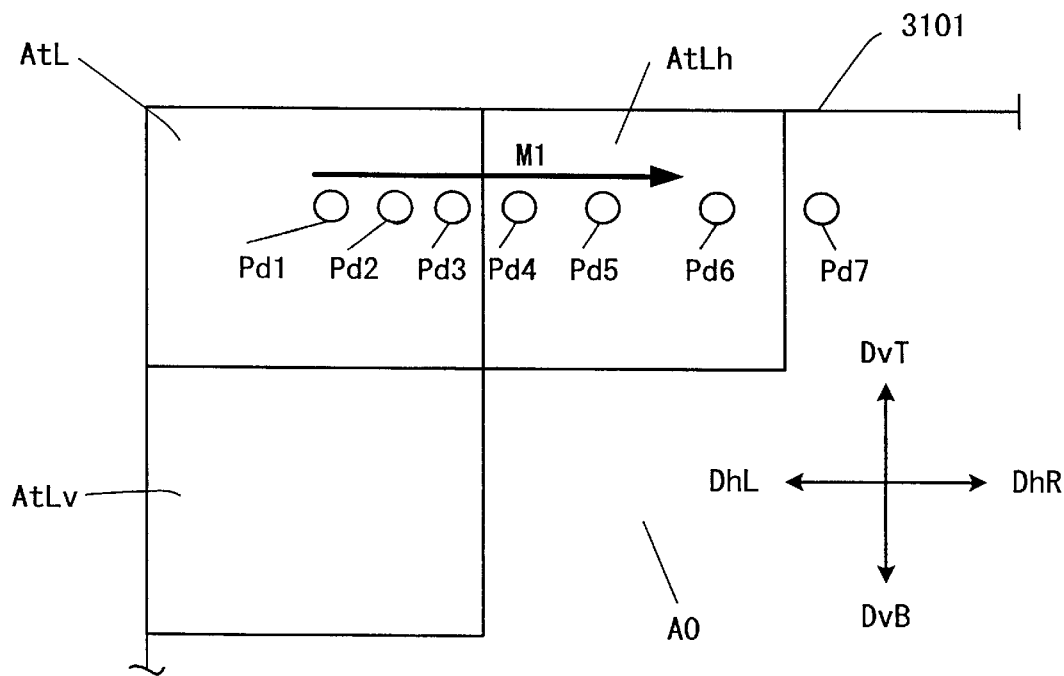
FIGS. 27, 28, 29 and 30 are diagrams used to describe various exemplary methods of detecting timing for starting operations in the function region shown in FIG. 26.

Referring to FIG. 27, described is the continuous touch information ITc for the input operation M1. As shown in FIG. 27, the input operation M1 is supplied from the touch sensor 3101 to the controller 3102 in the form of the above-mentioned input operation signal So. The input operation signal So is generally discontinuous. That is, the input operation M1 is detected as a group of a plurality of detection points, for example, detection points Pd1 to Pd7 in FIG. 27 in reality. The detection points Pd1 to Pd7 are detected at a predetermined time interval. Note that FIG. 27 shows the aligned detection points Pd1 to Pd7, however, the detection points Pd1 to Pd7 are, in reality, arranged in the shape of the movement of the input operation M1 which traces the movement of the actual user's operation. The continuous touch information ITc includes coordinate information of the detection points Pd1 to Pd7 and time information about when the detection points Pd1 to Pd7 are detected.

The controller 3102 recognizes at the detection point Pd1 that the user's finger and the like first touches the function region AtL as a starting point. Based on the detection points Pd2 and Pd3 within the function region AtL, the controller 3102 recognizes that the finger keeps moving, but does not judge whether the user's operation is directed to the right direction DhR or the downward direction DvB.

Since the detection point Pd4 is within the horizontal movement detecting region AtLh, the controller 3102 judges that in a series of user's operations in the input operation M1, the user moves the finger and the like from the function region AtL in the right direction DhR. At this stage, it is possible to execute one of the functions assigned to the function region AtL in response to the user's operation performed in the right direction DhR.

Figure 28:
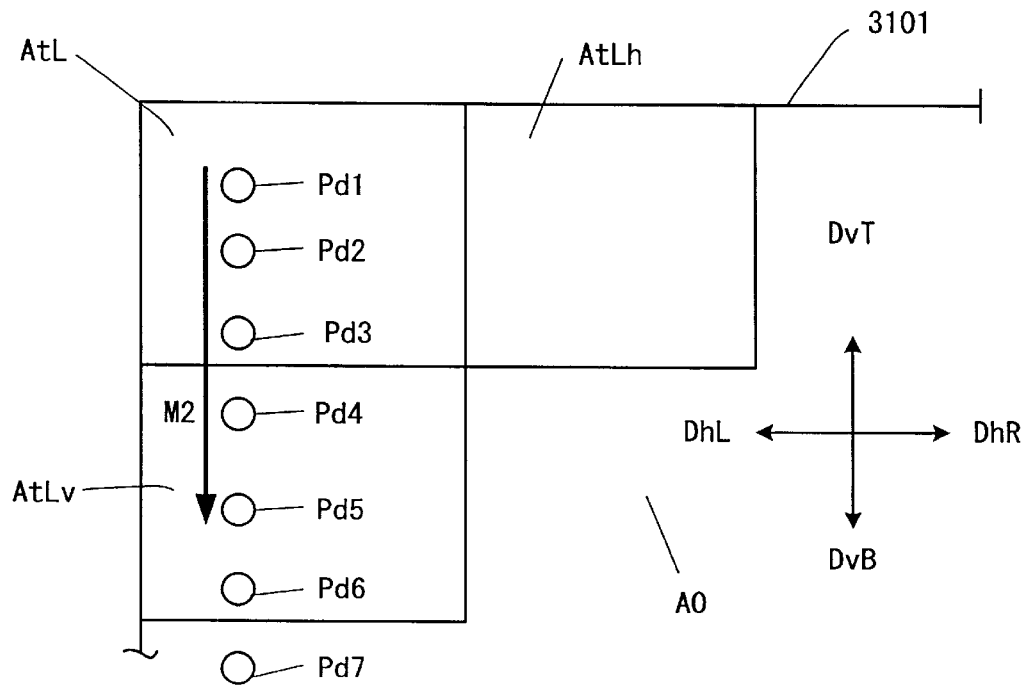

FIG. 28 shows how the input operation M2 is recognized in reality. The input operation M2 is recognized based on detection points Pd1 to Pd7 as in the case with the input operation M1. At the detection point Pd1, it is recognized that the user first touches the function region AtL as a starting point. At the detection point Pd4 within the vertical movement detecting region AtLv, the controller 3102 recognizes that the user moves the finger and the like from the function region AtL in the downward direction DvB, that is, this user's operation is the input operation M2.

It should be noted that the entire touch surface (the action detectable region A0) of the touch sensor 3101 is generally scanned at intervals of a 10 ms to 25 ms range to find points of finger movement (detection points Pd). Such scan has the following characteristic in general: the more quickly the finger moves, the larger each space between the detection points Pd becomes; and the more slowly the finger moves, the smaller each space between the detection points Pd becomes.

Therefore, it is also possible to identify the direction of each user's operation by combining the above-described characteristic and the method of determining regions described with reference to FIGS. 27 and 28. For example, when a space between the detection points P3 and P6 in FIG. 27 is larger than a previously-determined value (when the user moves the finger quickly), the input operation M1 shall be detected at the detection point Pd4, i.e., the first detection point in the horizontal movement detecting region AtLh. On the other hand, when the space between the detection points Pd3 and Pd6 is shorter than the predetermined value (when the user moves the finger slowly), the input operation M1 shall be detected at the detection point Pd6. In this case, the function or application program assigned to the input operation M1 is started at the third detection point in the horizontal movement detecting region AtLh. In this way, the detection point for starting the function or application program may be changed to another detection point according to the speed of a user's operation, thereby adjusting the touch-sensitive tablet TSP3 so as to suit with the sense of the user.

Figure 29:
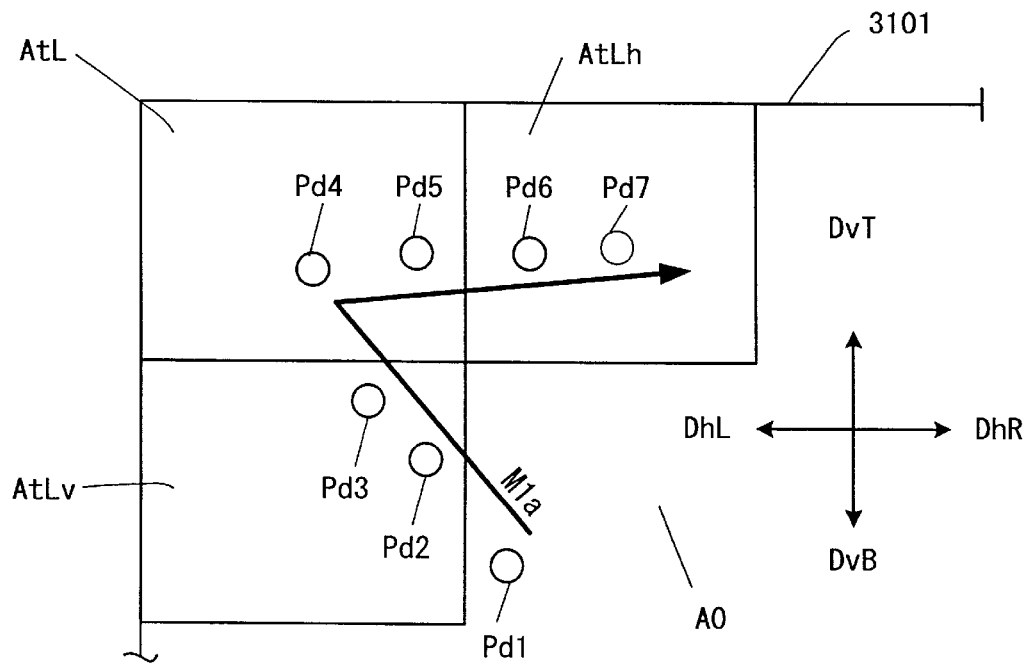

Next, referring to FIG. 29, described is an input operation M1a. The input operation M1a is similar to the input operation M1 shown in FIG. 27. However, the input operation M1a does not execute the function assigned to the input operation M1 because a starting point of touch in the input operation M1a is different from that in the input operation M1. As shown in FIG. 29, the input operation M1a starts from the action detectable region A0, then passes through the vertical movement detecting region AtLv and the function region AtL, and then reaches the horizontal movement detecting region AtLh. The input operation M1a is recognized based on continuous touch information ITc including coordinate information and detection time information about the detection points Pd1 to Pd7 as follows:

In the input operation M1a, the user first touches the detection point Pd1 inside the action detectable region A0, and then moves the finger and the like to the detection point Pd7 along the touch surface. The user puts the finger on detection point Pd4 within the function region AtL, and then puts the finger into the horizontal movement detecting region AtLh for the first time at the detection point Pd6.

In this case, however, the starting point of touch does not fall within the function region AtL. Therefore, the function assigned to the function region AtL is not executed. As a result, the input operation M1a is processed as an instruction for a normal cursor moving operation. As described above, unless the user first touches the function region AtL, the assigned function is not executed. As a result, misoperation is prevented, even when the user performs a normal input operation for moving a cursor with the touch-sensitive tablet and then unintentionally touches or moves the finger to the function region AtL or the horizontal movement detecting region AtLh.

Figure 30:
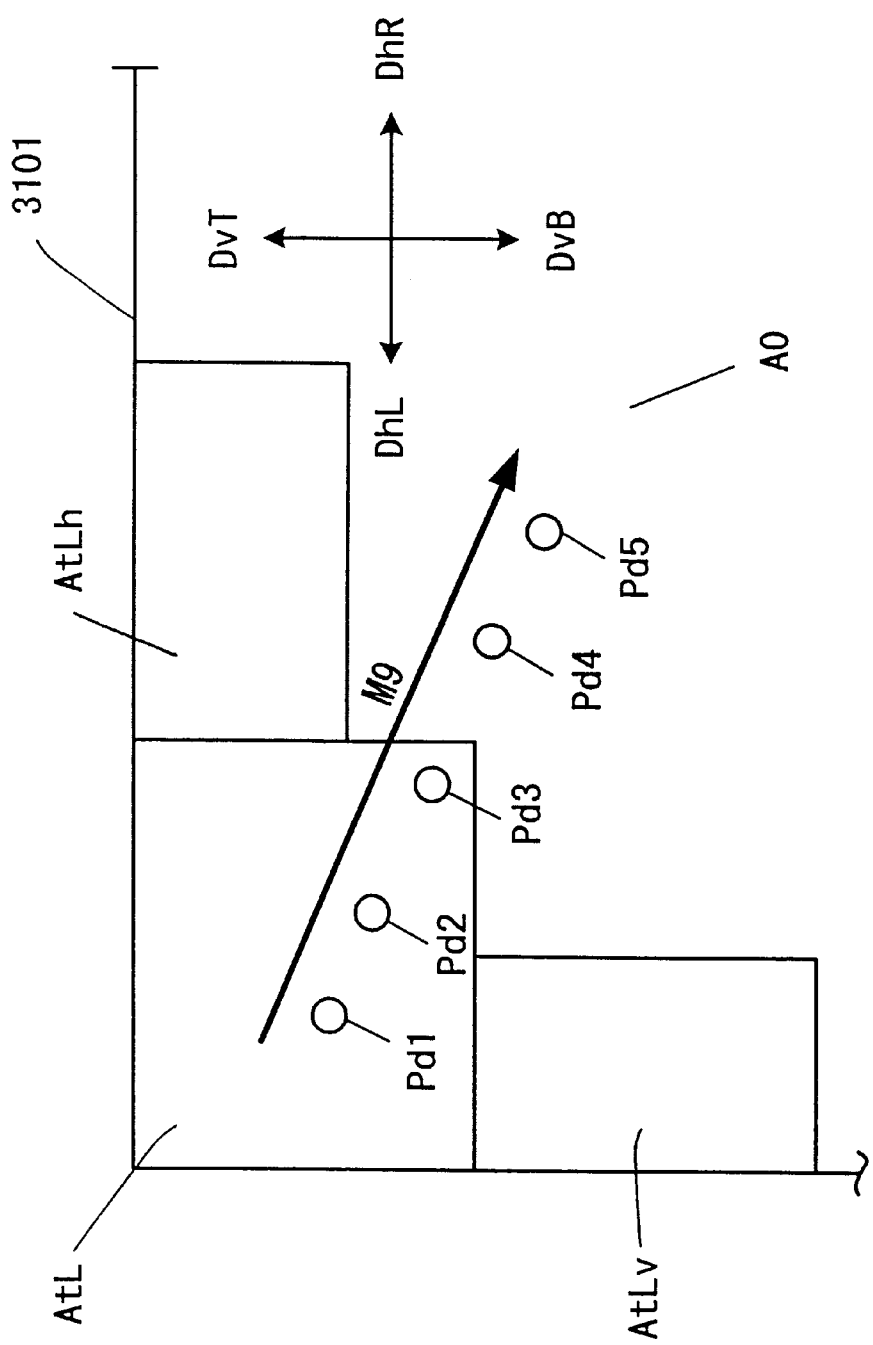

Referring to FIG. 30, described is how the horizontal movement detecting region AtLh and vertical movement detecting region AtLv are provided so as not to recognize a user's operation in the slanting direction which is different from the input operations M1 and M2. The function region AtL shown in FIG. 30 has the same shape as the function regions AtL in FIGS. 27 and 28. The horizontal movement detecting region AtLh in FIG. 30, however, is shorter with respect to the vertical direction Dv than those in FIGS. 27 and 28. Further, the vertical movement detecting region AtLv in FIG. 30 is shorter with respect to the horizontal direction Dh than those in FIGS. 27 and 28. Such horizontal and vertical movement detecting regions AtLh and AtLv make it possible to neglect the user's operation in the slanting direction without erroneously regarding it as the input operation M1 or M2.

In this case, the continuous touch information ITc about detection points Pd1 to Pd5 is obtained. At the detection point Pd1, it is recognized that the user first touches the function region AtL as a starting point. Then, at the detection point Pd4 inside the action detectable region A0, it is possible to recognize that the user's finger is in a region which is not any of the function region AtL, the horizontal movement detecting region AtLh, and the vertical movement detecting region AtLv. Accordingly, the function assigned to the function region AtL is not executed. Instead, a normal cursor moving operation and the like is started. Note that the size and shape of the function region AtL, the horizontal movement detecting region AtLh, and the vertical movement detecting region AtLv are appropriately set according to the sensitivity of the touch sensor 3101 of the touch-sensitive tablet TSP3, and the skill and habits of the user.

Next, referring to flow charts shown in FIGS. 31, 32, 33, 34 and 35, described is the operation of the touch-sensitive tablet TSP3 according to the present embodiment. It is to be noted that the operation is controlled by the controller 3102. The touch-sensitive tablet TSP3 is powered up, and starts its operation thereof.

In step S302, a flag T indicating whether the touch sensor 3101 is touched, or not is initialized. The procedure then advances to next step S304.

In step S304, the controller 3102 monitors information indicative of the user's operation on the touch sensor 3101. For each of touching, untouching, tapping, and other finger movement, the touch sensor 3101 sends information about the user's operation to the controller 3102 through the input operation signal So. The controller 3102 monitors the information supplied from the touch sensor 3101 in this step. Then, the procedure advances to next step S306.

In step S306, it is determined whether the input operation signal So sent from the touch sensor 3101 indicates touching, or not. If the input operation signal So indicates an input operation other than touching (i.e., tapping or untouching), No is returned. The procedure then advances to step S308. To the contrary, if the input operation signal So indicates touching, Yes is returned. The procedure then advances to step S310.

In step S308, the user's input operation is processed as an instruction for a normal cursor moving operation. The procedure then returns to S302.

In step S310, it is determined whether the above-mentioned flag T is 1, or not. That is, the flag T is referred to determine whether the user touches the touch sensor 3101 for the first time, or moves the finger and the like along the surface thereof.

When the user touches for the first time, the flag T indicates 0. Therefore, the result of step S310 is No, and the procedure advances to step S312. To the contrary, when the user moves the finger along the surface, the result of step S310 is Yes. The procedure then advances to step S314.

In step S312, a first touched position (X1, Y1) is stored. Then, the procedure loops back to step S304.

In step S314, it is determined whether the first touched place is within the function region AtL or not. If within the function region AtL, Yes is returned, and the procedure advances to step S324 (in FIG. 32). If the place does not fall within the function region AtL, No is returned, and the procedure advances to step S316.

In step S316, it is determined whether the first touched place is within the function region AtR, or not. If within the function region AtR, step S316 returns Yes. The procedure then advances to step S336 (in FIG. 33). If not within the function region AtR, meaning that not within either the function region AtL or AtR, step S316 returns No. Then, the procedure advances to step S318.

In step S318, it is determined whether the first touched place is within the function region AbL, or not. If within the function region AbL, the result of step S318 is Yes. The procedure then advances to step S348 (in FIG. 34). If not within the function region AbL, that is, the first touched place does not fall within any of the function regions AtL, AtR, and AbL, the procedure advances to step S320.

In step S320, it is determined whether the first touched place is within the function region AbR, or not. If within the function region AbR, the result of step S320 is Yes, and the procedure advances to step S358 (in FIG. 35). If not within the function region AbR, meaning that the first touched place does not belong to any of the function regions AtL, AtR, AbL and AbR. The result of step S320 is No, and the procedure advances to step S322.

In step S322, the detected user's operation is processed as an instruction for a normal cursor moving operation.

Figure 32:
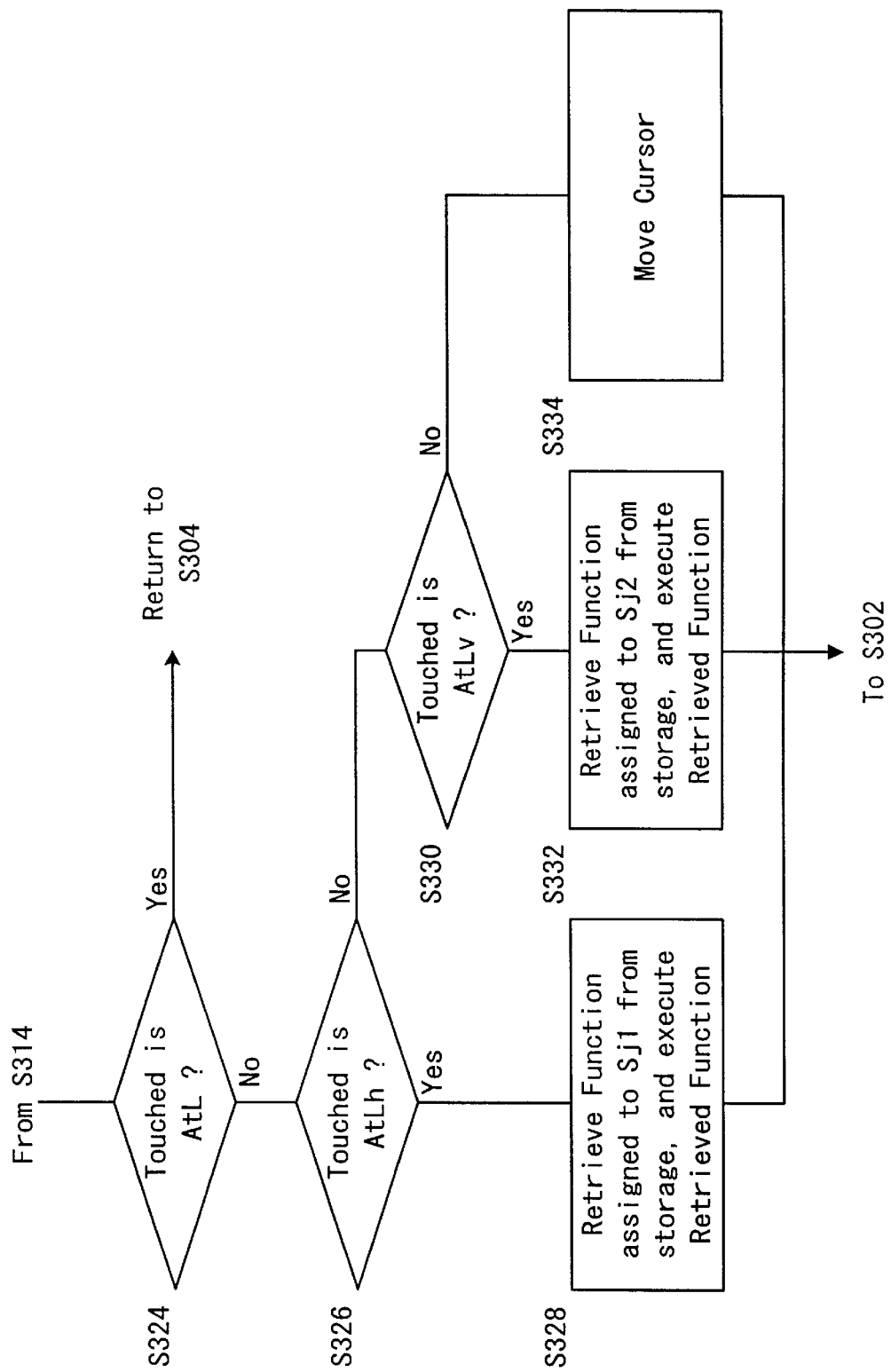

Next, referring to a flow chart in FIG. 32, the operation of the touch-sensitive tablet TSP3 for a user's operation starting from the function region AtL. If it is determined in step S314 that the first touched place is within the function region AtL, it is next determined in step S324 whether the currently-touched position is within the function region AtL, or not. If within the function region AtL, step S324 returns Yes. The procedure then returns to above-mentioned step S304. Otherwise, step S324 returns No. The procedure then advances to step S326.

In step S326, it is determined whether the currently-touched position is within the horizontal movement detecting region AtLh, or not. If within the horizontal movement detecting region AtLh, the result of step S326 is Yes. The procedure then advances to step S328. On the other hand, if not within the horizontal movement detecting region AtLh, the result of step S326 is No. The procedure then advances to step S330.

In step S328, judging from the finger movement from the function region AtL to the horizontal movement detecting region AtLh, it is possible to recognize that the present user's operation corresponds to the input operation M1. Hence, the judgment operation subsignal Sj1 corresponding to the input operation M1 is retrieved from Table 5, and then sent by the controller 3102 to the storage 3103 as the judgement signal Sj. The storage 3103 checks Tables 3 and 4 about the function corresponding to the judgement subsignal Sj1. The storage 3103 then generates the operation execution signal Sm indicative of the function represented by the operation number R1, i.e., the menu display function, and sends the operation execution signal Sm to the controller 3102. The controller 3102 executes the menu display function represented by the operation number RI based on the operation execution signal Sm. Then, the procedure returns to step S302.

In step S330, it is determined whether the currently-touched position is within the vertical movement detecting region AtLv, or not. If within the vertical movement detecting region AtLv, the result of step S330 is Yes. The procedure then advances to step S332. To the contrary, if not within the vertical movement detecting region AtLv, meaning that the currently-touched position does not belong to any of the function region AtL, the horizontal movement detecting region AtLh, and the vertical movement detecting region AtLv, the result of step S330 is No. Then, the procedure advances to step S334.

In step S332, judging from the finger movement from the function region AtL to the vertical movement detecting region AtLv, it is possible to recognize that the present input operation corresponds to the input operation M2. Hence, the judgement subsignal Sj2 corresponding to the input operation M2 is retrieved from Table 5, and then sent to the storage 3103 as the judgement signal Sj. After that, as in step S328, the function assigned to the judgement subsignal Sj2 is executed. Then, the procedure returns to step S302.

In step S334, the present input operation is processed as an instruction for a normal cursor moving operation. Then, the procedure returns to step S302. Up to this point, the processing for the user's operation starting from the function region AtL has been described.

Figure 33:
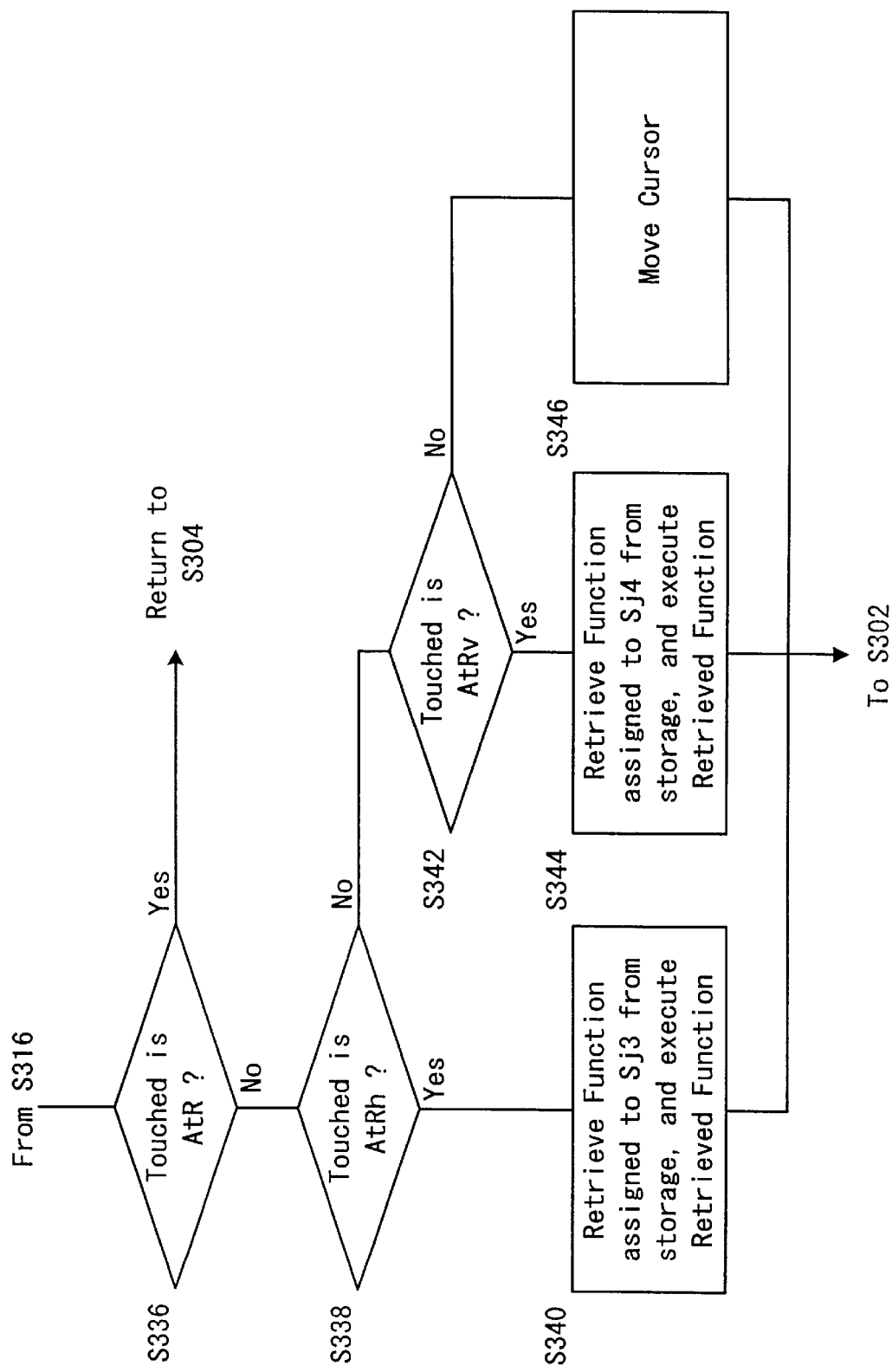
Figure 34:
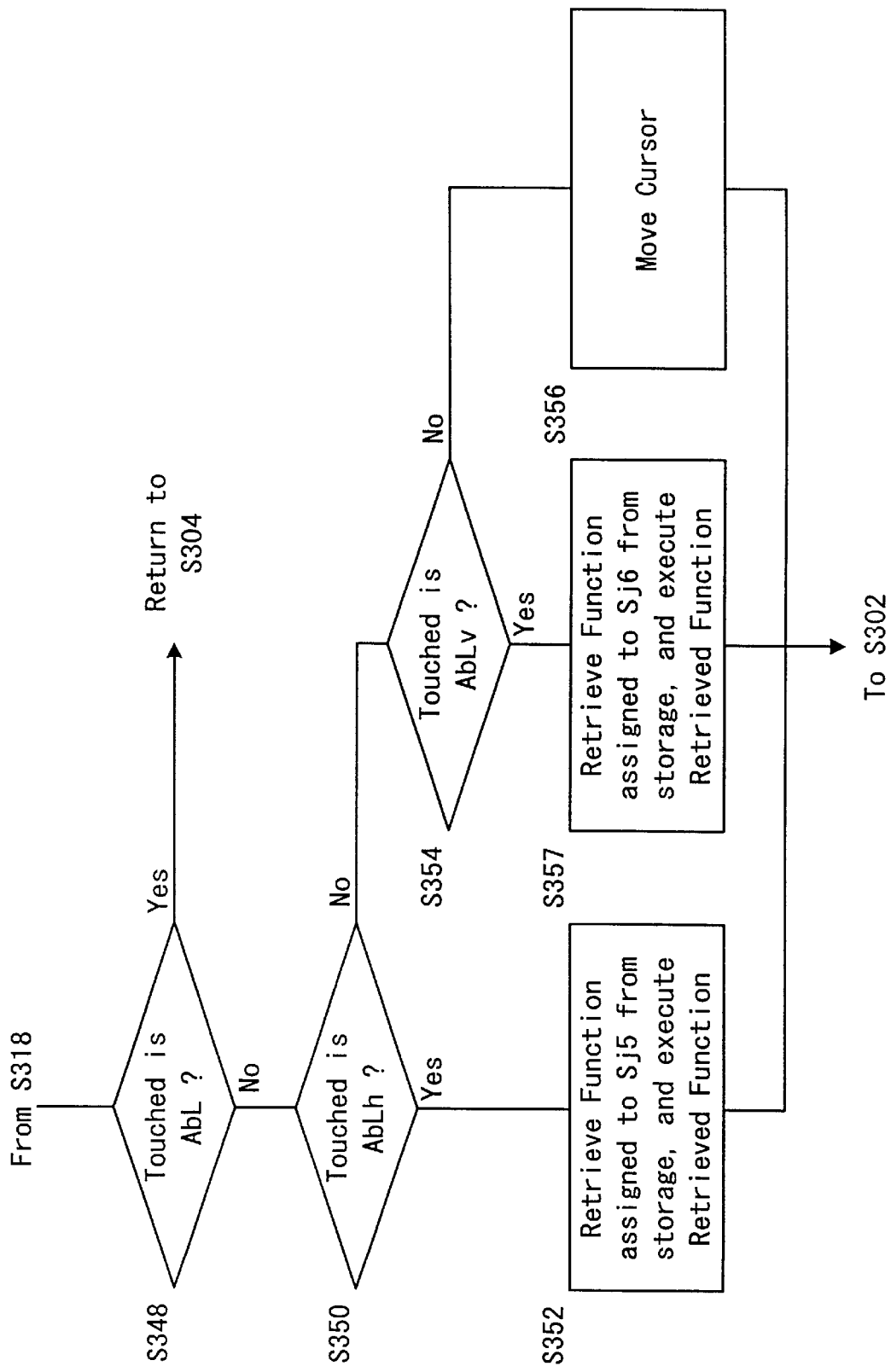
Figure 35:
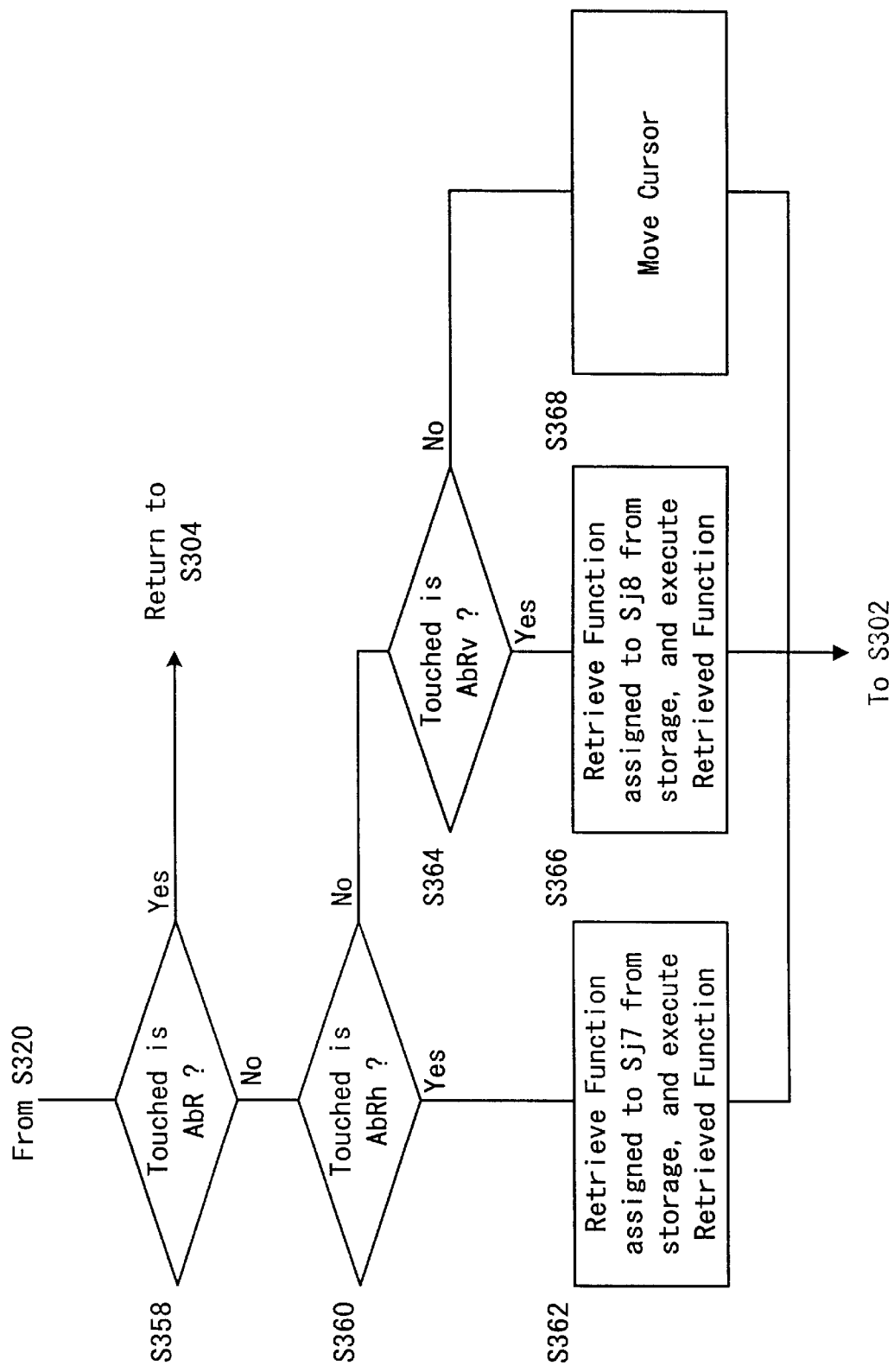

FIG. 33 shows the operation of the touch-sensitive tablet TSP3 for a user's operation starting from the function region AtR; FIG. 34 shows the operation of the touch-sensitive tablet TSP3 for a user's operation starting from the function region AbL; and FIG. 35 shows the operation of the touch-sensitive tablet TSP3 for a user's operation starting from the function region AbR. Note that the operation of the touch-sensitive tablet TSP3 in FIGS. 33 to 35 is basically similar to the above-described user's operation starting from the function region AtL described with reference to FIG. 32. Therefore, the description of the operation in FIGS. 33 to 35 is omitted. It is also to be noted that in the present embodiment, the continuous touch information about the detection points Pd4 to Pd6 in FIG. 27, for example, is used to start the operation (function) assigned to the function region (AtL). Alternatively, untouch information about the detection points Pd4 to Pd6 may be used to start the operation (function).

(First Alternative of Third Embodiment)

Referring to FIGS. 36A, 36B, 37A, 37B, 38A, 38B, 39A and 39B, description is made below of a first alternative of the above-described touch-sensitive tablet TSP3 according to the third embodiment of the present invention. A touch-sensitive tablet TSP3A according to the present alternative has the same configuration as the above-described touch-sensitive tablet TSP3, but is different therefrom in the operation of the controller 3102. For simplicity's sake, only the difference is described below. The touch-sensitive tablet TSP3A according to the present alternative can cause the display 3104 to display windows, thereby allowing efficient execution of operations for the windows.

Figure 36A:
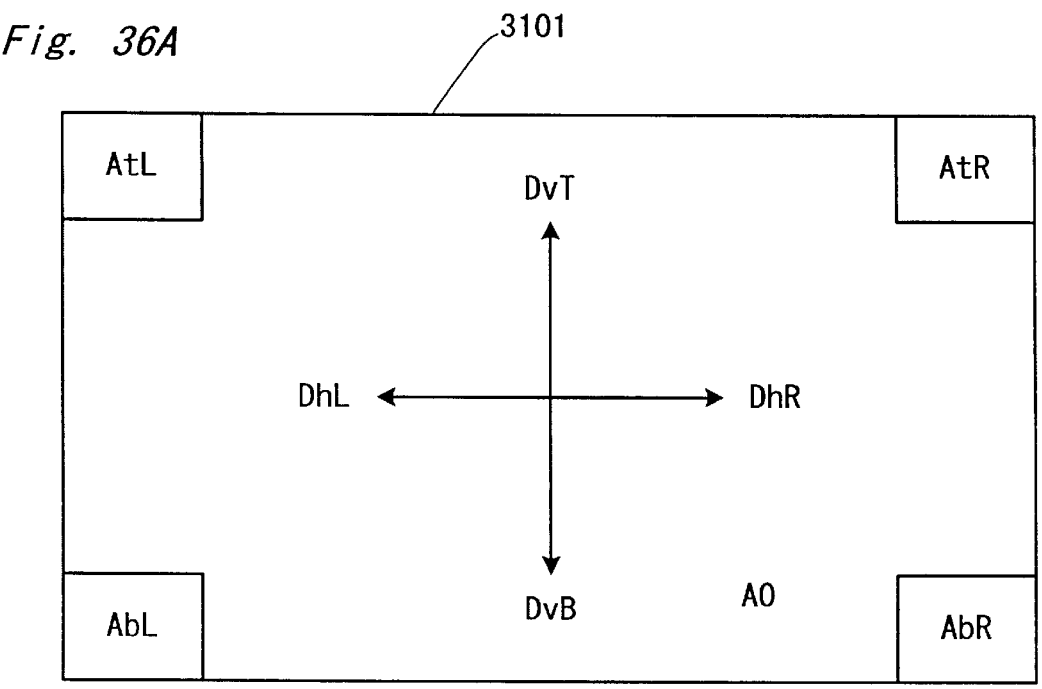
FIG. 36A is a top plan view of a touch sensor according to a first alternative of the touch-sensitive tablet shown in FIG, 23.

FIG. 36A is a top plan view of the touch sensor 3101. On the touch surface of the touch sensor 3101 (the action detectable region AO), provided are the function regions AtL, AtR, AbL and AbR each assigned specific functions.

Figure 36B:
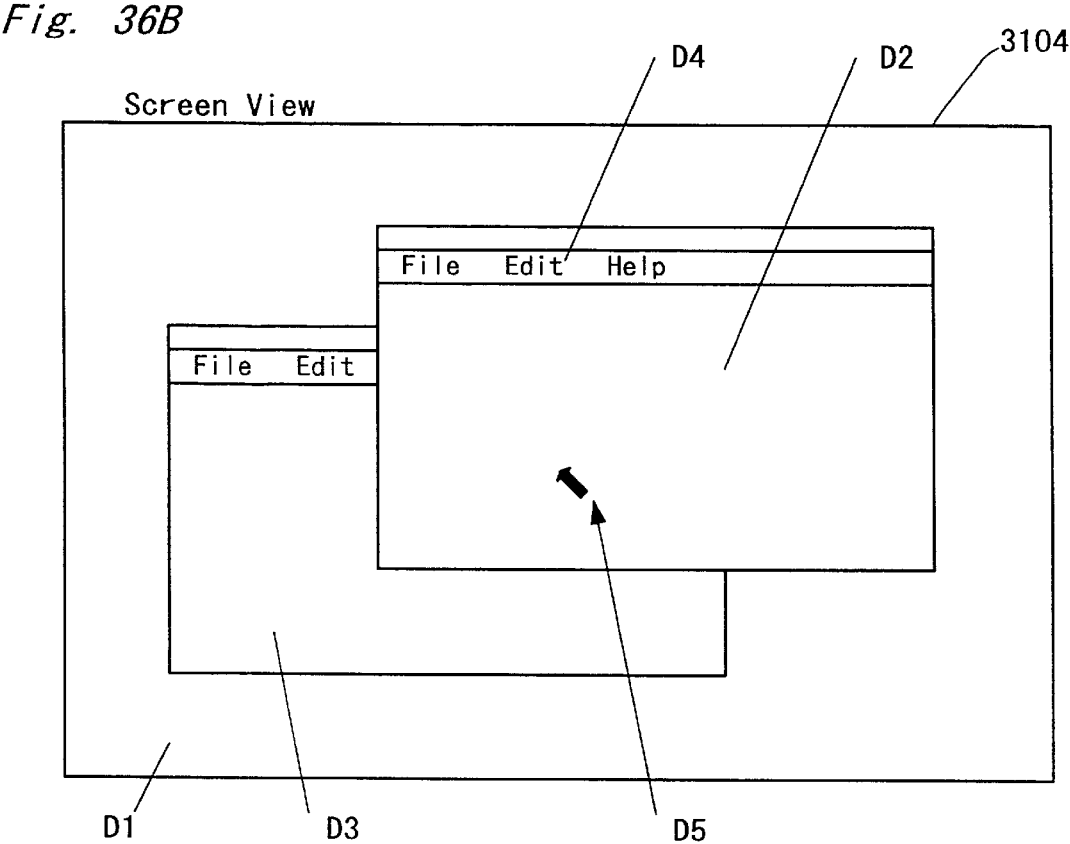
FIG. 36B is an illustration of windows, in an initial state, displayed on a display shown in FIG. 23.

In FIG. 36B, shown is an exemplary screen of the display 3104 providing a plurality of windows thereon. D1 denotes an entire display area of the screen of the display 3104. D2 and D3 denote application programs. In this case, the two application programs D2 and D3 are displayed. D4 denotes a menu for the application program D2. D5 denotes a mouse cursor which is put on the application program D2 in FIG. 36B.

Figure 37A:
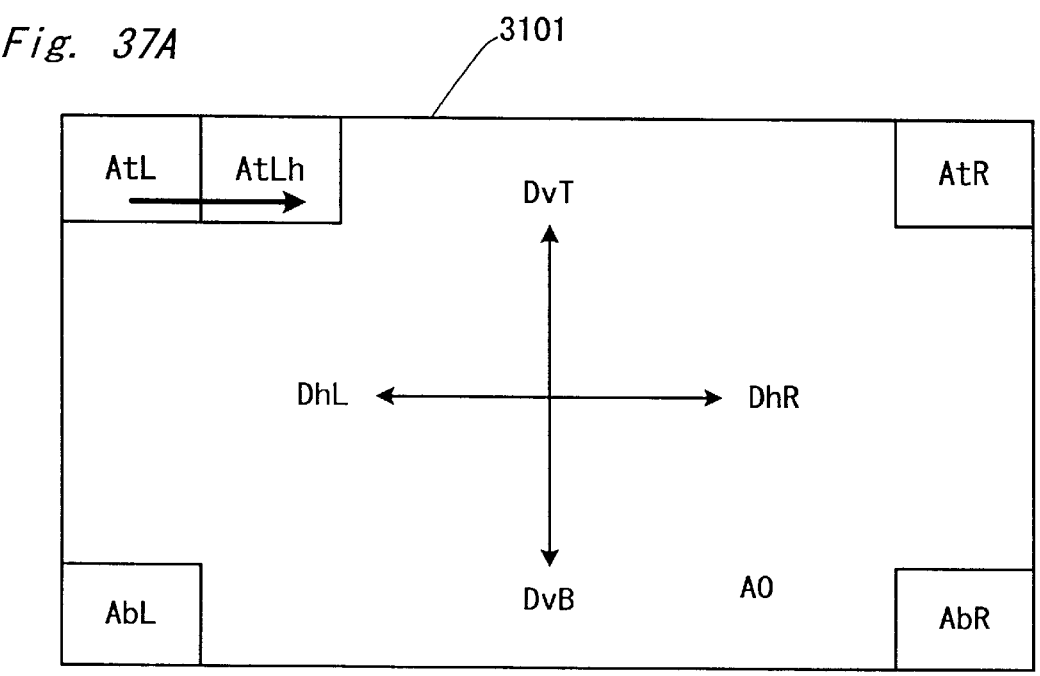
FIG. 37A is a diagram used to describe an input operation in the touch sensor shown in FIG. 36A.
Figure 37B:
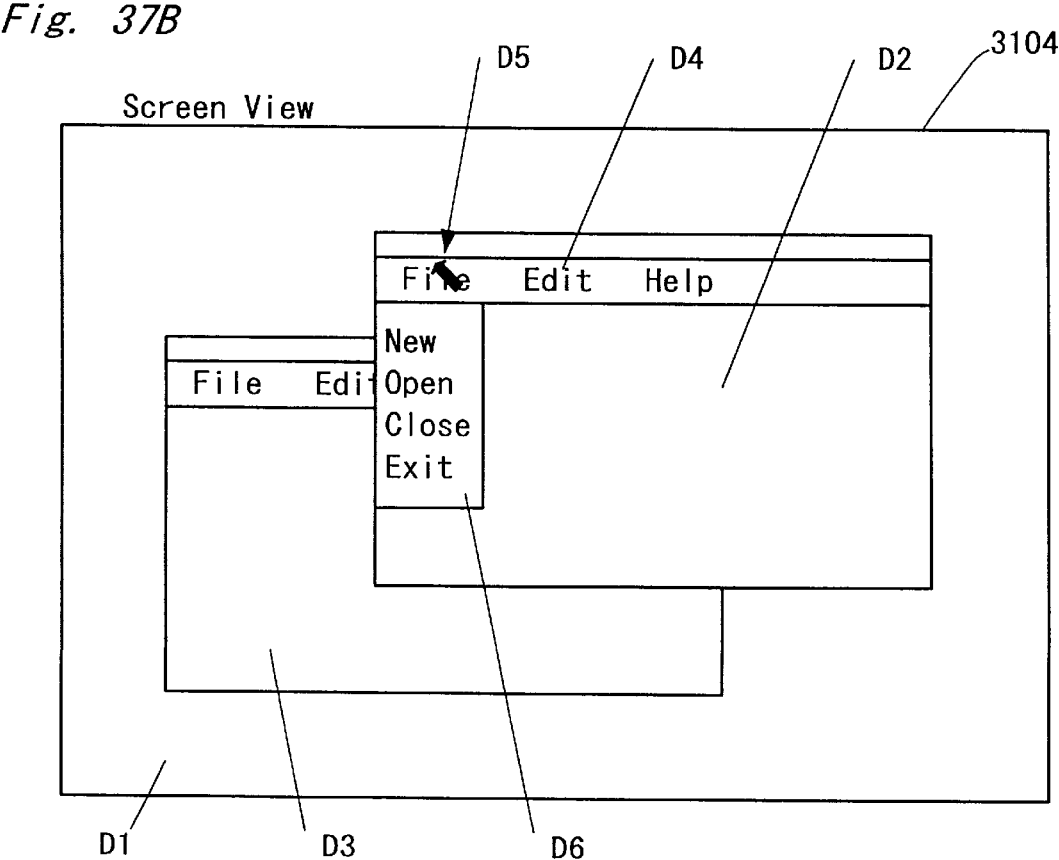
FIG. 37B shows menus displayed on the display shown in FIG. 23.

FIG. 37A shows a user's operation of first touching the function region AtL on the touch surface of the touch sensor 3101 and moving the finger and the like to the horizontal movement detecting region AtLh along the touch surface. The user's operation starting from the function region AtL in the right direction DhR is assigned a function of displaying a menu for an active application program among a plurality of windows, thereby executing such function. On the screen of the display 3104 shown in FIG. 37B, the mouse cursor D5 is moved to "File" at the top of entries of the menu D4, enabling display of the contents of the top entry "File". At the same time, the operation of the touch-sensitive tablet TSP3 is switched to a normal cursor moving processing. Accordingly, for example, by moving the mouse cursor D5 in the downward direction from the entry "File" onto a sub-entry "Open" and then tapping it, it is possible to open a file.

Figure 38A:
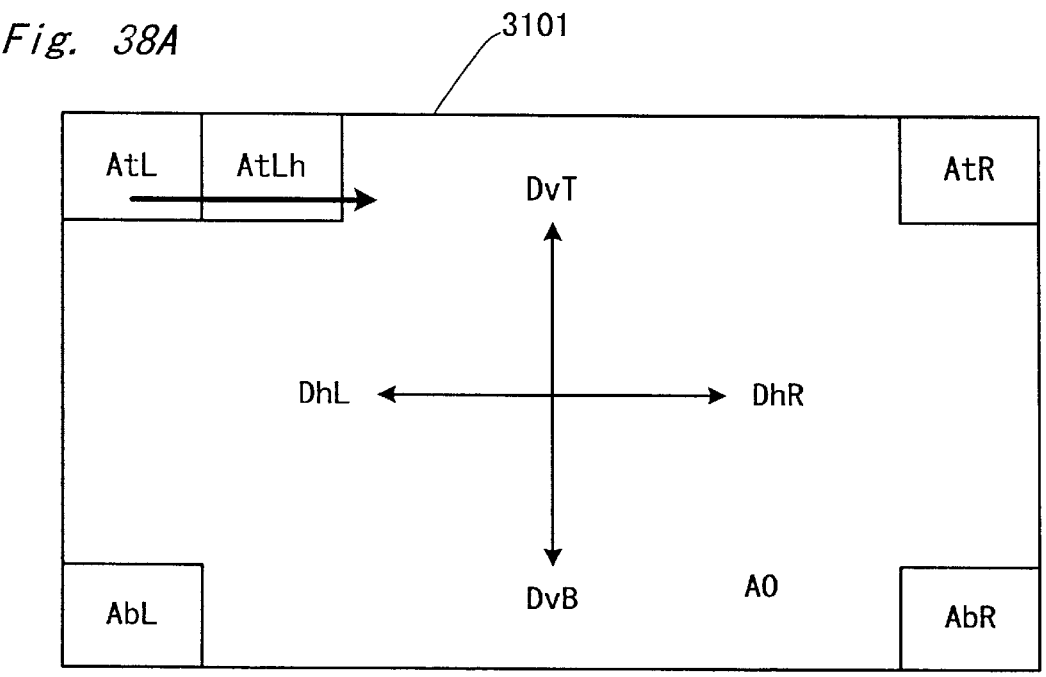
FIGS. 38A and 39A are diagrams used to describe input operations subsequent to the input operation shown in FIG. 37A in the touch sensor shown in FIG. 36A.
Figure 38B:
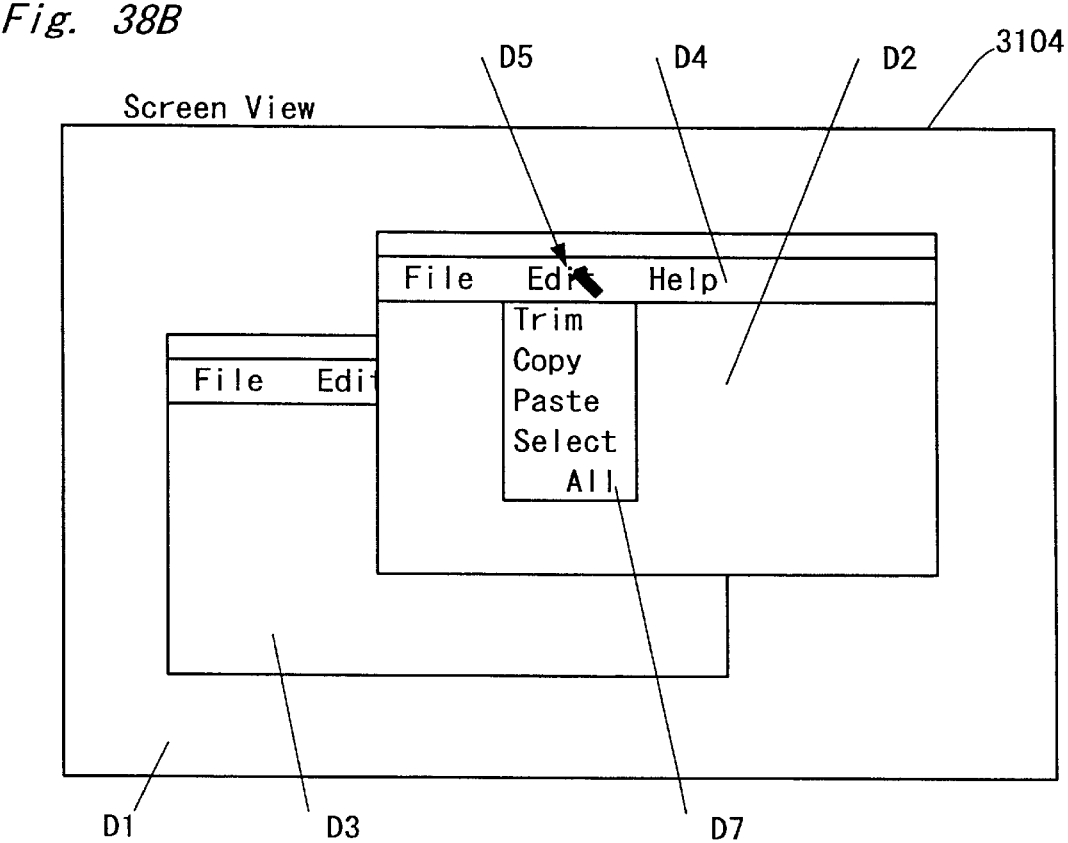
FIGS. 38B and 39B shows exemplary screen images for selecting menu entries for the window displayed on the display shown in FIG. 23, in response to the input operations shown in FIGS. 38A and 39B, respectively.

Further, finger movement in the right direction DhR along the touch surface of the touch sensor 3101 as shown in FIG. 38A causes the mouse cursor D5 to move to the right. When the mouse cursor D5 is moved and put on an entry "Edit", for example, the contents D7 of the entry "Edit" are displayed as shown in FIG. 38B.

Figure 39A:
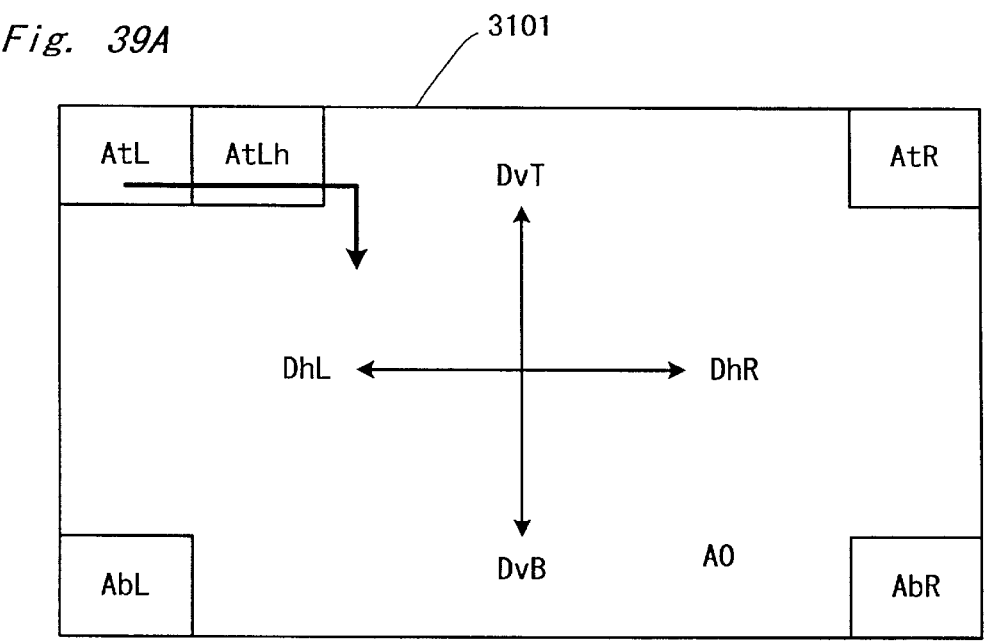
Figure 39B:
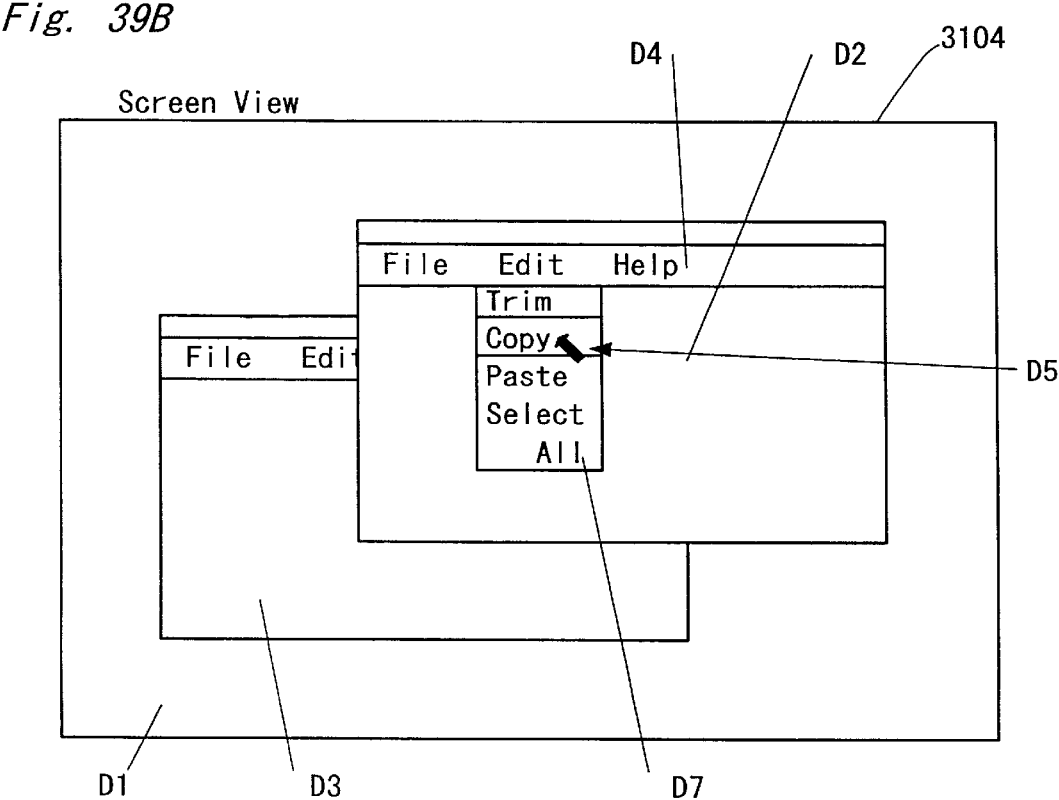

FIG. 39A shows finger movement in the downward direction DvB subsequent to the user's operation shown in FIG. 38A. After the second entry "Edit" of the menu is displayed as shown in FIG. 38B, the user moves the finger in the downward direction DvB along the touch surface of the touch sensor 3101 as shown in FIG. 39A to select a second sub-entry "Copy" of the entry "Edit". As apparent from the screen shown in FIG. 39B, the user's operation is processed as an instruction for a normal cursor moving operation. Therefore, the mouse cursor D5 is moved to the sub-entry "Copy". A tap on the touch sensor 3101 in this state enables selection of the desired sub-entry "Copy".

In the series of input operations shown in the above FIGS. 36A to 39B, after starting the menu display function, the user has only to glide the finger on the touch sensor 3101 in order to select the desired entry of the menu. In other words, it is not required to actually move the mouse cursor D5 onto the menu in order to select any entry therein, which minimizes the user's operation for moving the mouse cursor D5 to select the entry.

In the above description, the advantages of assignment of a function for a menu has been described. It is also possible to minimize cursor movement by assigning functions usually requiring cursor movement such as closing, maximizing and minimizing an application program.

(Second Alternative of Third Embodiment)

Referring to FIGS. 40 to 49, described below is a second alternative of the above-described touch-sensitive tablet TSP3 according to the third embodiment of the present invention. A touch-sensitive tablet TSP3B according to the present alternative basically has the same configuration as the above-described touch-sensitive tablet TSP3. However, the touch-sensitive tablet TSP3B is additionally provided with insensitive regions on the touch surface of the touch sensor 3101 to avoid an erroneous input caused by an accidental touch of a user.

Figure 40:
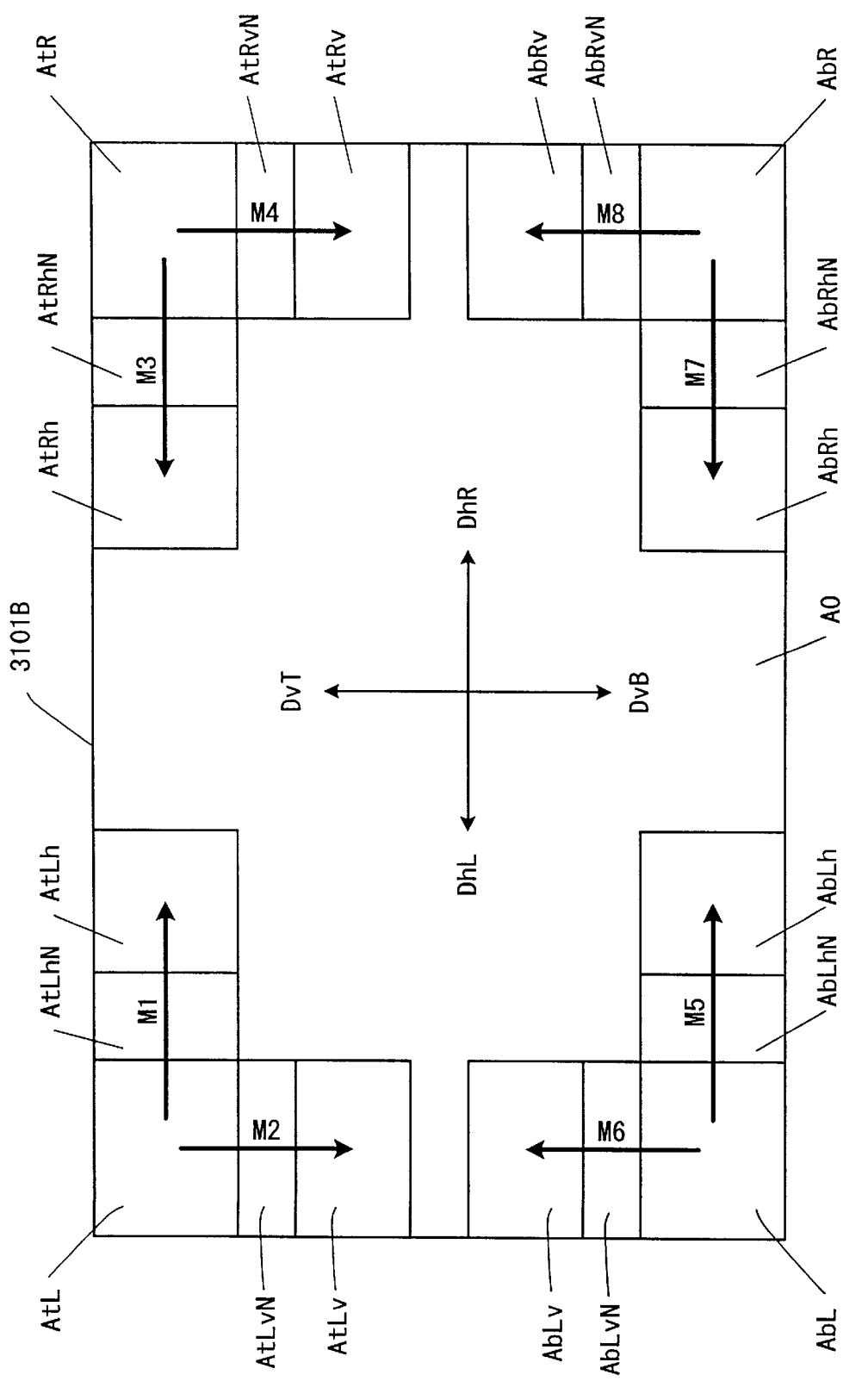
FIG. 40 is a top plan view of a touch sensor according to a second alternative of the touch-sensitive tablet shown in FIG. 23.

In FIG. 40, shown is a front elevational view of a touch sensor 3101B according to the present alternative. First, the function region AtL is described. As shown in FIG. 40, in the present alternative, an insensitive region AtLhN is provided between the function region AtL and the horizontal movement detecting region AtLh. Firstly, the reason for providing the insensitive region is briefly described below.

As described above, the horizontal movement detecting regions AtLh and AtLv are provided as triggers to detect the direction of user's finger movement, then determine the contents of the input operation M, and execute the function (operation) corresponding to the determined input operation M. However, after touching the function region AtL, the user sometimes carelessly touches the movement detecting regions AtLh and AtLv provided as triggers for executing functions. Resultantly, the function assigned to the touched region is executed against the user's will even when the function is unintended. To solve this problem, in the present alternative, insensitive regions AtLhN and AtLvN are provided between the function region AtL and the horizontal and vertical movement detecting regions AtLh and AtLv, respectively, to suspend detection of user's operations. Note that the function region AtL is a region to be a starting point, and the movement detecting regions AtLh and AtLv are used to determine timing of starting functions.

Specifically, even when the user touches the function region AtL and then sways the finger therefrom a little in the right direction DhR, such sway of the finger is unintentionally taken in the insensitive region AtLhN, thereby causing no misoperation. On the other hand, in order to touch the function region AtL and move the finger to the horizontal movement detecting region AtLh along the touch surface of the touch sensor 3101B, it is necessary to move the finger from the function region AtL in the right direction DhR with an express intention.

Further, the insensitive region AtLvN is provided between the function region AtL and the vertical movement detecting region AtLv to discriminate between the user's operation from the function region AtL in the downward direction DvB and a simple sway of the user's finger.

As clearly shown in FIG. 40, for the same purpose as with regard to the function region AtL, the insensitive region AtRhN is provided between the function region AtR and the horizontal movement detecting region AtRh; and the insensitive region AtRvN is provided between the function region AtR and the vertical movement detecting region AtRv.

Further, the insensitive region AbLhN is provided between the function region AbL and the horizontal movement detecting region AbLh; and the insensitive region AbLvN is provided between the function region AbL and the vertical movement detecting region AbLv.

Moreover, the insensitive region AbRhN is provided between the function region AbR and the horizontal movement detecting region AbRh; and the insensitive region AbRvN is provided between the function region AbR and the vertical movement detecting region AbRv.

Input operations M1 to M8 represent user's operations from the function regions AtL, AtR, AbL and AbL, respectively. Note that too broad an insensitive region increases the amount of the user's operation for executing the assigned function. On the other hand, too narrow an insensitive region causes frequent execution of unintended functions to put an enormous load on the user. Hence, the size and shape of the insensitive regions are appropriately determined according to the sensitivity of the touch sensor 3101B of the touch-sensitive tablet TSP3B and the skill and habits of the user as well as the size and shape of the function regions AtL, AtR, AbL and AbR for starting detection and the movement detecting regions AtLh, AtLv, AtRh, AtRv, AbLh, AbLv, AbRh and AbRv for detecting timing of starting operations (functions). Thus, it is possible to provide the user with an optimal operational environment.

Figure 41:
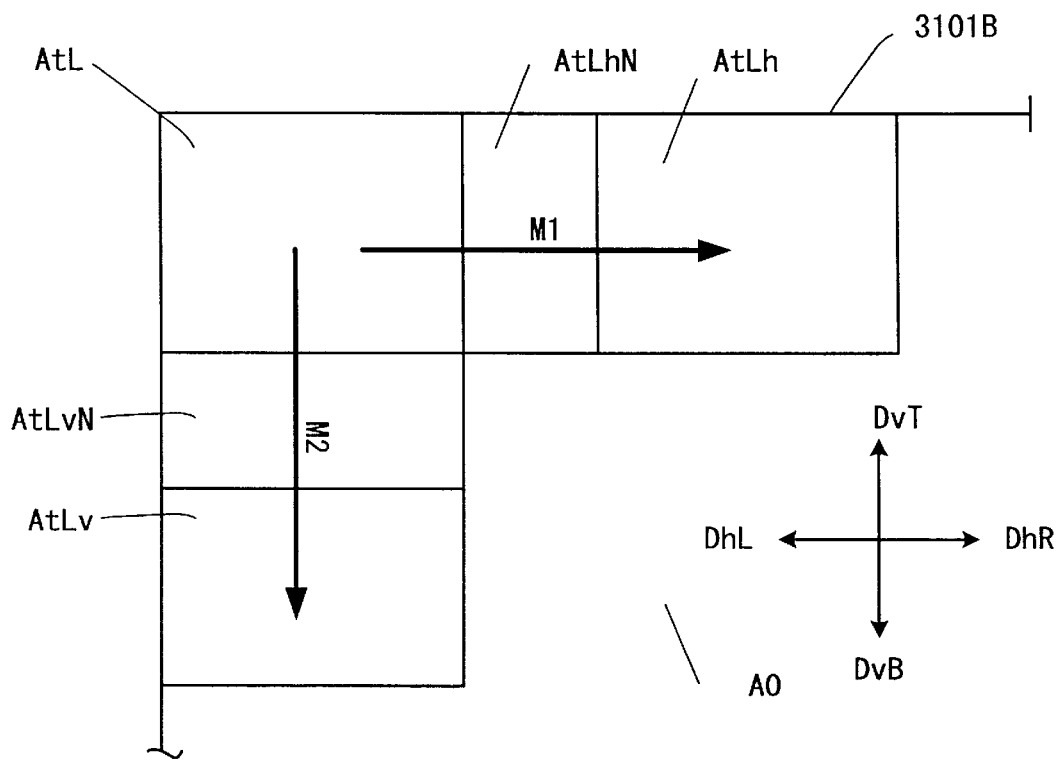
FIGS. 41, 42, 43 and 44 are diagrams used to describe various exemplary methods of detecting timing for staring operations in one of function regions shown in FIG. 40.

In FIG. 41, shown is an enlarged view of the vicinity of the function region AtL in FIG. 40. In the input operation Ml, the user first touches the function region AtL, then moves the finger and the like through the insensitive region AtLhN along the touch surface of the touch sensor 3101B, and puts the finger into the horizontal movement detecting region AtLh while still touching the touch surface. Similarly, in the input operation M2, the user first touches the function region AtL, then moves the finger through the insensitive region AtLvN along the touch surface. The user further puts the finger into the vertical movement detecting region AtLv while still touching the touch surface.

Figure 42:
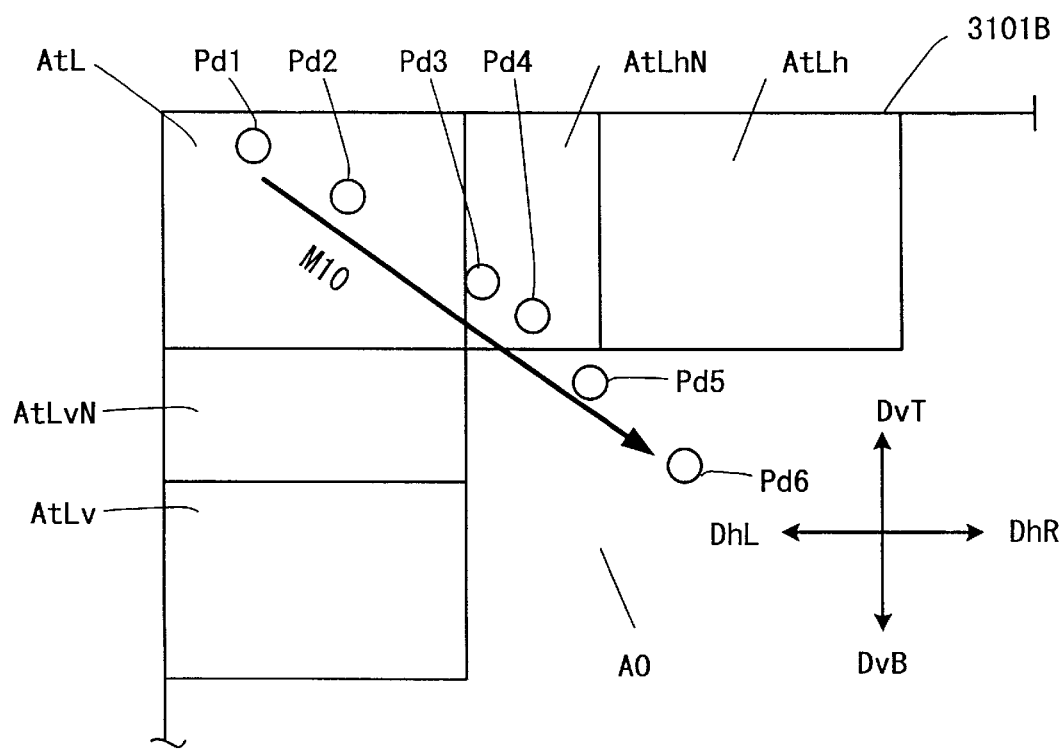

Referring to FIG. 42, described is an example of exclusion of an ambiguous user's operation performed in the slanting direction. Note that FIG. 42 is also an enlarged view of the vicinity of the function region AtL. An input operation M10 is recognized as continuous touch information ITc composed of coordinate information and detection time information about the continuous detection points Pd1 to Pd6. The detection point Pd1 represents a first touched position, which means that the starting point is within the function region AtL. At this stage, therefore, there is a possibility that the function assigned to the function region AtL is executed. The detection point Pd2 is also within the function region AtL, and at this stage, monitoring is continued. The detection points Pd3 and Pd4 are within the insensitive region AtLhN, and therefore no processing is performed. However, when the user moves the finger to the detection point Pd5 which does not belong to any regions, the operation of the touch-sensitive tablet TSP3B is switched to normal cursor moving process. The user's operation at the detection point Pd6 is also processed as an instruction for a normal cursor operation. Accordingly, in this case, the function assigned to the function region AtL is not executed, but only the normal cursor moving process is performed.

Figure 43:
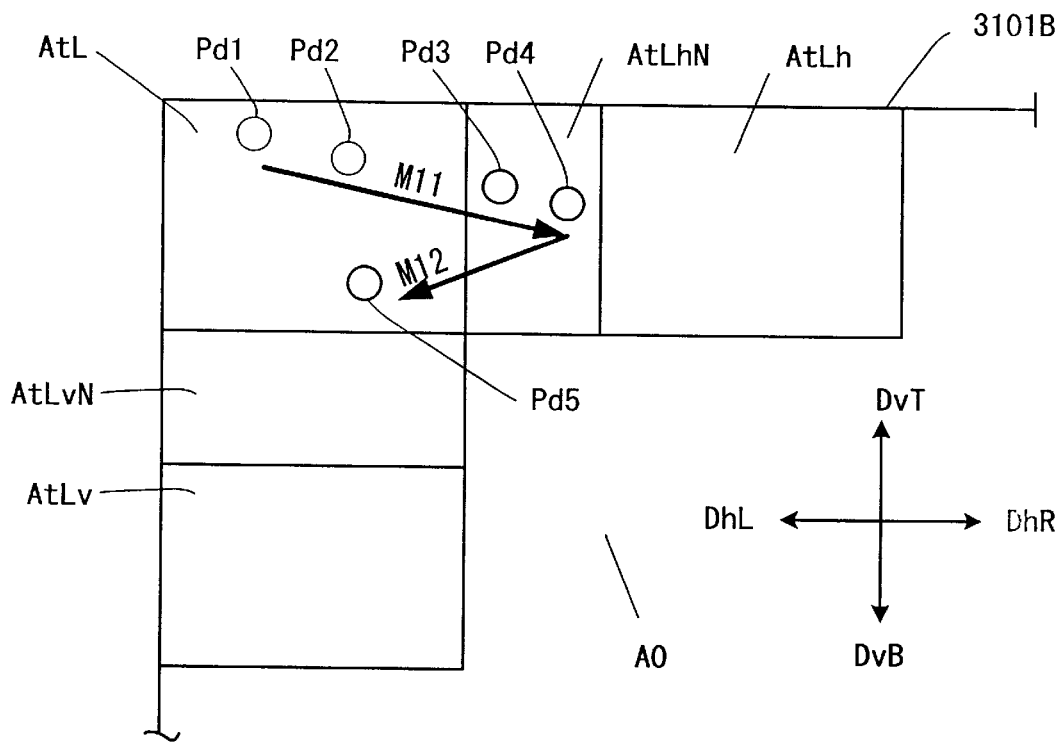

Referring to FIG. 43, described is an example of exclusion of misoperation caused when the periphery of the function region AtL is lightly touched. In FIG. 43, in an input operation M11, the user first touches the function region AtL and moves the finger and the like to the insensitive region AtLhN along the touch surface of the touch sensor 3101B. The input operation M11 does not effect execution of the function assigned to the function region AtL. In FIG. 43, in an input operation M12, the user puts the finger back to the function region AtL, but does not put the finger to either the horizontal movement detecting region AtLh or the vertical movement detecting region AtLv. Resultantly, the input operation M12 does not effect execution of the function (operation) assigned to the function region AtL.

Figure 44:
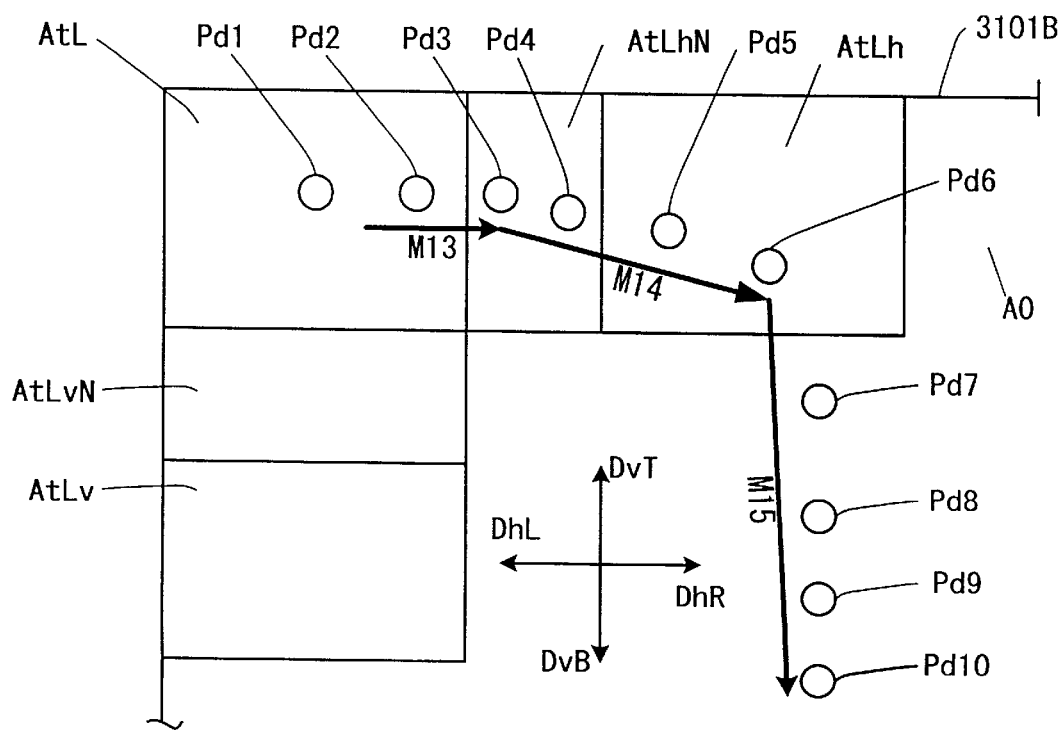

Referring to FIG. 44, described is an example of execution of the function assigned to the function region AtL in the present alternative by a user's operation starting from the function region AtL in the right direction DhR. A series of user's operations (input operations M13, M14 and M15) is detected based on continuous touch information ITc constituted by position information and detection time information about detection points Pd1 to Pd10. At the detection point Pd1, the user first touches the function region AtL. At the detection point Pd5, the function assigned to the function region AtL is started. The subsequent user's operation goes into a normal cursor moving operation mode. The user moves the finger and the like from the detection point Pd5 along the touch surface of the touch sensor 3101B, thereby performing a cursor moving operation. In the present example, it is possible to execute the function assigned to the function region AtL and move a cursor successively. This is particularly effective for the following function requiring selection of entries such as menu display.

Referring to flow charts in FIGS. 45 to 49, described is the operation of the touch-sensitive tablet TSP3B according to the present alternative.

Figure 31:
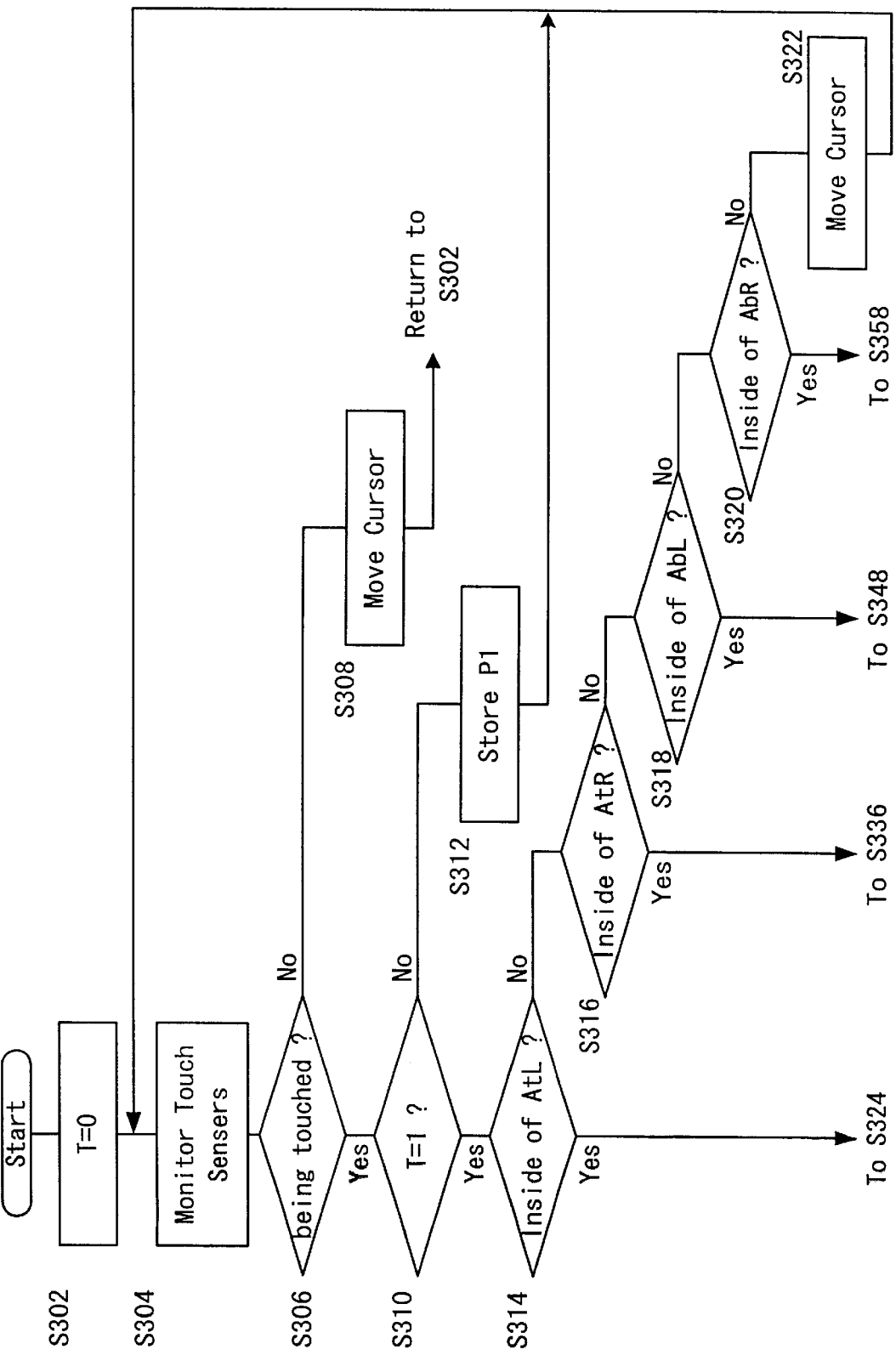
FIGS. 31, 32, 33, 34 and 35 constitute a flow chart delineating the operation of the touch-sensitive tablet shown in FIG. 23.
Figure 45:
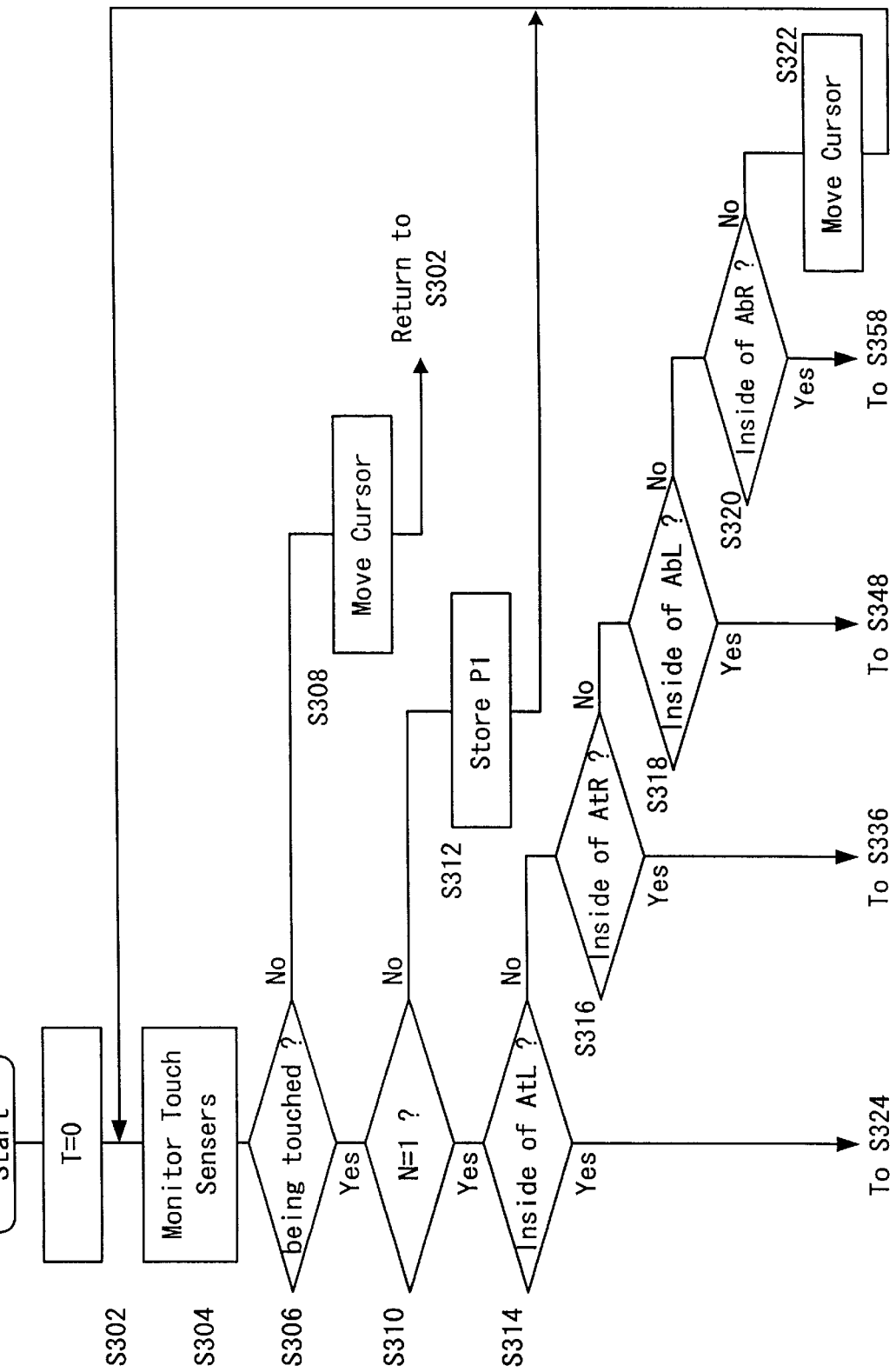

The flow charts shown in FIG. 45 delineates the same procedure as the flow chart in FIG. 31. Therefore, the description thereof is omitted here.

Figure 46:
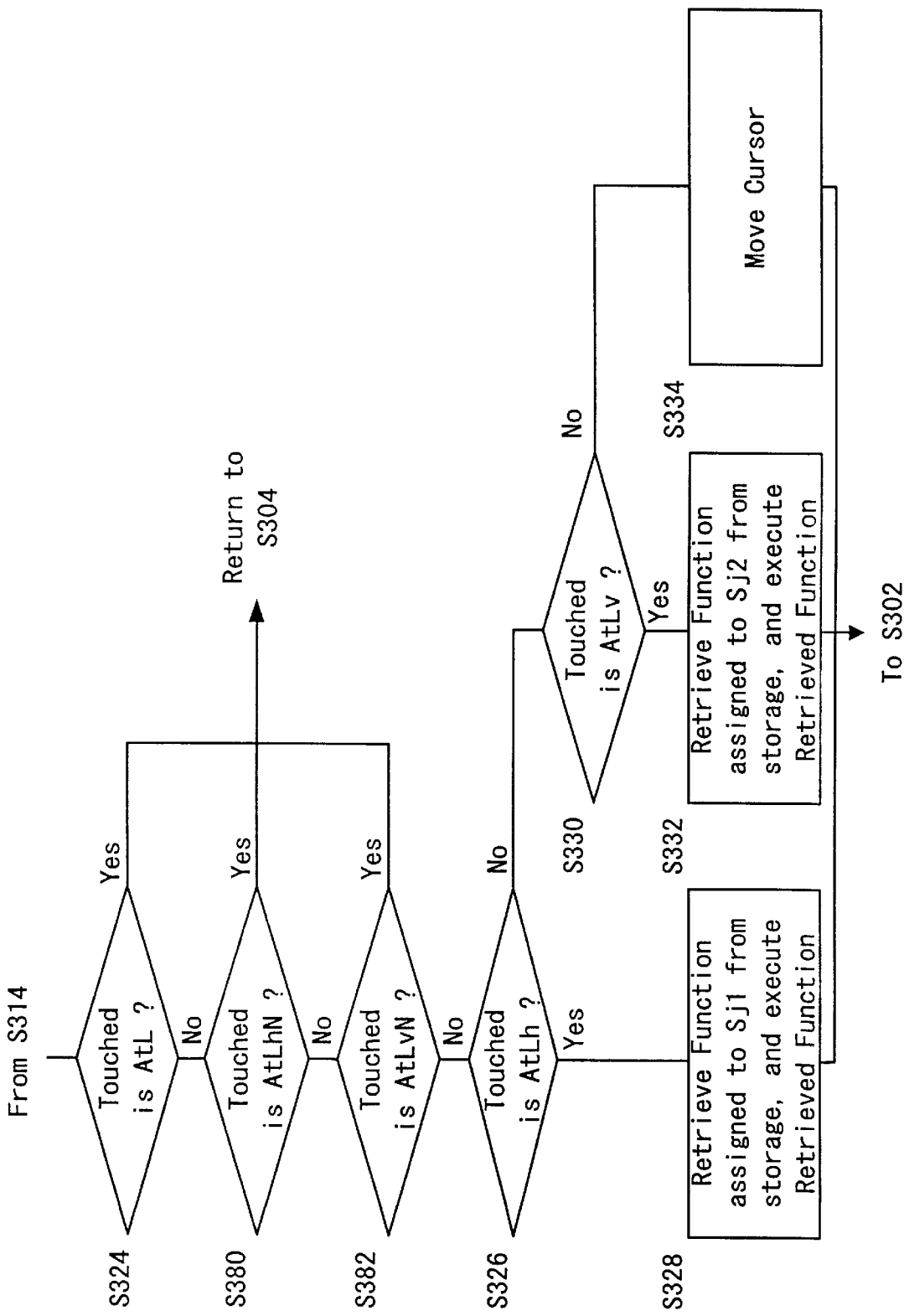

Referring to FIG. 46, described is the operation of the touch-sensitive tablet TSP3B for a user's operation starting from the function region AtL as shown in FIG. 40. Note that in the flow chart in FIG. 46, steps S380 and S382 are newly inserted between steps S324 and S326 in the above-described flow chart in FIG. 32.

In step S324, it is determined whether the currently-touched position is within the function region AtL shown in FIG. 40 or not. If within the function region AtL, no processing is performed, and the procedure returns to step S304. To the contrary, if not within the function region AtL, the procedure advances to step S380.

In step S380, it is determined whether the currently-touched position is within the insensitive region AtLhN shown in FIG. 40, or not. If within the insensitive region AtLhN, the procedure returns to step S304. If not within the insensitive region AtLhN, the procedure advances to step S382.

In step S382, it is determined whether the currently-touched position is within the insensitive region AtLvN shown in FIG. 40, or not. If within the insensitive region AtLvN, the procedure returns to step S304. On the other hand, if not within any of the insensitive regions AtLhN and AtLvN, the procedure advances to step S326.

The remainder of the processing in steps S326, S328, S330, S332 and S334 has been already described with reference to FIG. 32, and therefore the description thereof is omitted.

Figure 47:
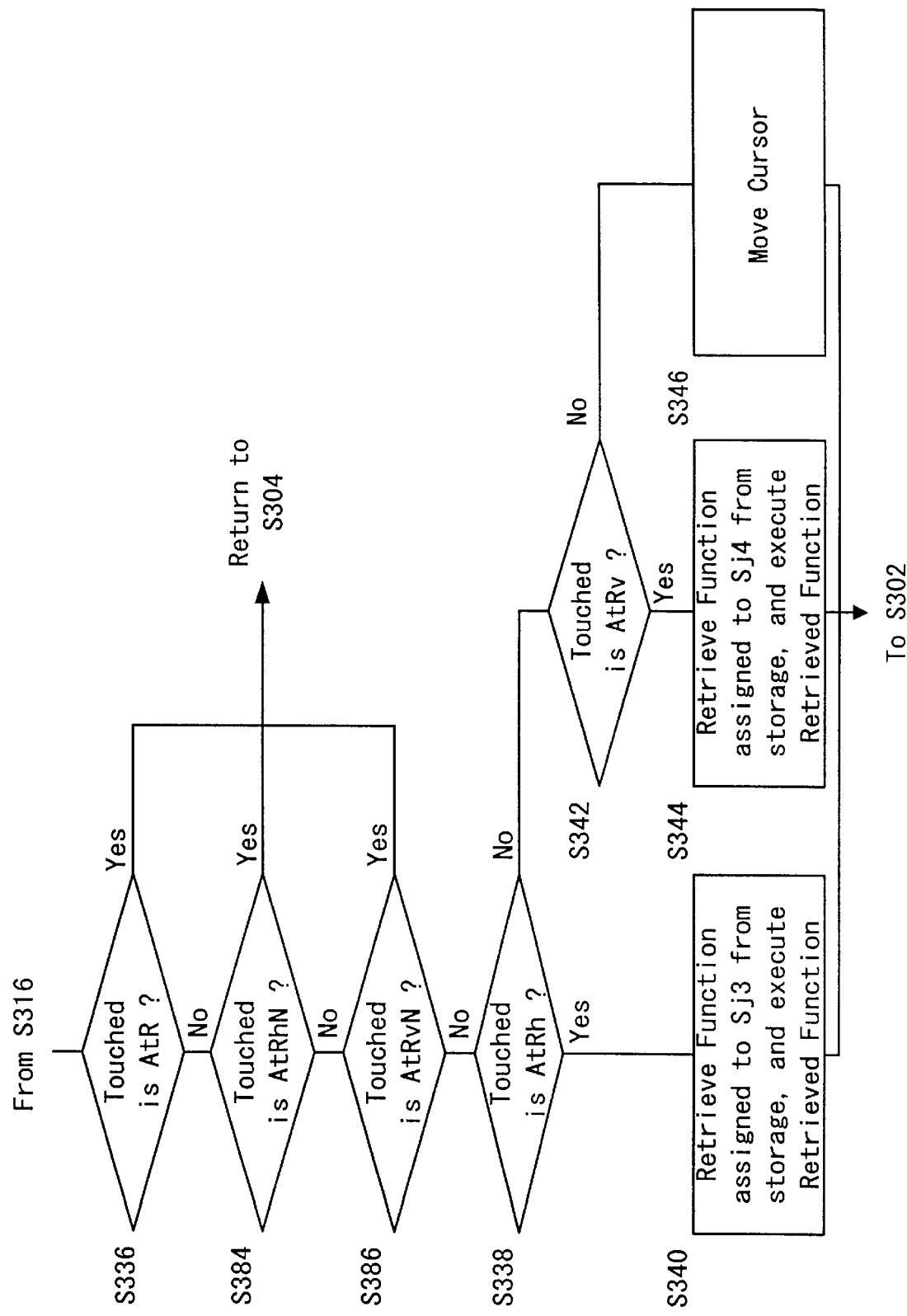

Referring to FIG. 47, described is the operation of the touch-sensitive tablet TSP3B for a user's operation starting from the function region AtR. Note that in the flow chart in FIG. 47, steps S384 and S386 are newly inserted between steps S336 and S338 in the above-described flow chart in FIG. 33.

In step S336, if it is determined that the currently-touched position is not within the function region AtR shown in FIG. 40, the procedure advances to step S384.

In step S384, it is determined whether the currently-touched position is within the insensitive region AtRhN shown in FIG. 40 or not. If within the insensitive region AtRhN, the procedure returns to step S304. Otherwise, the procedure advances to next step S386.

In step S386, it is determined whether the currently-touched position is within the insensitive region AtRvN, or not. If within the insensitive region AtRvN, the procedure returns to step S304. If not within the insensitive region AtRvN, the procedure advances to next step S338.

The remainder of the processing in steps S338, S340, S342, S344 and S346 has been already described with reference to FIG. 33, and therefore the description thereof is omitted.

Figure 48:
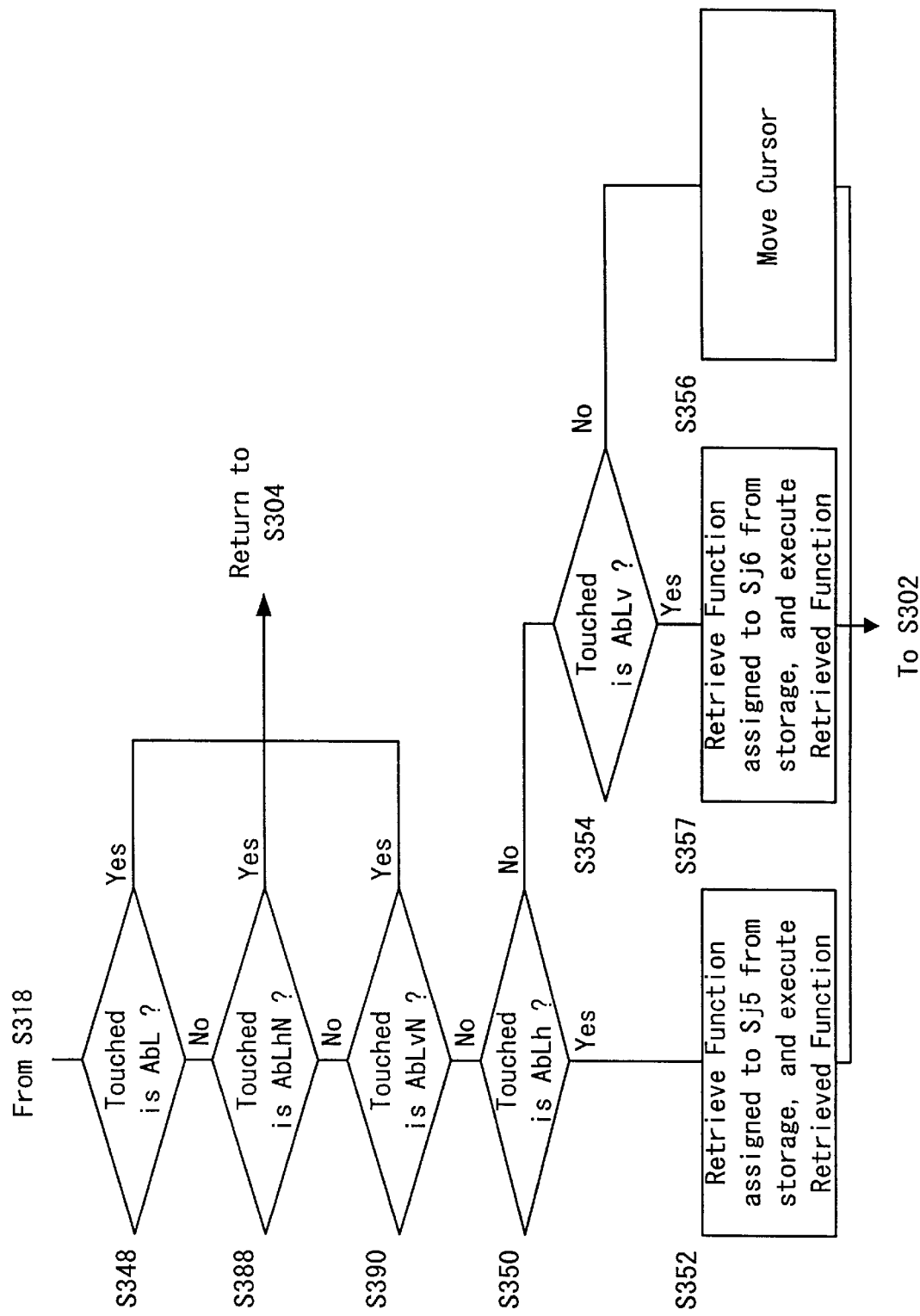

Referring to FIG. 48, described is the operation of the touch-sensitive tablet TSP3B for a user's operation starting from the function region AbL. Note that in the flow chart in FIG. 48, steps S388 and S390 are newly inserted between steps S348 and S350 in the above-described flow chart in FIG. 34.

Instep S348, if it is determined that the currently-touched position is not within the function region AbL, the procedure advances to step S388.

In step S388, it is determined whether the currently-touched position is within the insensitive region AbLhN, or not. If within the insensitive region AbLhN, the procedure returns to step S304. Otherwise, the procedure advances to next step S390.

In step S390, it is determined whether the currently-touched position is within the insensitive region AbLvN shown in FIG. 40, or not. If within the insensitive region AbLvN, the procedure returns to step S304. If not within the insensitive region AbLvN, the procedure advances to next step S350.

The remainder of the processing in steps S350, S352, S354, S356 and S357 has been already described with reference to FIG. 34, and therefore the description thereof is omitted.

Figure 49:
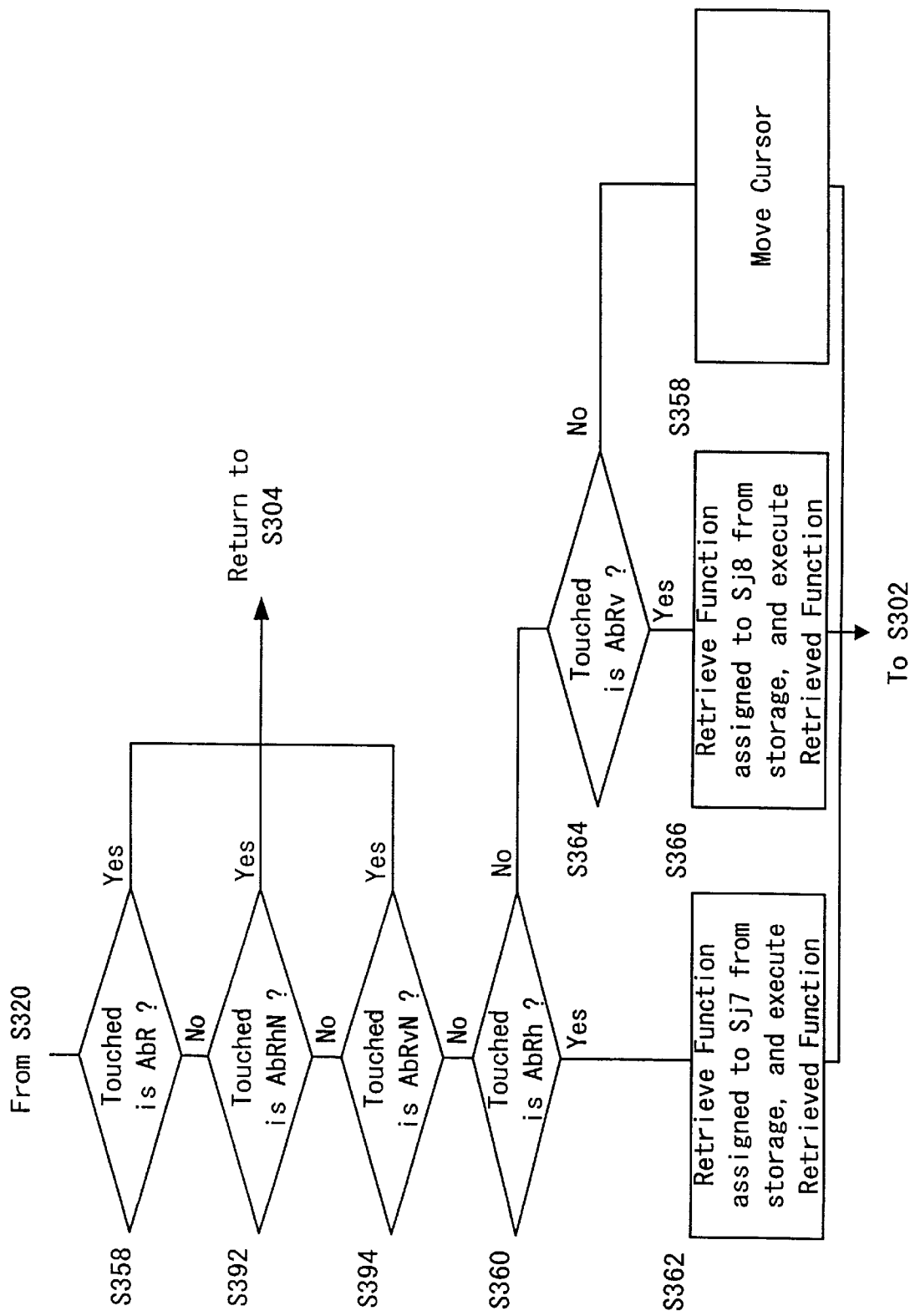

Referring to FIG. 49, described is the operation of the touch-sensitive tablet TSP3B for a user's operation starting from the function region AbR. Note that in the flow chart in FIG. 49, steps S392 and S394 are newly inserted between steps S358 and S360 in the above-described flow chart in FIG. 35.

In step S358, if it is determined that the currently-touched position is not within the function region AbR, the procedure advances to step S392.

In step S392, it is determined whether the currently-touched position is within the insensitive region AbRhN, or not. If within the insensitive region AbRhN, the procedure returns to step S304. Otherwise, the procedure advances to next step S394.

In step S394, it is determined whether the currently-touched position is within the insensitive region AbRvN shown in FIG. 40, or not. If within the insensitive region AbRvN, the procedure returns to step S304. If not within the insensitive region AbLvN, the procedure advances to next step S360.

The remainder of the processing in steps S360, S362, S364, S366 and S368 has been already described with reference to FIG. 35, and therefore the description thereof is omitted.

(Third Alternative of Third Embodiment)

Referring to FIGS. 50 to 57, described is a third alternative of the above-described touch-sensitive tablet TSP3 according to the third embodiment of the present invention. Prior to detailed description of the touch-sensitive tablet according to the present alternative and the operation thereof, the comparison with the touch-sensitive tablet TSP3 shown in FIG. 23 is described below.

As noted above, in the touch-sensitive tablet TSP3, a plurality of functions are assigned to each function region. Besides, the horizontal movement detecting region and the vertical movement detecting region are provided adjacently to each function region. At the time when the user first touches one of the function regions and puts the finger into any one of the movement detecting regions, one of the plurality of functions assigned to the function region is selectively executed.

A touch-sensitive tablet TSP3C according to the present alternative basically has the same configuration as the touch-sensitive tablet TSP3. However, the touch-sensitive tablet TSP3C is provided with first horizontal and vertical movement detecting regions contiguous to each function region. In addition, the touch-sensitive tablet TSP3 is provided with contiguous second to H-th (H is an integer) horizontal movement detecting regions and contiguous second to V-th (V is an integer) vertical movement detecting regions on a touch surface of a touch sensor 3101C.

The second to H-th horizontal movement detecting regions and the second to V-th vertical movement detecting regions are contiguous to the first horizontal movement detecting regions and vertical movement detecting regions, respectively. Moreover, between the plurality of horizontal and vertical movement detecting regions, provided are S number of (S is an integer not less than 1) diagonal movement detecting regions for detecting user's operations starting from each function region in the slanting direction.

In the touch-sensitive tablet TSP3C, a function assigned to one of the function regions is selectively executed from among a plurality of functions based on a combination pattern of movement detecting regions (hereinafter referred to as "route"). The route is formed by combination of movement detecting regions when a user first touches one of the function regions on the touch surface of the touch sensor 3101C and then moves the finger and the like from the first touched region to other regions. For example, the user may moves the finger and the like to the second or subsequent movement detecting regions through the first movement detecting region contiguous to the first touched function regions.

Figure 50:
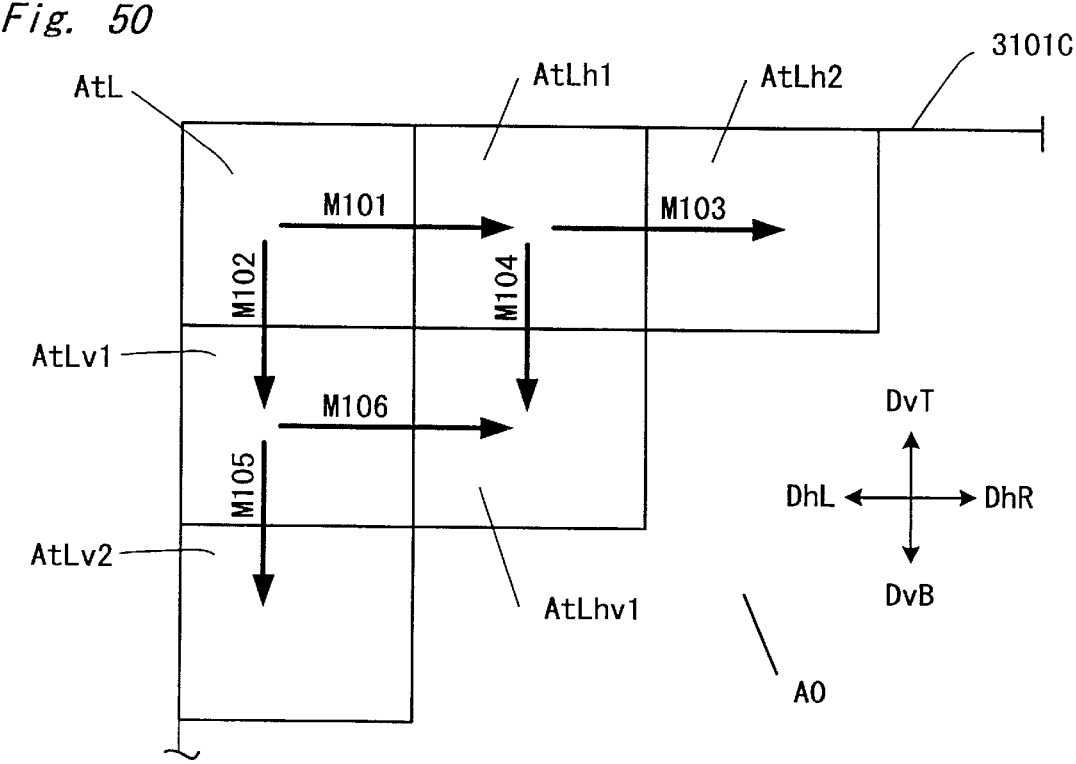
FIGS. 50 and 51 are enlarged views of part of a touch sensor according to a third alternative of the third embodiment of the present invention.

Referring to FIG. 50, described are exemplary regions provided on the touch surface of the above-mentioned touch sensor 3101C. In FIG. 50, the vicinity of the function region AtL is schematically shown. As shown in the example in FIG. 26, on the right of and below the function region AtL, respectively provided are horizontal movement detecting region AtLh and the vertical movement detecting region AtLv. It is to be noted that the horizontal movement detecting region AtLh and the vertical movement detecting region AtLv are equivalent to the above-mentioned first horizontal movement detecting region AtLh1 and first vertical movement detecting region AtLv1 in the present example. In addition, on the right of a first horizontal movement detecting region AtLh1, provided are a second horizontal movement detecting region AtLh2 to an H-th horizontal movement detecting region AtLhH (not shown in the drawing). Further, below the first vertical movement detecting region AtLv1, provided are a second vertical movement detecting region AtLv2 to a V-th vertical movement detecting region AtLvV (not shown in the drawing). Furthermore, between the horizontal movement detecting regions AtLh1 to AtLhH and the vertical movement detecting regions AtLv1 to AtLvV, provided are diagonal movement detecting regions AtLhv1 to AtLhvS (not shown in the drawing).

Table 6 below shows the relation between the routes of user's operations and the corresponding selection of functions. The contents of the relation is also briefly described below. In each route, the user moves the finger from one of the function regions to a plurality of movement detecting regions to select one of the functions assigned to the function region.

TABLE 6

| State | User's operation | Option before user's operation | Option after user's operation |
|---|---|---|---|
| 1 | Touch nowhere No input operation | F1 to Ff | F1 to Ff |
| 2 | Touch AtL | F1 to Ff | F1, F2, F3 and F4 |
| 3 | Touch AtL and then input operation M101 | F1, F2, F3 and F4 | F1 and F2 |
| 4 | Touch AtL and then input operation M102 | F1, F2, F3 and F4 | F3 and F4 |
| 5 | Touch AtL and then input operations M101 and M103 | F1 and F2 | F1 |
| 6 | Touch AtL and then input operations M101 and M104 | F1 and F2 | F2 |
| 7 | Touch AtL and then input operations M102 and M105 | F3 and F4 | F3 |
| 8 | Touch AtL and then input operations M102 and M106 | F3 and F4 | F4 |

In Table 6, numbers in the column "state" are given to identify the state of user's operations in the touch sensor 3101C. the column "User's operation", shown is user's input operations performed by the user. In the column "Option before user's operation", shown are selectable functions before the user's operation out of all functions assigned to the function regions the touch sensor 3101C. In the column "Option after user's operation", shown is still selectable functions after the user's operation.

Specific description of Table 6 is made below.

In a state 1, the user does not manipulate of make any action to the touch-sensitive tablet TSP3C at all. At this point, all the functions assigned to the function regions in the touch sensor 3101C of the touch-sensitive tablet TSP3C, i.e., functions F1 to Ff (f is a positive integer) are selectable. This means that the functions F1 to Ff are available as options before the user's operation.

In a state 2, the user touches the function region AtL. The options before the touch are the functions F1 to Ff. Note that as a result of the touch, the options after the user's operation are narrowed from the functions F1 to Ff down to the functions F1 to F4 as selectable functions.

In a state 3, the user makes a compound input operation such that the user first touches the function region AtL and then performs a plurality of input operations. This exemplary compound input operation is defined as an input operation M101. The options before the compound input operation are the functions F1 to F4 equivalent to the options after the user's operation resulting from the touch in the state 2. As a result of the compound input operation, the selectable functions are narrowed down to the functions F1 and F2.

In a state 4, the user first touches the function region AtL and then performs a compound input operation, that is, an input operation M102. The options before the compound input operation are the functions F1 to F4 equivalent to the options after the user's operation resulting from the user's operation in the state 3. As a result of the compound input operation, the selectable functions are narrowed down to the functions F3 and F4.

In a state 5, the user further performs an input operation M103 subsequently to the user's operation in the state 3. Resultantly, the function F1 becomes the option after the user's operation in the state 5 out of the functions F1 and F2 equivalent to the options after manipulation in the state 3.

In a state 6, the user further performs an input operation M104 subsequently to the user's operation in the state 3. As a result, the function F2 becomes the option after the user's operation in the state 6 out of the functions F1 and F2 equivalent to the options after the user's operation in the state 3.

In a state 7, the user further performs an input operation M105 subsequently to the user's operation in the state 4. Resultantly, the function F3 becomes the option after the user's operation in the state 7 out of the functions F3 and F4 equivalent to the options after the user's operation in the state 3.

In a state 8, the user further performs an input operation M106 subsequently to the user's operation in the state 3. As a result, the function F4 becomes the option after the user's operation in the state 8 out of the functions F1 and F2 equivalent to the options after the user's operation in the state 3.

As described above, while the user's finger is moved over a plurality of movement detecting regions from the first touched region, a plurality of functions assigned to the function region are narrowed down each time the finger enters a different movement detecting region (tracing a specific route). While Table 6 provides the example of the function region AtL, it is needless to say that the function region is not restricted to the above example.

Referring to FIG. 50, briefly described is how the functions are narrowed down in the present alternative. To a series of input operations (M101 to M106) starting from the function region AtL, the functions shown in Table 6 are assigned. When the user first touches the function region AtL and moves the finger along the touch surface, options are narrowed down to the four functions F1 to F4 assigned to the function region AtL. At the time when the option becomes one, the corresponding function is executed. Specifically, it is defined herein that the input operation M101 is performed while the user first touches the function region AtL and then glides the finger to the horizontal movement detecting region AtLh1. Likewise, it is defined that the input operation M102 is performed when the user moves the finger from the function region AtL to the vertical movement detecting region AtLv1. The input operations M103 to M106 are similarly defined.

The state 1 in Table 6 represents an initial state, indicating that there are other regions to be a starting point other than the function region AtL and that executable functions are the functions F1 to Ff in the entire touch-sensitive tablet TSP3C. The state 2 in Table 6 represents a state that the options are narrowed down to the functions F1 to F4 assigned to the function region AtL. Such state is caused by a touch to the function region AtL in FIG. 50 made in the initial state. Table 6 shows that in the state 3, when the input operation M101 is further performed in the state 2, the options are narrowed down to the two functions F1 and F2. When the input operation M103 is further performed in the state 3, the options are narrowed down to only the function F1. At this stage, it is possible to execute the function F1.

Figure 51:
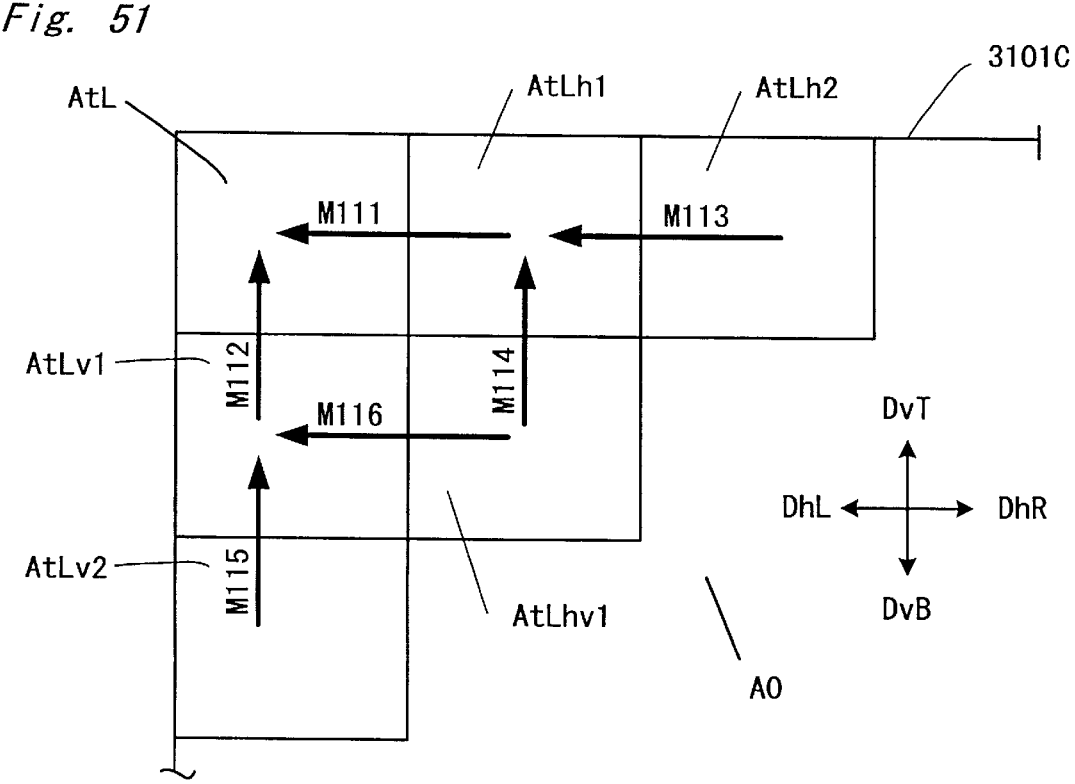

Next, referring to FIG. 51, described is the operation of the touch-sensitive tablet TSP3C for canceling a narrowing-down processing in progress. In the same manner as in FIG. 50, input operations M111 to M116 are defined as user's operations detected between the regions. For example, in the state 3, it is possible to bring the state of the user's operation back to the state 2 by performing the input operation M111.

Figure 52:
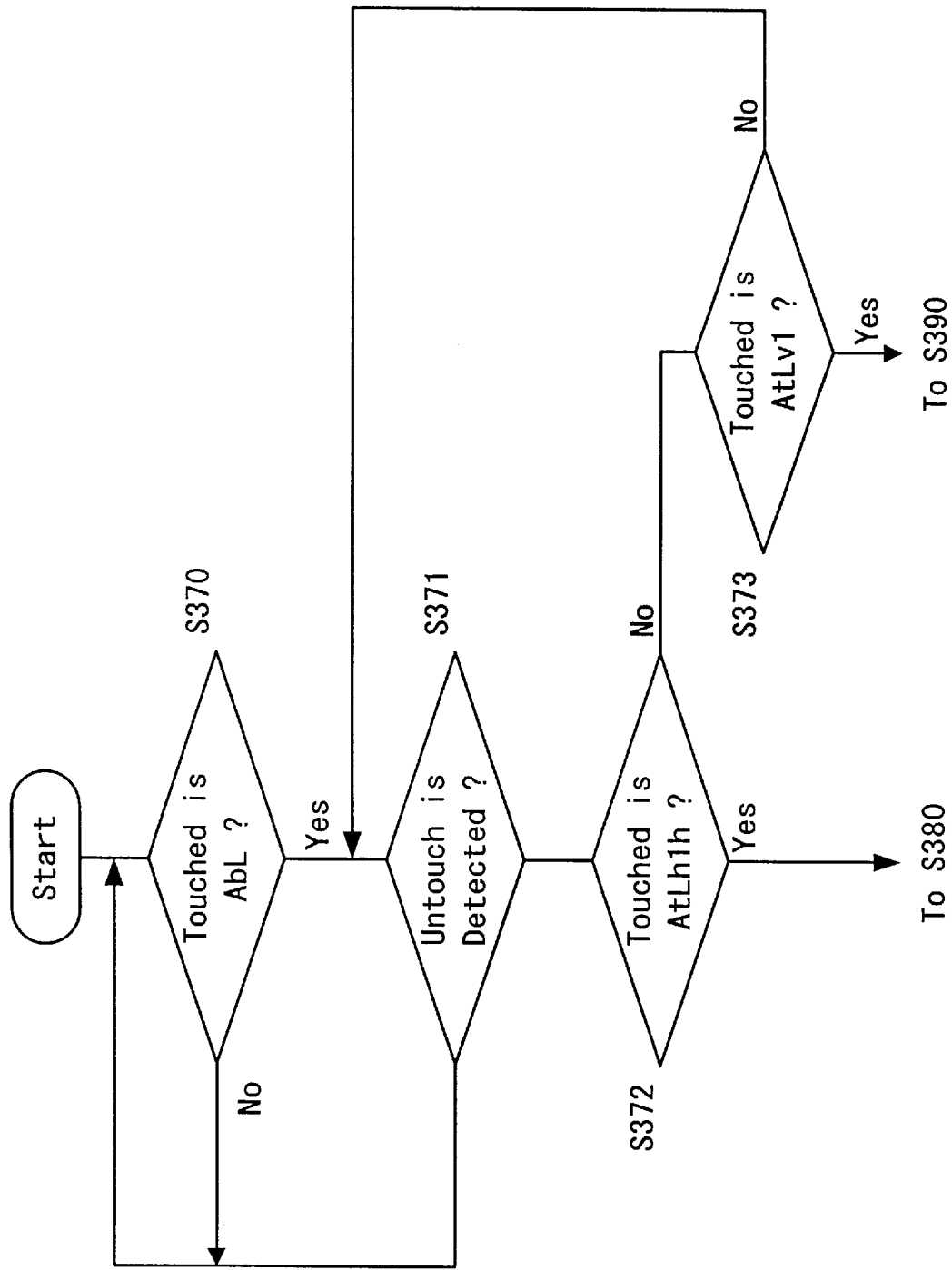
FIGS. 52, 53 and 54, constitute a flow chart delineating the operation of the touch-sensitive tablet, according to a third alternative of the third embodiment of the present invention.
Figure 53:
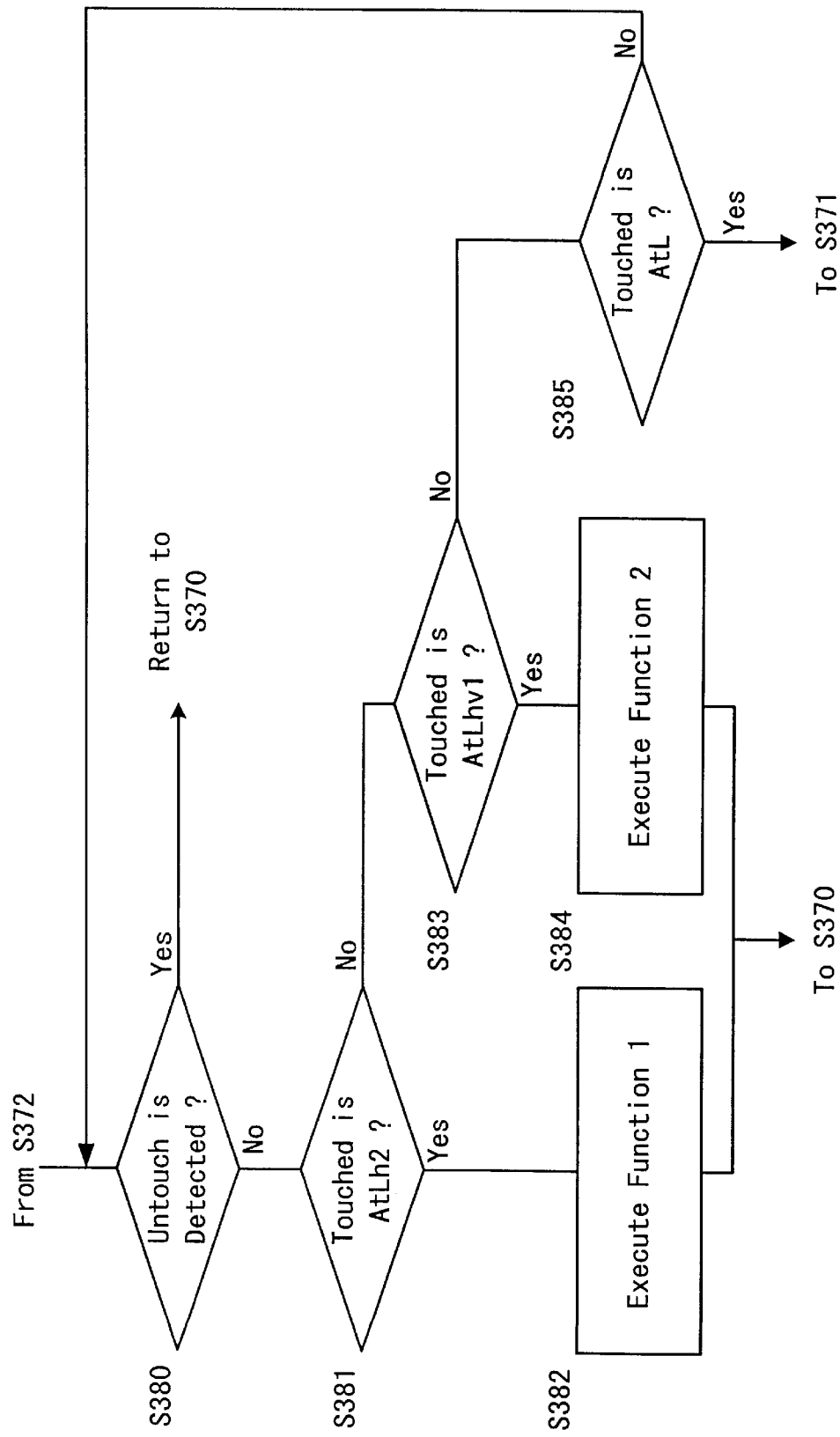
Figure 54:
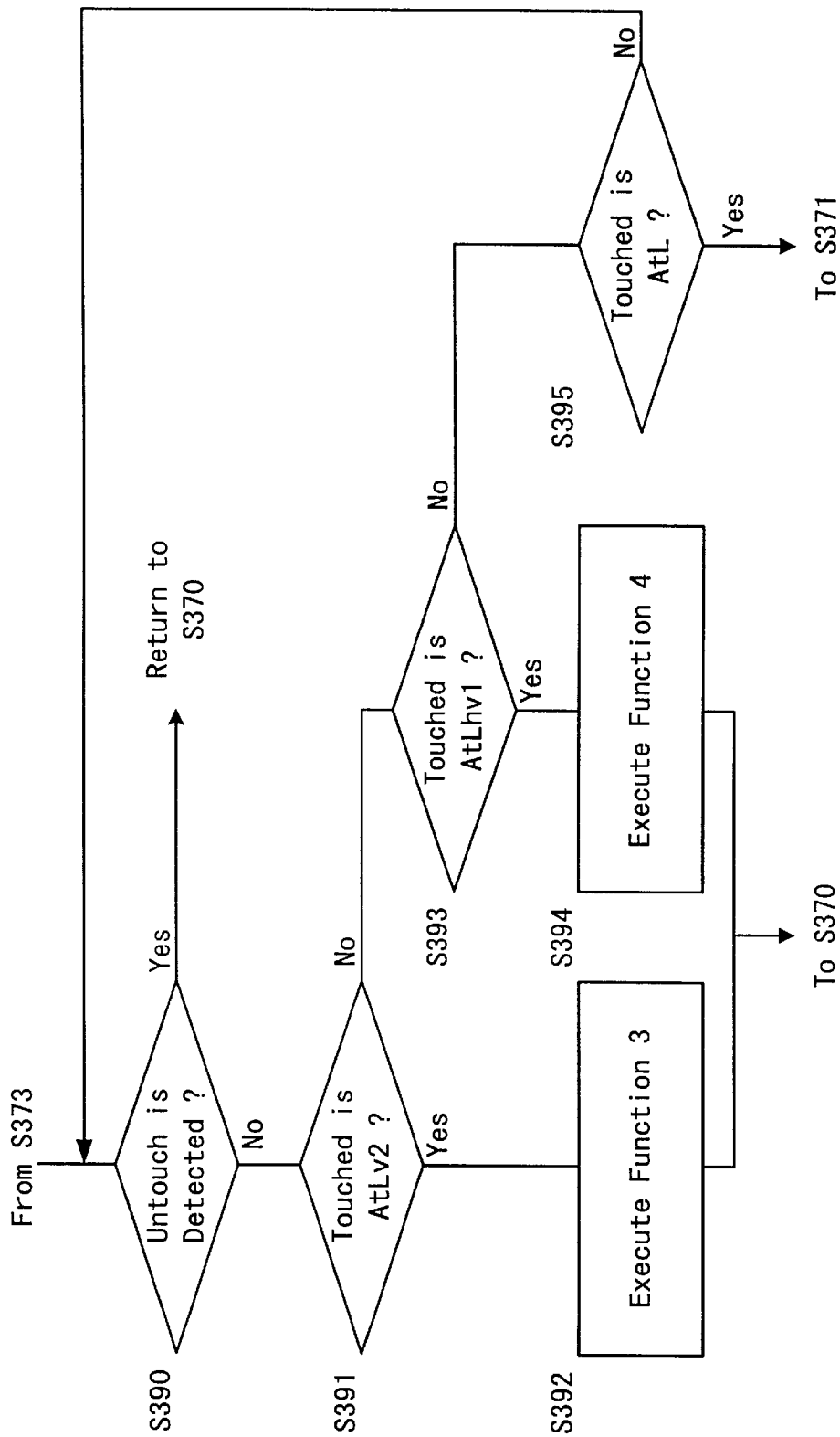

Referring to flow charts in FIGS. 52, 53 and 54, description is made of the operation of the touch-sensitive tablet TSP3C according to the present alternative for a user's operation starting from the function region AtL.

First, in step S370, it is determined whether the function region AtL is touched, or not If No is returned, the procedure returns to step S370. If Yes is returned, the procedure advances to next step S371.

In step S371, it is determined whether an untouch is detected or not. If an untouch is detected, meaning that the user stops and terminates the manipulation, the result of step S371 is Yes. Then, the procedure loops back to step S370. Otherwise, the procedure advances to next step S372.

In step S372, it is determined whether the first horizontal movement detecting region AtLh1 is touched, or not. If Yes, the procedure advances to step S380 (in FIG. 53). If No, the procedure advances to step S373.

In step S373, it is determined whether the first vertical movement detecting region AtLv1 is touched, or not. If No, that is, either the first horizontal movement detecting region AtLh1 or the first vertical movement detecting region AtLv1 is not touched, the procedure loops back to step S371. Then, the above-described touch detecting processing is repeated until an untouch is detected in step S371, a touch on the first horizontal movement detecting region AtLh1 is detected in step S372, or a touch on the first vertical movement detecting region AtLv1 is detected in step S373. At the time when a touch on the first vertical movement detecting region AtLv1 is detected, the result of step S373 is Yes. The procedure then advances to step S390 (in FIG. 54).

Referring to FIG. 53, described is the procedure in the case that the first horizontal movement detecting region AtLh1 is touched (when the result of step S372 is Yes). At the time when step S372 returns Yes, the functions to be executed are narrowed down to the functions F1 and F2.

In step S380, it is determined whether an untouch is detected or not. If an untouch is detected, the procedure returns to step S370 and repeats the same steps from the beginning. If an untouch is not detected, the procedure advances to step S381.

In step S381, it is determined whether the second horizontal movement detecting region AtLh2 is touched or not. If the second horizontal movement detecting region AtLh2 is touched, the procedure advances to step S382. Note that the selectable functions are narrowed down to the function F1 in this step.

In step S382, the function F1 is executed. Then, the procedure returns to step S370.

On the other hand, if step S381 returns No, that is, the second horizontal movement detecting region AtLh2 is not touched, the procedure advances to step S383.

In step S383, it is determined whether the diagonal movement detecting region AtLhv is touched, or not. If Yes, the procedure advances to step S384. Note that the selectable functions are narrowed down to the function F2 in this step.

In step S384, the function F2 is executed. Then, the procedure returns to step S370.

On the other hand, if step S383 returns No, that is, the diagonal movement detecting region AtLhv is not touched, the procedure advances to step S385.

In step S385, it is determined whether the function region AtL is touched, or not. If Yes, the procedure returns to step S371. In this case, the user's operation matches the input operation M111 shown in FIG. 51. If No, the procedure returns to step S380.

Although user's operations equivalent to the input operations M113 and M114 are not detected in the above-stated flow charts, such user's operations can be realized by performing detection processing in steps S382 and S384. More specifically, the functions F1 and F2 shall not be executed in steps S382 and S384, respectively, but executed with a click of a button and other attachments of the touch-sensitive tablet TSP3C, for example. Then, whether the user's finger goes back to the previous region, or not is determined by region judgement processing similar to the judgement processing in steps S380, S381, S383, and S385. Thus, it is possible to detect user's operations equivalent to the input operations M113 and M114.

In FIG. 54, shown is the processing in the touch-sensitive tablet TSP3C after the first vertical movement detecting region AtLv1 is touched. The procedure in FIG. 54 is basically identical to that described with reference to FIG. 53, and therefore the description thereof is omitted.

Note that when there are a plurality of function regions to be a starting point of a user's operations available, the similar judgment processing must be performed the same number of times as the number of the function regions. A judgment on the function regions AtL, AtR, AbL, and AbR can be made, for example, by connecting the above-described flow charts in FIGS. 52 to 54 to each of steps S314, S316, S318 and S319 in the flow chart shown in FIG. 31. Note that the flow charts in FIGS. 52 to 54 shall be adjusted for the corresponding function region before the connection.

(Fourth Alternative of Third Embodiment)

Figure 55:
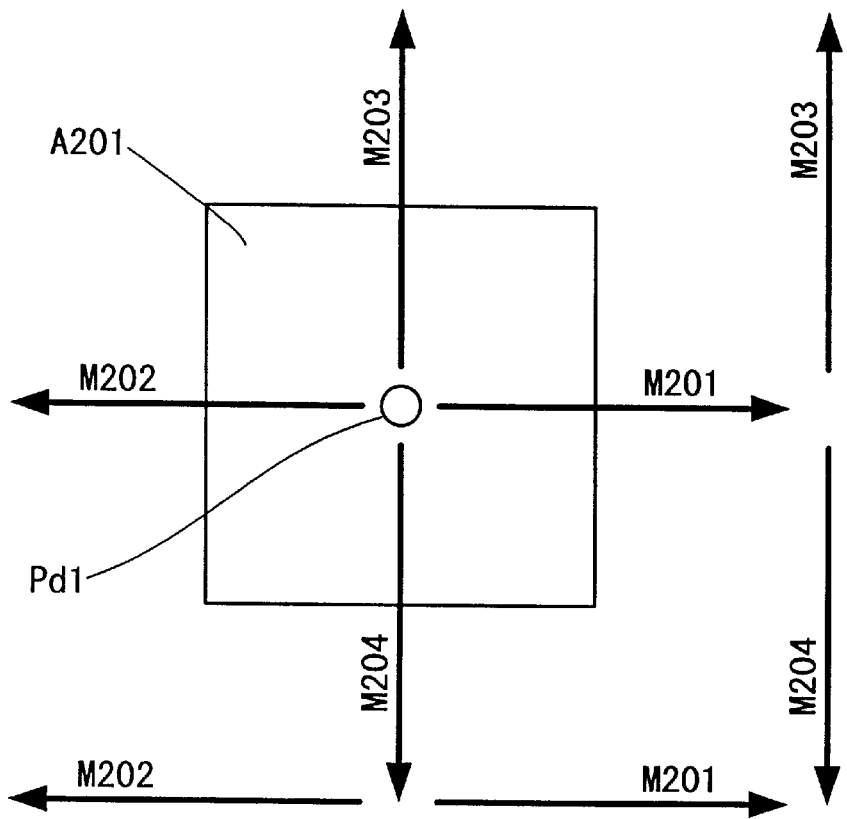
FIG. 55 is a diagram used to describe how input operations are performed in the touch sensor of the touch-sensitive tablet according to the third embodiment of the present invention.
Figure 56:
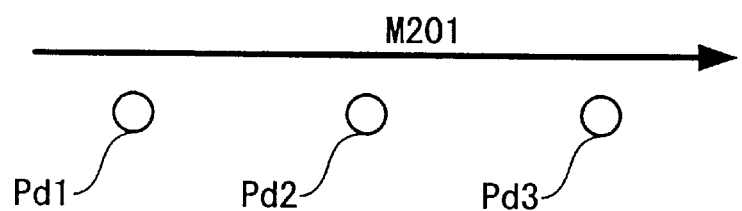
FIG. 56 is a diagram used to describe an exemplary method of detecting the direction of an input operation based on touched points in the touch sensor shown in FIG. 55.
Figure 57:
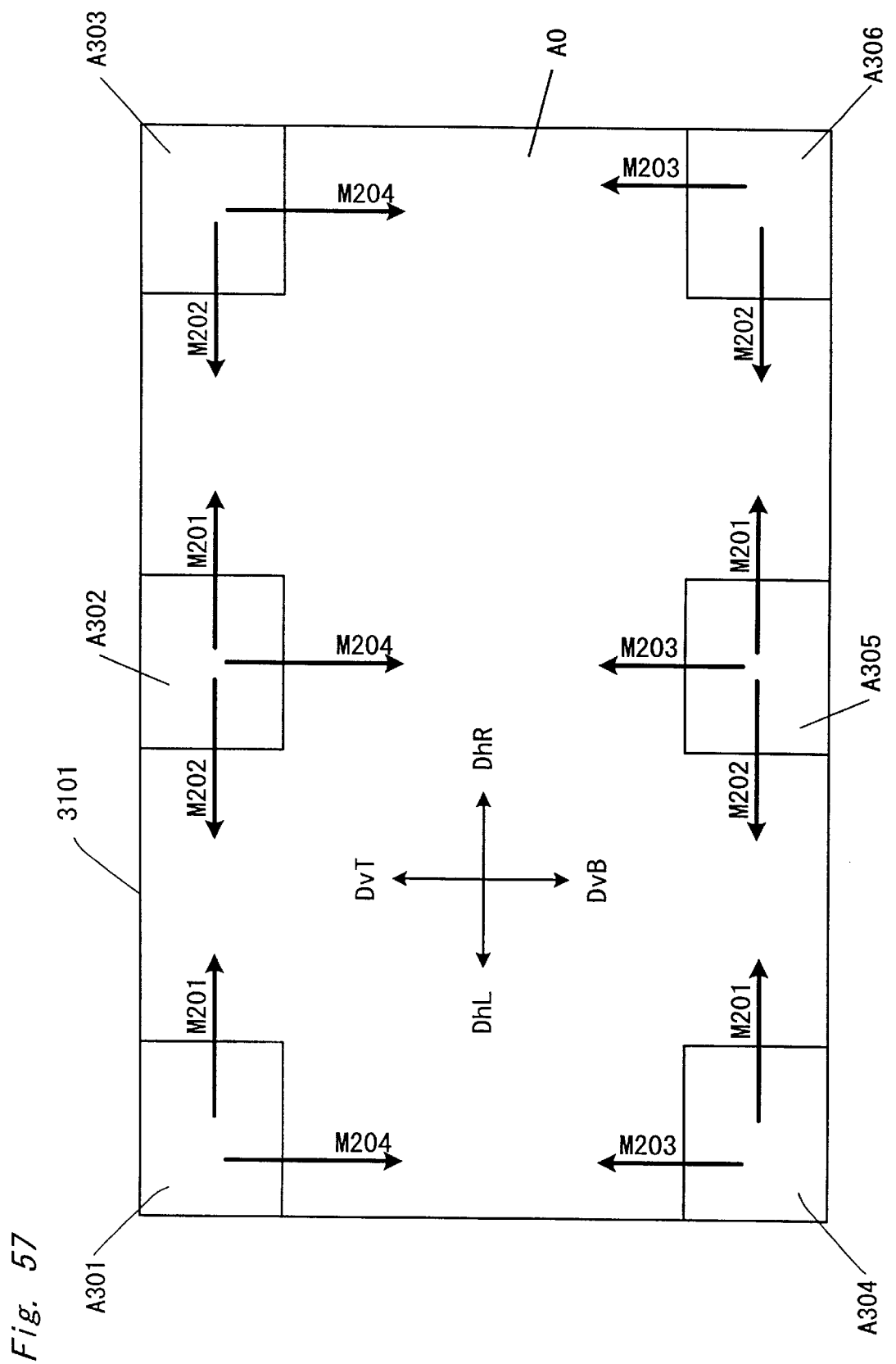
FIG. 57 is a top plan view of the touch sensor having specific functions as shown in FIG. 55.

Referring to FIGS. 55, 56 and 57, described a fourth alternative of the above-described touch-sensitive tablet TSP3 according to the third embodiment of the present invention. Prior to specific description of a touch-sensitive tablet and the operation thereof according the present alternative, the basic conception is first described. The touch-sensitive tablet according to the present alternative has a table showing correspondence between user's operations and operations (functions) to be executed thereby. Each user's operation is expressed by combinations of each of first specific regions and the direction of finger movement. The first specific regions are provided to detect a starting point of touch. The directions of finger movement must be parallel to specific directions to execute the functions assigned to the first specific regions.

In FIG. 55, shown is a starting point of touch in one of the specific regions and user's operations from the starting point. In FIG. 55, A201 represents one of the first specific regions for detecting a starting point of touch, and a detection point Pd1 represents a starting point of touch. Input operations M201 to M204 represent user's operations in the four directions parallel to the X-Y axes, and are recognized irrespective of a starting point of touch.

In FIG. 56, shown is an exemplary method of recognizing a user's operation. The input operation M201, for example, can be recognized by continuous touch information ITc composed of position information, detection time information, and other information about continuous detection points Pd1 to Pd3. The input operation M201 may be recognized when a total of a distance between the detection points Pd1 and Pd2 and a distance between the detection points Pd2 and Pd3 exceeds a predetermined value. Alternatively, it is possible to detect the input operation M201 based on a total of distances among the detection points detected within a predetermined time period.

In Table 7 shown below, provided are exemplary user's operation starting from the region A201 and corresponding function assignable states.

TABLE 7

| State | User's operation |
|---|---|
| 1 | Touch nowhere |
|   | No input operation |
| 2 | Touch on A201 |
| 3 | Touch on A201 and input operation M201 |
| 4 | Touch on A201 and input operation M202 |
| 5 | Touch on A201 and input operation M203 |
| 6 | Touch on A201 and input operation M204 |
| 7 | Touch on A201, then input operations M201 and M201 |
| 8 | Touch on A201, then input operations M201 and M202 |
| 9 | Touch on A201, then input operations M201 and M203 |
| 10 | Touch on A201, then input operations M201 and M204 |
| 11 | Touch on A201, then input operations M202 and M201 |
| 12 | Touch on A201, then input operations M202 and M202 |
| 13 | Touch on A201, then input operations M202 and M203 |
| 14 | Touch on A201, then input operations M202 and M204 |
| 15 | Touch on A201, then input operations M203 and M201 |
| 16 | Touch on A201, then input operations M203 and M202 |
| 17 | Touch on A201, then input operations M203 and M203 |
| 18 | Touch on A201, then input operations M203 and M204 |
| 19 | Touch on A201, then input operations M204 and M201 |
| 20 | Touch on A201, then input operations M204 and M202 |
| 21 | Touch on A201, then input operations M204 and M203 |
| 22 | Touch on A201, then input operations M204 and M204 |
| 23 | Touch on A201, then input operations M201 and M201 . . . |
| . . . | . . . |

Table 7 shows that a user's operation starting from the region A201 produces a plurality of states. It is thus possible assign a specific function to each stage of states. A state 1 indicates an initial state, and means that functions assigned the region A201 and other regions are available as options. state 2 is a state where the region A201 is touched, and means at a plurality of functions assigned to the region A201 are selected. A state 3 is a result of the input operation M201 performed in the state 2. It is possible to assign a function to the state 3. Further, the state 8 is a result of the input operation M202 accomplished in the state 3, and can be assigned a function. Moreover, in Table 7, the other states also indicate that touch on the specific region and the input operation therefrom produce function assignable states.

Referring to FIG. 57, described is an example of how to allocate a plurality of regions equivalent to the region A201. Regions A301 to A306 are each equivalent to the region A201. Input operations M201 to M204 is the same as those in FIG. 55. In FIG. 57, it is possible to assign a lot of functions to each of the six regions A301 to A306 as in the same manner in Table 7.

As described in the above, according to the present invention, it is possible to avoid misoperation, such as starting an application program or a menu by mistake, caused by a light touch of a finger. Further, it is possible to quickly executing a window operation without moving a cursor. Moreover, the present invention has advantageous effects that misoperation can be reduced in number as compared with the case of executing a function with a double tap on a specific region, which facilitates start up of functions. Furthermore, a plurality of functions can be assigned to one region. For example, by assigning a menu display function for a window, after executing the function, it is possible to select a menu entry with the touch-sensitive tablet, which minimizes cursor movement.

Fourth Embodiment

Referring to FIGS. 58 to 64, a fourth embodiment according to the present invention is now described. Prior to detailed description of the present embodiment, the basic concept thereof is described. Consider the case in which the user operates an appropriate pointing device such as the touch-sensitive tablet according to the above described present invention to select an icon displayed on a screen. In this case, the user operates the pointing device to move a cursor onto the desired icon, and then presses a selection key, thereby selecting the icon. However, as information processors become lighter in weight and slimmer in size, keyboards, pointing devices, displays and the like become smaller, causing small display of icons and a cursor. As a result, operability of icons are degraded with the above mentioned icon selecting method. To solve such inconvenience, an object of the present embodiment is to allow quick icon selection regardless of the display size of icons.

Figure 58:
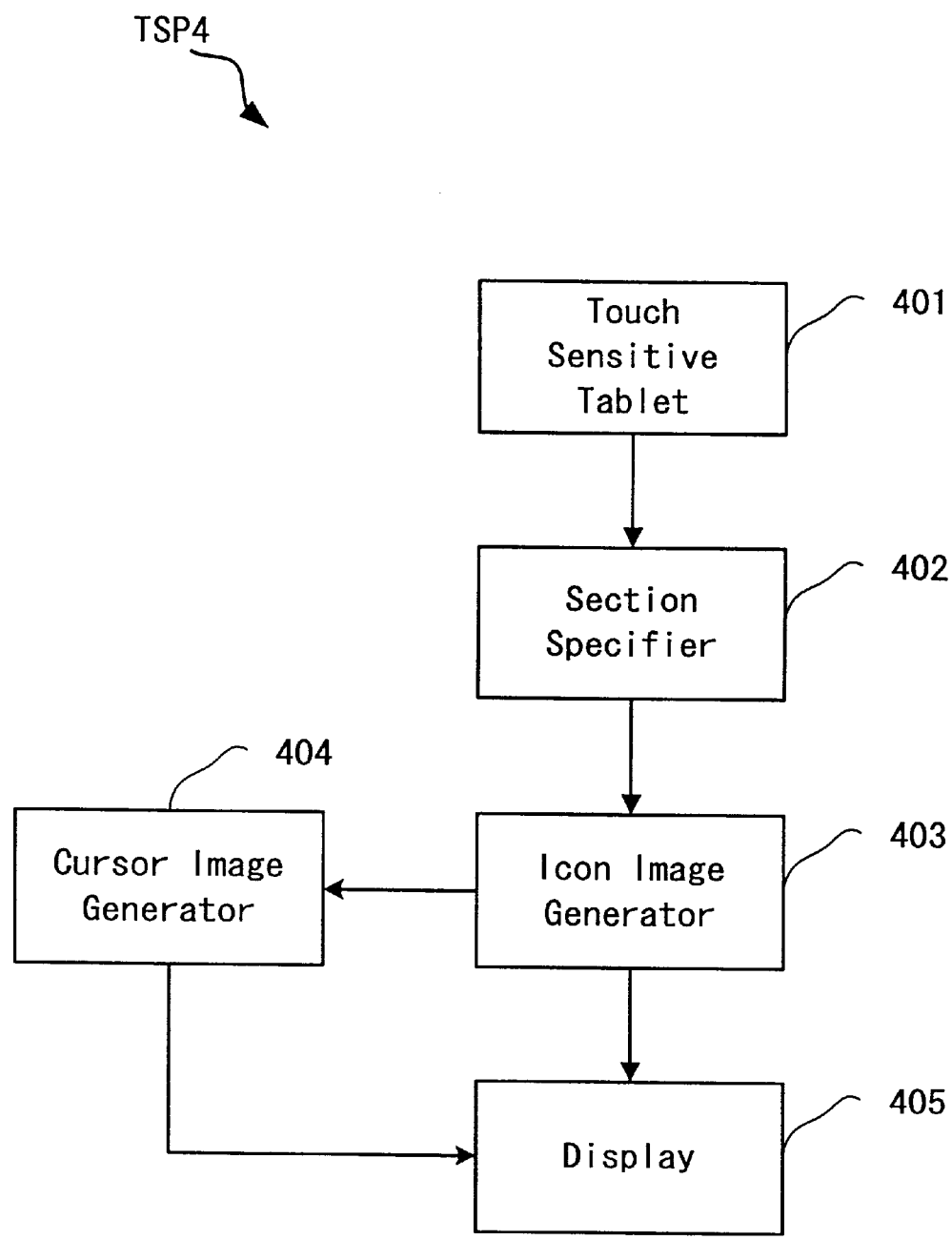
FIG. 58 is a block diagram showing the structure of an icon display device with a touch-sensitive tablet incorporated according to a fourth embodiment of the present invention.

Referring to FIG. 58, described is the structure of an icon display device with a touch-sensitive tablet equipped according to the fourth embodiment of the present invention. An icon display device IDA includes a touch sensitive tablet 401, a section specifier 402, an icon image generator 403, a cursor image generator 404, and a display 405. The touch sensitive tablet 401 outputs coordinates of a position touched by user's operation. The section specifier 402 manages the coordinates outputted from the touch sensitive tablet 401 using one or more sections, and specifies the section including the outputted coordinates. The display 405 displays icons, a cursor and the like.

The icon image generator 403 generates images of icons included in the sections managed by the section specifier 402, and has the display 405 display the icon images corresponding to the sections managed by the section specifier 402. The icon image generator 403 further has the display 405 display the icon corresponding to the section specified by the section specifier 402 in distinction from another icon. The cursor image generator 404 generates an image of a cursor, and has the display 405 display the cursor image at a position corresponding to the coordinates outputted from the touch sensitive tablet 401, the position located on the icon corresponding to the section specified by the section specifier 402. Note that, although preferably structured by the touch-sensitive tablet according to the above described present invention, the touch sensitive tablet 401 may be structured by other means as long as it can input two-dimensional coordinates.

Figure 59:
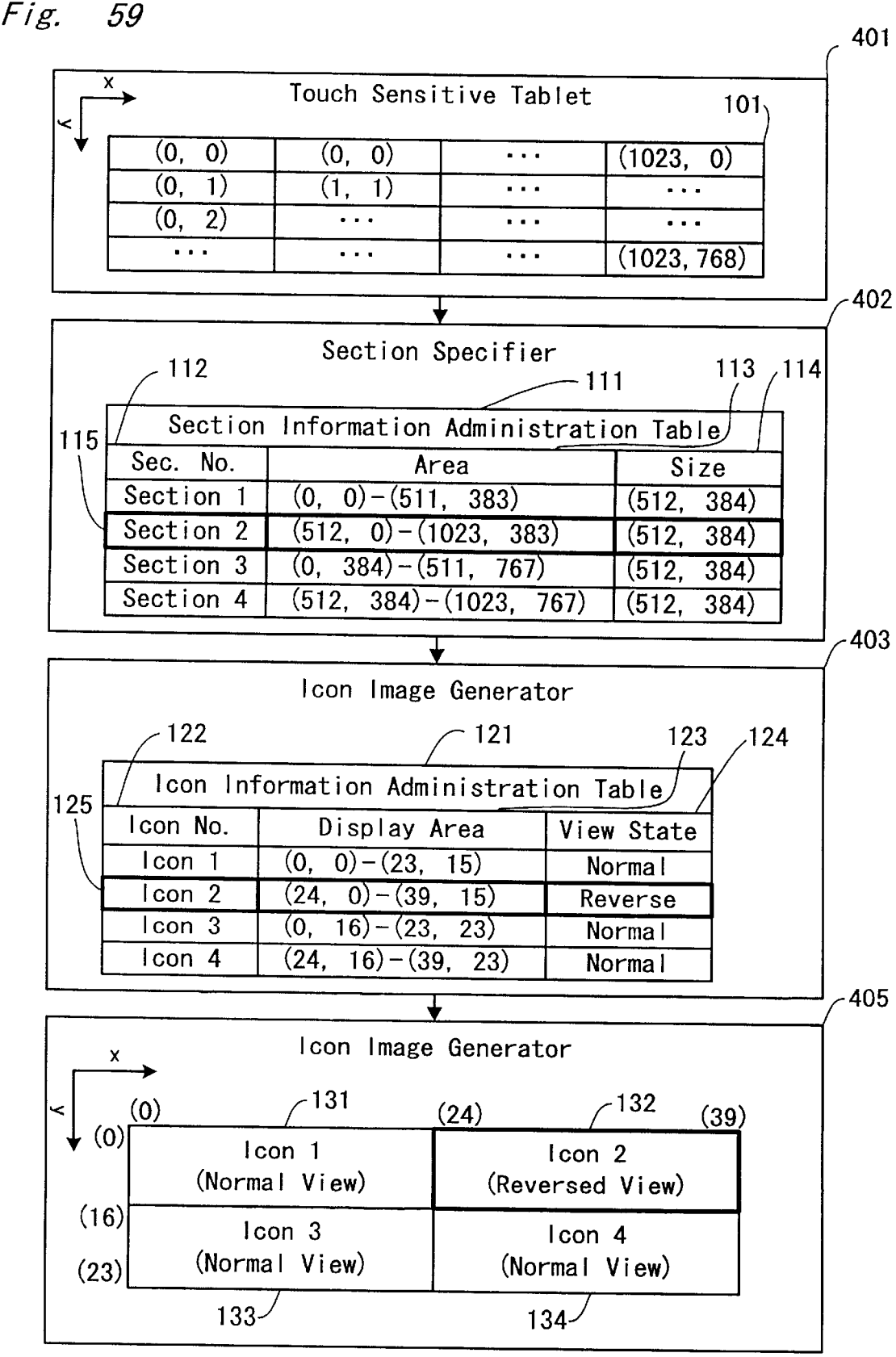
FIG. 59 is a diagram illustrating an icon display process in the icon display device shown in FIG. 58.

Referring to FIG. 59, described are the touch sensitive tablet 401 of the icon display device IDA and the icons displayed on the display 405. The touch sensitive tablet 401 has a sensor arranged in each area composing a display area defined as 1024 rows by 768 lines. In FIG. 59, when the user touches a sensor 101 positioned at the upper-right corner, the touch sensitive tablet 401 outputs coordinates (1023, 0).

The section specifier 402 is provided with a section information administration table 111 composed of a section number 112, an area 113 and a section size 114. The section specifier 402 compares the coordinates outputted from the touch sensitive tablet 401 with the section information administration table 111 to specify a section 115 as the section including the outputted coordinates. The section specifier 402 then notifies the icon image generator 403 of the specified section and its relative coordinates within the section.

The icon image generator 403 is provided with an icon information administration table 121 composed of an icon number 122, a display area 123, and a view state 124. The icon display device 403 compares the section notified by the section specifier 402 with the icon information administration table 121. The icon image generator 403 then specifies icon information 125 as an icon corresponding to the notified section, and sets the view state of the icon information 125 as "reverse". According to the contents of the icon image generator 403 and the icon information administration table 121, a first icon 131, a second icon 132, a third icon 133 and a fourth icon 134 are displayed on the display 405.

Figure 60:
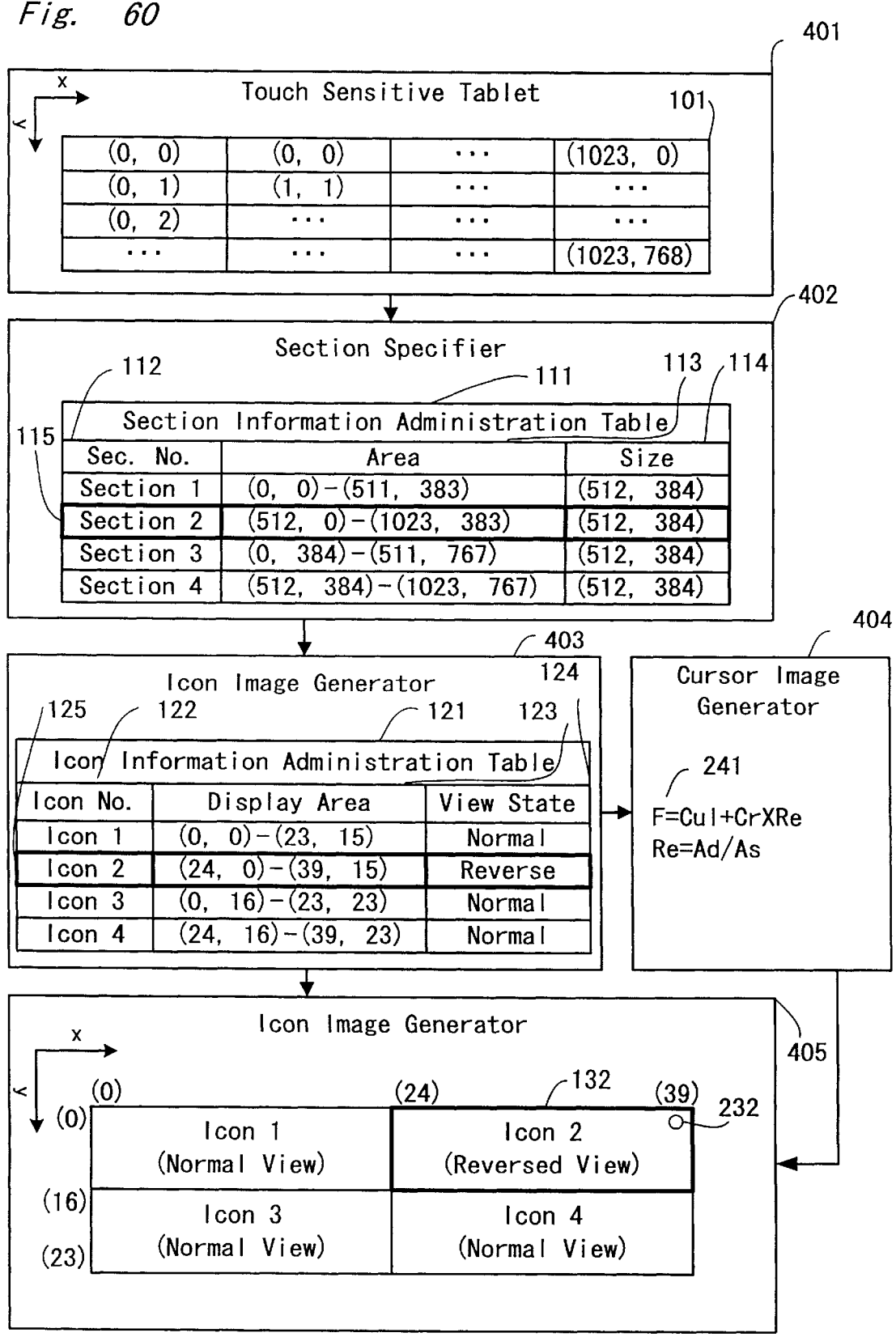
FIG. 60 is a diagram illustrating a cursor moving process in the icon display device shown in FIG. 58.

Referring to FIG. 60, a cursor moving process is now described. As described above, a sensor is arranged in each area composing the display area defined as 1024 rows by 768 lines in the touch sensitive tablet 401. In FIG. 60, when the user touches the sensor 101 positioned at the upper-right corner, the touch sensitive tablet 401 outputs the coordinates (1023, 0). The section specifier 402 is provided with the section information administration table 111 composed of the section number 112, the area 113 and the section size 114.

The section specifier 402 compares the coordinates outputted from the touch sensitive tablet 401 with the section information administration table 111 to specify the section 115 as the section including the outputted coordinates. The section specifier 402 then notifies the icon image generator 403 of the specified section and its relative coordinates within the section.

The icon image generator 403 is provided with the icon information administration table 121 composed of the icon number 122, the display area 123 and the view state 124 as described above. The icon image generator 403 compares the section notified by the section specifier 402 with the icon information administration table 121. The icon image generator 403 then specifies icon information 125 as the icon corresponding to the notified section and notifies the cursor image generator 404 of the display area of the icon information 125, the section notified by the section specifier 402 and the relative coordinates within the section.

The cursor image generator 404 calculates a position F of the cursor after movement using the following equation 241:

$$F=Cul+Cr*Re$$

where Cul is the coordinates of an upper-left point of the display area, Cr is the relative coordinates within the section and Re is the reduction ratio. The reduction ratio Re is obtained by dividing the size of the display area by the section size. After calculation, the cursor image generator 404 has the display 405 display a cursor 232 on a second icon 132 according to the obtained cursor position after movement.

Figure 61:
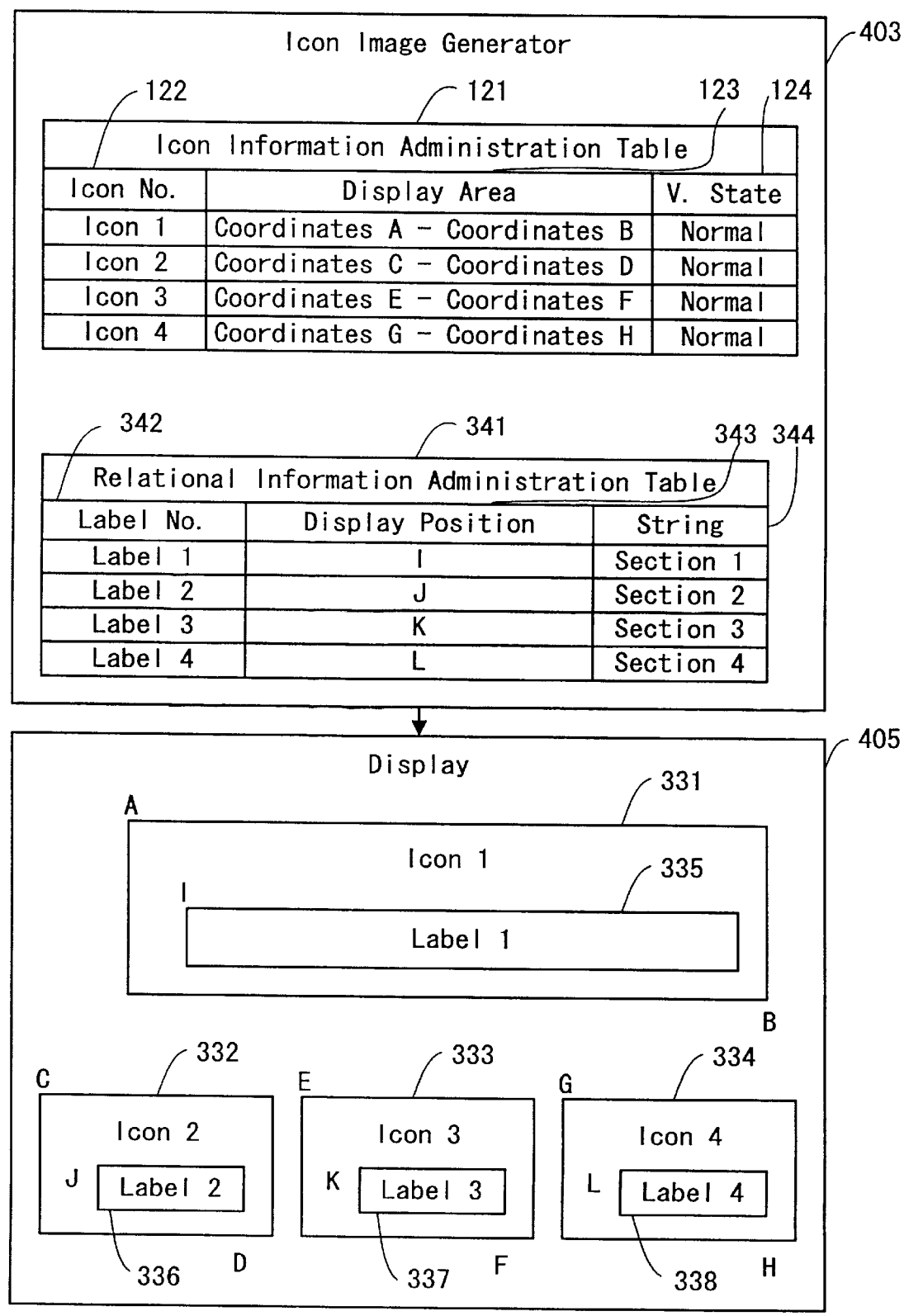
FIG. 61 is a diagram illustrating a icon labeling process in the icon display device shown in FIG. 58.

Referring to FIG. 61, an icon labeling process is now described. As described above, the icon image generator 403 is provided with the icon information administration table 121 composed of the icon number 122, the display area 123 and the view state 124. According to the icon information administration table 121, the icon image generator 403 has the display 405 display a first icon 331, a second icon 332, a third icon 333 and a fourth icon 334.

The icon image generator 403 is further provided with a relational information managing table 341 composed of a label number 342, a display position 343 and a display character string 344. The icon image generator 403 specifies relational information corresponding to the displayed icons and has the display 405 display a first label 335, a second label 336, a third label 337 and a fourth label 338.

Figure 62:
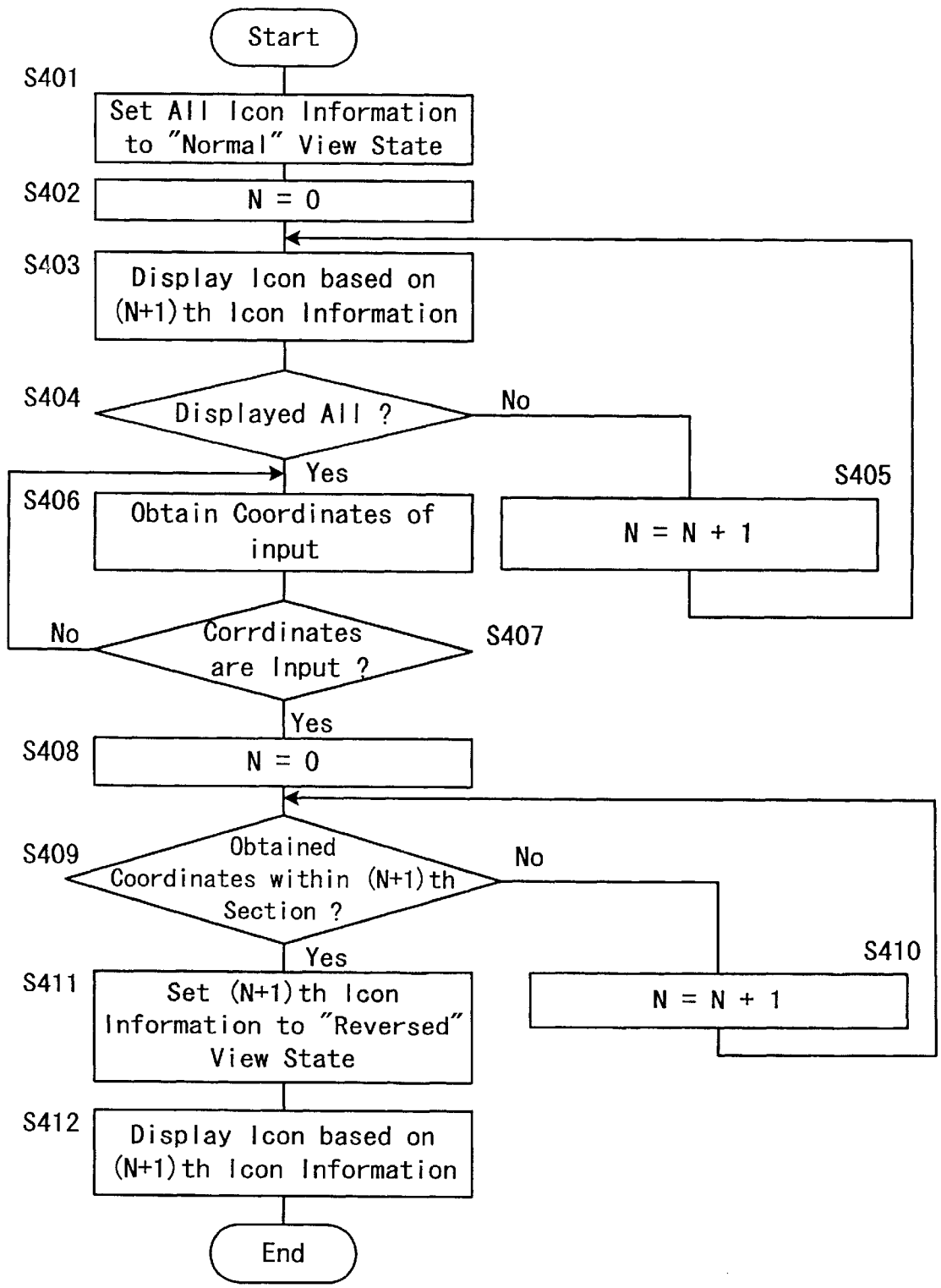
FIG. 62 is a flow chart showing an icon selection process operation shown in FIG. 59.

Referring to a flow chart shown in FIG. 62, described is an icon display process of the icon display device IDA according to the present embodiment. When the icon display device IDA is powered on, the icon display process starts.

In step S401, all view states of the icon information to be displayed on the display 405 are set to "normal view". The procedure then advances to next step S402.

In step S402, an icon identification number N, which identifies the above notified section and its corresponding icon, is set to 0 for the icon information 125. The procedure then advances to next step S403.

In step S403, based on (N+1)th icon information, that is, first icon information, the icon is displayed on the display 405. The procedure then advances to the next step S404.

In step S404, it is determined whether all icons included in the icon information 125 are displayed. If it is determined all icons are not displayed, the procedure advances to step S405.

In step S405, the icon identification number N is incremented by 1, and the next icon information is set to be processed. The procedure then returns to step S403.

In this way, after all icons are displayed on the display 405 by repeating the processing in steps S403, S404 and S405, it is determined that all icons are displayed in step S404, and the procedure then advances to next step S406.

In step S406, the coordinates inputted from the touch sensitive tablet 401 are obtained. The procedure then advances to next step s407.

In step S407, it is determined whether the obtained coordinates are valid. If it is determined the obtained coordinates are not valid, the procedure returns to step S406 to obtain again the coordinates inputted from the touch sensitive tablet 401. The processing in steps S406 and S407 are repeated until valid coordinates are obtained. Once valid coordinates are obtained, it is determined that the obtained coordinates are valid in step S407. The procedure then advances to step S408.

In step S408, as in step S403, the icon identification number N is set to 0. The procedure then advances to next step S409.

In step S409, it is determined whether the valid coordinates obtained in step S406 are included in the (N+1)th section. If it is determined the valid coordinates are not included in that section, the procedure advances to step S410.

In step S410, as in step S405, the icon identification number N is incremented by 1 and the next icon information is set to be processed. The procedure then returns to step S409.

In this way, after determining the presence or absence of input with respect to all sections in the processing in steps 409 and 410, the procedure advances to next step S411.

In step S411, the view state of the (N+1)th icon information, which is determined in step S409 to include the obtained coordinates, is set to "reverse". The procedure then advances to next step S412.

In step S412, the icon is displayed based on the (N+1)th icon information, and the procedure ends.

In short, coordinates of input from the touch sensitive tablet is waited in step S406, and when coordinates are inputted, the section including the obtained coordinates is specified in step S409. The specified icon is then displayed in reverse video in steps S411 and S412.

Figure 63:
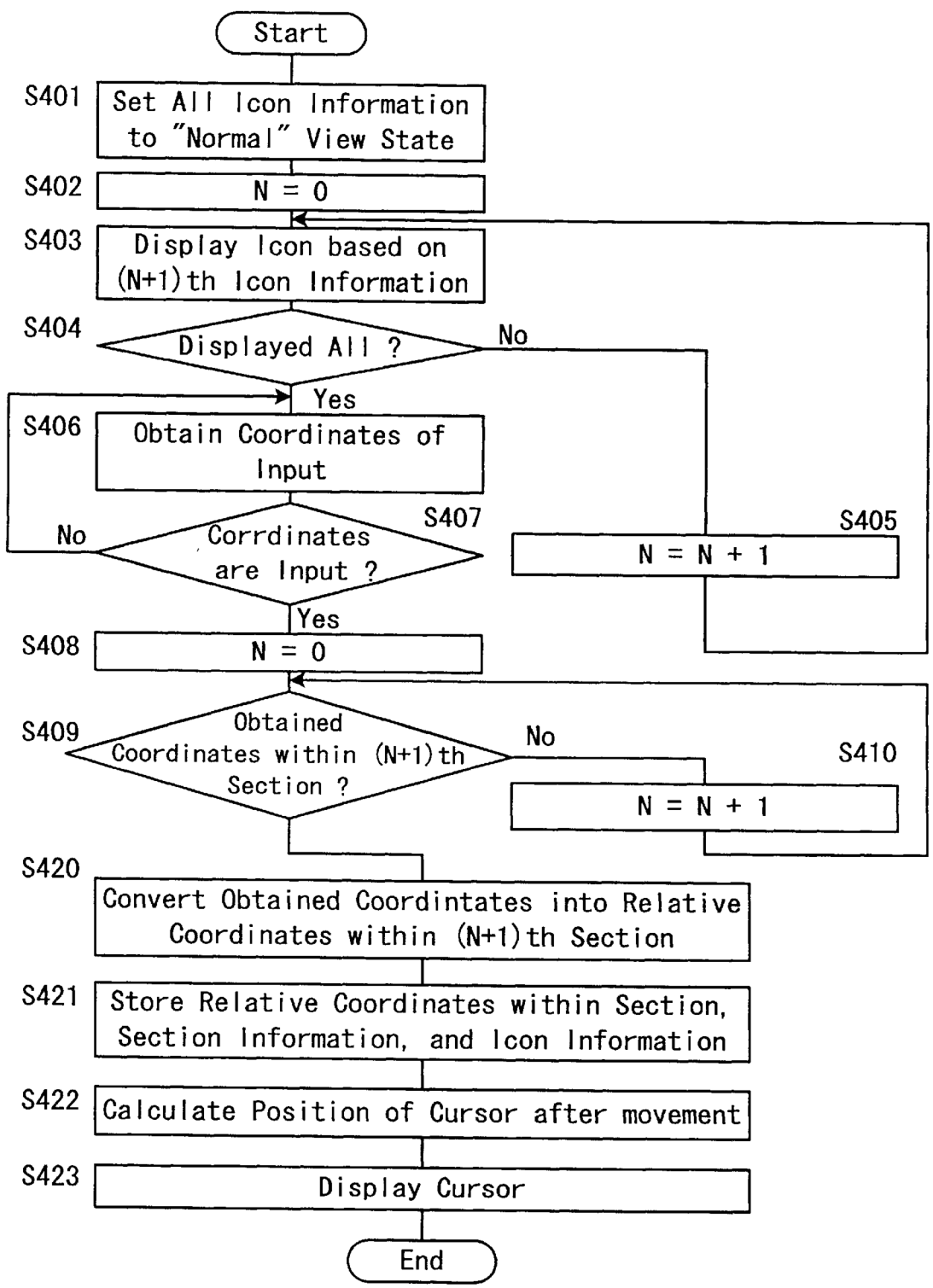
FIG. 63 is flow chart showing the cursor moving process operation shown in FIG. 60.

Referring to a flow chart shown in FIG. 63, a cursor moving process is described next. Steps S401 to S409 of the flow chart in FIG. 63 are equal to those of the flow chart in FIG. 62 showing operation of the icon processing, and the flow chart in FIG. 63 is further provided steps S420, S421, S422 and S423 after step S409. Therefore, in order to avoid redundancy, only these newly-added steps are described below.

After specifying the section including the obtained coordinates as a result of the processing in steps S401 to S409, the procedure advances to next step S420.

In step S420, the obtained coordinates are converted into relative coordinates within the specified section. The procedure then advances to step S421.

In step S421, the icon information, section information and relative coordinates within the section obtained in the above steps are stored. The procedure then advances to next step S422.

In step S422, the cursor position after movement is calculated with the relative coordinates obtained in step S420. The procedure then advances to next step S423.

In step S423, the cursor is displayed on the display 405 based on the cursor position calculated in step S422, and then the processing ends.

Figure 64:
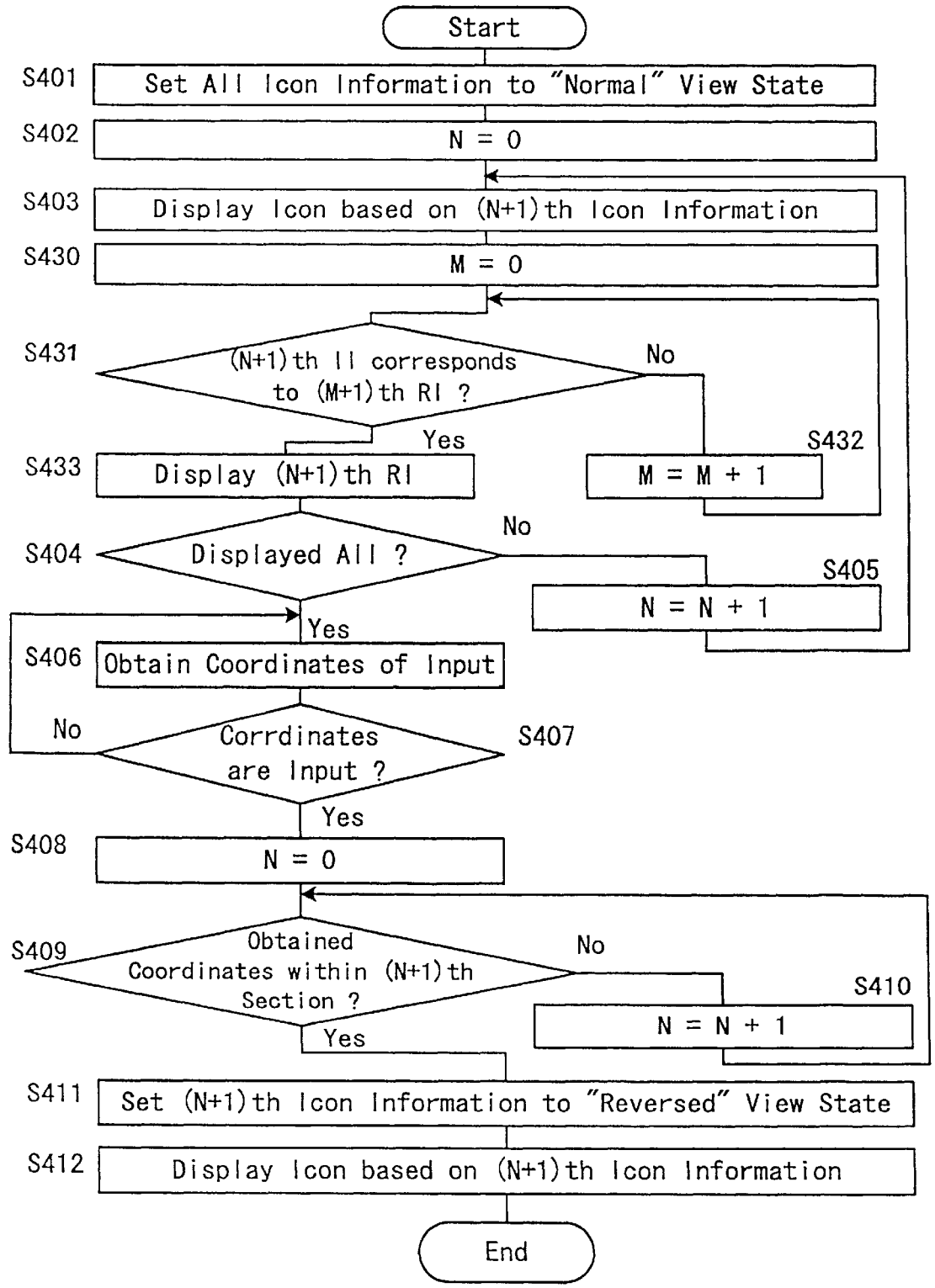
FIG. 64 is a flow chart showing the labeling process operation shown in FIG. 61.

Referring to a flow chart shown in FIG. 64 next, an icon labeling process is now described. In the flow chart of FIG. 64, new steps S430, S431, S432 and S433 are inserted between steps S403 and S404 of the flow chart in FIG. 62 showing operation of the icon processing. Therefore, in order to avoid redundancy, only these newly added steps are described below. Note that, in the flow chart, II and RI represent icon information and relational information, respectively.

After the icon is displayed on display 405 according to the (N+1)th icon information in step S403 described above, the procedure advances to next step S430.

In step S430, a number M for identifying relational information is set to 0. The procedure then advances to next step S431.

In step S431, it is determined whether the (N+1)th icon information corresponds to the (M+1)th relational information. If it is determined the (N+1)th icon information does not correspond thereto, the procedure advances to step S432.

In step S432, M is incremented by 1 to set the next relational information to be processed. The procedure then returns to step S431.

When it is determined that the relational information to be processed corresponds to the (N+1)th icon information, the procedure advances to next step S433.

In step S433, the (M+1)th relational information which is determined to correspond to the (N+1)th icon information is displayed on the display 405. The procedure then advances to the above described step S404.

In short, the relational information corresponding to the displayed icon is specified in step S431, and based on the specified relational information, a label is displayed at a predetermined position in step S433. Thereafter, in step S406, coordinates of input from the touch sensitive tablet are waited in step S406. By referring to the label displayed in step S433, the user touches a desired section area on the touch sensitive tablet to input its coordinates. When the coordinates are inputted, the section including the obtained coordinates is specified in step S409. The view state of the specified icon information is set to "reverse" in step S411, and the icon is displayed in reverse video in step S412.

With the above structure, in the present embodiment, the input surface of the touch sensitive tablet is divided into a plurality of sections to be managed, relating the sections obtained by division to the displayed icons. Furthermore, when the user touches one of the sections on the touch sensitive tablet, the icon corresponding to the touched section is distinguished from the other icons and displayed on the display. As a result, the user can quickly select the icon even with different shape, position and the number of matrix of dots between the icon display area of the display and the input surface of the touch sensitive tablet.

Furthermore, a label indicating the meaning of the icon itself to the user is provided on the displayed icon, and thereby the displayed icon and the section of the touch sensitive tablet are easily identified.

Still further, the cursor display position is calculated from the relative coordinates in the section. Therefore, the cursor can be displayed correctly on a desired icon, even with different aspect ratio of dots between the displayed icon and the section of the touch sensitive tablet or with different arrangement of the icons.

While the invention has been described in detail, the foregoing description is in all aspects illustrative and not restrictive. It is understood that numerous other modifications and variations can be devised without departing from the scope of the invention.

EFFECTS OF THE INVENTION

As described in the above, according to the first embodiment of the present invention, projections and depressions or printed graphics are provided as signs on the frame of the touch-sensitive tablet. These signs allow the user to correctly understand the positions of function regions on the touch tablet with a touch or visually and readily designate the function regions with the finger.

Further, signs indicative of the functions assigned to the function regions are also provided on the frame, thereby facilitating designation of the function regions and reducing erroneous input operations. Besides, the function regions can be accurately recognized by the user. Therefore, it is possible to increase the number of function regions and improve the efficiency of user's input operations.

Moreover, signs are in the form of projections and depressions or printed graphics on the frame. This helps the user to understand the positions of the function regions or the contents of the functions assigned to the function regions with the finger, and allows the user to make a blind touch entry. Besides, as compared with printed signs on the front sheet, the surface of the touch tablet can be plain, which allows the finger to move quite naturally in normal input operations for moving a cursor.

Furthermore, the no-sensor area is provided between the coordinate sensor and the inner periphery of the frame, which facilitates designation of the function regions in the corners. Besides, the coordinate sensor can be utilized to its limit as a function designating area, resulting in efficient use of the touch tablet.

As stated above, according to the second embodiment of the present invention, it is possible to obtain the advantageous effects such as avoiding misoperation, for example, launching an undesired application program or menu, with a touch of a finger. Besides, it is possible to quickly execute a window operation without moving a cursor.

According to the third embodiment of the present invention, the touch-sensitive tablet has a plurality of function regions and other regions provided contiguously thereto. The touch-sensitive tablet includes a touch sensor for acquiring touch information and untouch information in regard to the plurality of regions, a storage for storing a table showing correspondence between combinations of the contiguous plurality of regions and operations(functions) to be executed, a controller for starting the operations based on continuos touch information acquired by the touch sensor and the correspondence table, and a display for displaying the result of the operation. This configuration makes it possible to prevent misoperation caused by a touch of a user's finger, and execute functions assigned to the function regions regardless of the skill of a user and the sensitivity of the touch-sensitive tablet. Further, it is possible to assign a plurality of functions to a single function region.

Moreover, the touch sensor includes the function regions in the corners thereof and movement detecting regions around the function regions. The controller starts the operation (function) only when the continuous touch information starts from one of the function regions. Thus, it is possible to start a plurality of functions in regard to each function region in the corner, thereby improving the usability of the touch-sensitive tablet.

The touch sensor further includes insensitive regions between each function region and the movement detecting regions. The controller suspends the processing for the continuous touch information belonging to the insensitive regions. Accordingly, misoperation with respect to the function regions can be further reduced.

Furthermore, the controller starts the operation (function) only when the continuous touch information indicates that the user's finger moves along the touch surface of the touch sensor and reaches one of the movement detecting regions. Therefore, the user can start the operation (function) with such a simple operation, which improves the usability of the touch-sensitive tablet.

Continuos touch information from the function region to the movement detecting region is also assigned an operation of moving a mouse cursor, on a window displayed on a screen of the display, onto a menu entry. This eliminates the need of an input operation for moving the mouse cursor onto a menu. Besides, it is possible to perform operations relating to a window with the touch-sensitive tablet after a series of input operations therein.

The touch-sensitive tablet includes a touch sensor for acquiring touch information and untouch information for function regions, a storage for storing a table showing correspondence between operations (functions) and combinations of the function regions and continuous touch information representing finger movement from the function regions to outside the function regions in parallel to specific directions, and a controller for starting the operations (functions) based on the continues touch information acquired by the touch sensor and the correspondence table. Thus, misoperation caused by an erroneous touch of the user's finger can be prevented. Further, it is possible to execute a function assigned to each function region regardless of the user's skill and the sensitivity of the touch-sensitive tablet, and assign a plurality of functions to each function region.

As described above, according to the present invention, the coordinates outputted from the touch sensitive tablet are managed by one or more sections, and the section(s) is related to the icon to be displayed, thereby allowing quick icon selection regardless of the display size of the icon.

What is claimed is:

1. A touch-sensitive tablet comprising:
   a touch sensor comprising
      an integral number of corners, and
      a plurality of specific regions provided contiguously to each other, each of said plurality of specific regions are operable to acquire touch information indicative of whether an instructor touches respective specific regions;
   a storage operable to store a correspondence table, the correspondence table establishing correspondence between a plurality of operations and a respective plurality of combinations of contiguous specific regions among said plurality of specific regions; and
   a controller operable to start a determined operation in response to a successive touching of a combination of contiguous specific regions by the instructor, the determined operation being based on the touch information and the correspondence table;
   wherein the plurality of operations are operable to be individually and selectively started in response to corresponding combinations of the successively touched contiguous specific regions,
   wherein said plurality of specific regions includes a first specific region, second specific regions and third specific regions,
      said first specific region provided in one of said corners of said touch sensor,
      said third specific regions provided contiguously to said second specific regions, respectively, and
      said second specific regions provided between said first specific region and said third specific regions, and
   wherein said controller is operable to
      start the operations only when the touch information indicates that said first specific region is touched first, and
      suspend start up of the operations when the touch information indicates that said second specific regions are touched.

2. The touch sensitive tablet as claimed in claim 1, wherein said first specific region is assigned a plurality of functions.

3. The touch sensitive tablet as claimed in claim 2, wherein said controller is operable to start the functions assigned to the first specific region when the touch information indicates that said third specific regions are touched.

4. The touch-sensitive tablet as claimed in claim 1, wherein said first specific region is assigned a plurality of functions.

5. The touch sensitive tablet as claimed in claim 4, wherein said controller is operable to start the functions assigned to said first specific region when said touch information indicates that said third specific regions are touched.

6. The touch-sensitive tablet as claimed in claim 1, wherein said controller is operable to start the operations when said touch information indicates that said first specific region and one of said second specific regions are successively touched by the instructor.

7. The touch-sensitive tablet as claimed in claim 1, wherein said controller starts said operations when said touch information indicates that said first specific region and one of said second specific regions are successively touched by the instructor.

8. The touch-sensitive tablet as claimed in claim 1, wherein said touch information comprises information about points where the instructor touches with said touch sensor, and information being detected at a predetermined time interval.

9. A touch-sensitive tablet as claimed in claim 1, wherein said touch information varies according to the moving speed of the instructor.

10. A touch-sensitive tablet as claimed in claim 1, further comprising:
   a display for showing a plurality of windows thereon;
   wherein said plurality of windows as functions assigned to said function region; and
   wherein said controller switches an input operation mode to a normal cursor moving operation mode based on said touch information and said operations stored in said storage while at least one of said plurality of windows is shown on a screen of said display, and moves a cursor onto a menu entry for one of said plurality of windows shown on said screen.

11. The touch-sensitive tablet as claimed in claim 10, wherein said controller executes said operations for said active window focused by said cursor.

12. The touch-sensitive tablet of claim 1, wherein said touch sensor further comprises:

a flat surface capable of being touched with an instructor, and operable to generate an input signal in response to a position of the instructor; and a frame provided around said flat surface with a predetermined gap measured from an edge thereof for defining a maximum moveable range of the instructor on said flat surface, said predetermined gap being determined such that the instructor can touch the periphery of said flat surface even when movement of the instructor is restricted by said frame;

wherein, said predetermined gap is determined based on the curvature of the instructor with respect to said flat surface and the height of said frame above said flat surface; and wherein said flat surface is formed in a polygonal configuration defined by a plurality of sides said predetermined gap taking a minimum value in the middle of each of said plurality of sides to become larger toward corners defined by the adjacent two sides among said sides and taking a maximum value at said corners.

13. The touch-sensitive tablet of claim 1, wherein said touch sensor further comprises:

a flat surface capable of being touched with an instructor, and operable to generate an input signal in response to a position of the instructor;

a frame provided around said flat surface with a predetermined gap measured from an edge thereof for defining a maximum moveable range of the instructor on said flat surface, said predetermined gap being determined such that the instructor can touch the periphery of said flat surface even when movement of the instructor is restricted by said frame; and a function region having an assigned specific function and provided on said flat surface, said function region operable to generate a function execution signal when the instructor touches said function region.

14. The touch-sensitive tablet as claimed in claim 13, wherein a sign is provided on said function region to indicate the contents of the assigned specific function thereto.

15. The touch-sensitive tablet as claimed in claim 13, wherein a sign is provided in said frame to indicate the contents of the assigned specific function corresponding to said function region.

16. The touch-sensitive tablet as claimed in claim 15, wherein said sign takes any one form of being printed, engraved and embossed on said frame.

17. The touch-sensitive tablet as claimed in claim 15, wherein said sign takes the form of projections and depressions on an inner periphery of said frame, and wherein said sign indicates the assigned specific function corresponding to said function region.

18. A touch-sensitive tablet comprising:

a flat surface capable of being touched with an instructor, and operable to detect information about the position corresponding to the touch of the instructor on said flat surface;

a function region provided on said flat surface and assigned a specific function;

a storage for storing an operation corresponding to the specific function assigned to said function region; and a controller operable to retrieve the operation from said storage when the instructor successively touches said function region with a first touch and a second touch, within a predetermined time;

wherein on receipt of information about any one of the first touch and the second touch existing in the function region and the other one of the first touch and the second touch existing outside said function region but within a predetermined range measured from said function region, said controller is operable to retrieve the operation from said storage.

19. A method of successively touching a plurality of specific regions provided contiguously to each other on a touch surface of a touch-sensitive tablet having an integral number of corners and executing a function assigned to one of said plurality of specific regions, comprising:

acquiring touch information indicative of whether an instructor touches any one of said plurality of specific regions;

storing a correspondence table, the correspondence table establishing correspondence between a plurality of functions and a respective plurality of combinations of contiguous specific regions among said plurality of specific regions; and controlling start up of a determined function in response to a successive touching of a combination of contiguous specific regions by the instructor, the determined function being based on the touch information and the correspondence table;

wherein the plurality of functions are operable to be individually and selectively started in response to corresponding combinations of the successively touched contiguous specific regions;

wherein said plurality of specific regions includes a first specific region, second specific regions and third specific regions, said first specific region provided in one of said corners of said touch sensor, said third specific regions each respectively provided contiguously to said second specific regions, and said second specific regions provided between said first specific region and said third specific regions; and wherein controlling start up further includes
starting the determined function only when the touch information indicates that said first specific region is touched first, and
suspending start up of the determined function when the touch information indicates that said second specific regions are touched.

20. The method as claimed in claim 19, wherein said controlling start up further includes starting the determined function when the touch information indicates that said second specific regions are touched.

21. A computer program capable of running on a computer so that the system comprising the computer program plus the computer carries out a method according to claim 20.

22. A computer program loadable into a computer so that the computer programmed in this way is capable of carrying out a method according to claim 20.

23. A computer program product comprising a computer readable medium, having thereon: computer program code means, when said program is loaded, to make the computer execute a method according to claim 20.

24. A computer program capable of running on a computer so that the system comprising the computer program plus the computer carries out a method according to claim 19.

25. A computer program loadable into a computer so that the computer programmed in this way is capable of carrying out a method according to claim 19.

26. A computer program product comprising a computer readable medium, having thereon: computer program code means, when said program is loaded, to make the computer execute a method according to claim 19.

27. An icon display device for displaying an icon corresponding to a specific section in distinction from another icon, comprising:
- a touch-sensitive tablet operable to input plane coordinates, a storage, and a controller;
- said touch-sensitive tablet comprising an integral number of corners, and a plurality of specific regions provided contiguously to each other, each of said plurality of specific regions are operable to acquire touch information indicative of whether an instructor touches respective specific regions;
- said storage operable to store a correspondence table, the correspondence table establishing correspondence between a plurality of operations and a respective plurality of combinations of contiguous specific regions among said plurality of specific regions; and
- said controller operable to start a determined operation in response to a successive touching of a combination of contiguous specific regions by the instructor, the determined operation being based on the touch information and the correspondence table;
- a section specifier operable to manage one or more sections defined by coordinates inputted from said touch-sensitive tablet, and to specify the section including the inputted coordinates;
- a display operable to display icons; and
- an icon image generator operable to enable said display to display said icons corresponding to respective sections managed by said section specifier;
- wherein the plurality of operations are operable to be individually and selectively started in response to corresponding combinations of the successively touched contiguous specific regions;
- wherein said plurality of specific regions includes a first specific region provided in one of said corners of said touch sensor, second specific regions, and third specific regions provided contiguously to said second specific regions, respectively, said second specific regions provided between said first specific region and said third specific regions;
- wherein said controller is operable to start the operations only when the touch information indicates that said first specific region is touched first, and to suspend start up of the operations when the touch information indicates that said second specific regions are touched; and
- wherein said display is operable to display an icon corresponding to the section specified by said section specifier in distinction from another icon.

28. The icon display device as claimed in claim 27, wherein
- one of the sections managed by said section specifier is identified as corresponding to the inputted coordinates, and
- said icon image generator is operable to provide the icon with a label corresponding to the identified section of said touch-sensitive tablet.

29. The icon display device as claimed in claim 28, further comprising a cursor image operable to enable said display to display a cursor on the icon which corresponds to the section specified by said section specifier and to the coordinates inputted from said touch-sensitive tablet.

30. The icon display device as claimed in claim 27, further comprising, a cursor image generator operable to enable said display to display a cursor at a position corresponding to the coordinates inputted from said touch-sensitive tablet, the position located on the icon corresponding to the section specified by said section specifier.

* * * * *